United States Patent [19]

Abe et al.

[11] Patent Number: 4,914,525
[45] Date of Patent: Apr. 3, 1990

[54] IMAGE PROCESSING MACHINE

[75] Inventors: Yuji Abe, Osaka; Kenji Sakaue, Gojo; Masahiro Hashizume, Yao; Taiichi Jinno; Kazuo Nakamura, both of Sakai; Katsumi Nagata, Kyoto, all of Japan

[73] Assignee: Mita Industrial Co., Ltd., Osaka, Japan

[21] Appl. No.: 193,277

[22] Filed: May 11, 1988

[30] Foreign Application Priority Data

May 13, 1987 [JP] Japan .................................. 62-114754

[51] Int. Cl.$^4$ ........................ H04N 1/04; H04N 1/387
[52] U.S. Cl. .................................. 358/498; 358/474; 358/296; 355/234; 355/235
[58] Field of Search ............... 271/121, 127, 162, 285; 358/256, 257, 280, 296, 488, 497, 498, 75; 355/14 R, 3 R, 234, 235, 308

[56] References Cited

U.S. PATENT DOCUMENTS

| 4,474,454 | 10/1984 | Sugiura | 355/14 R |
|---|---|---|---|
| 4,607,291 | 8/1986 | Oono | 358/296 |
| 4,645,328 | 2/1987 | Shiraki et al. | 355/14 R |
| 4,657,376 | 4/1987 | Ide | 355/14 R |
| 4,695,896 | 9/1987 | Yamanishi | 358/296 |
| 4,709,273 | 11/1987 | Honda et al. | 358/293 |
| 4,730,204 | 3/1988 | Satoh et al. | 271/121 |
| 4,734,760 | 3/1988 | Futaki | 358/280 |
| 4,737,856 | 4/1988 | Shimizu | 358/285 |
| 4,763,159 | 8/1988 | Temple et al. | 355/3 R |
| 4,794,419 | 12/1988 | shibazaki et al. | 355/3 R |
| 4,831,462 | 5/1989 | Akuyama et al. | 358/75 |

Primary Examiner—James J. Groody
Assistant Examiner—Kim Yen Vu
Attorney, Agent, or Firm—Wenderoth, Lind & Ponack

[57] ABSTRACT

An image processing machine functions both as a facsimile machine and as an ordinary copying machine. The image processing machine is provided with a document scanning system and image-forming system. The document scanning system comprises a first scanning zone, a second scanning zone an image-receiving system, an optical system for optically connecting the first scanning zone and the second scanning zone to the image-receiving system, a first document scan moving system for moving a document across the first scanning zone and a second document scan moving system for moving a document across the second scanning zone. The image-forming system comprises printing system with a print output zone and a system for conveying a printing substrate through the printing output zone. An ink ribbon cartridge in the image forming system has a detector for detecting a broken ink ribbon.

52 Claims, 28 Drawing Sheets

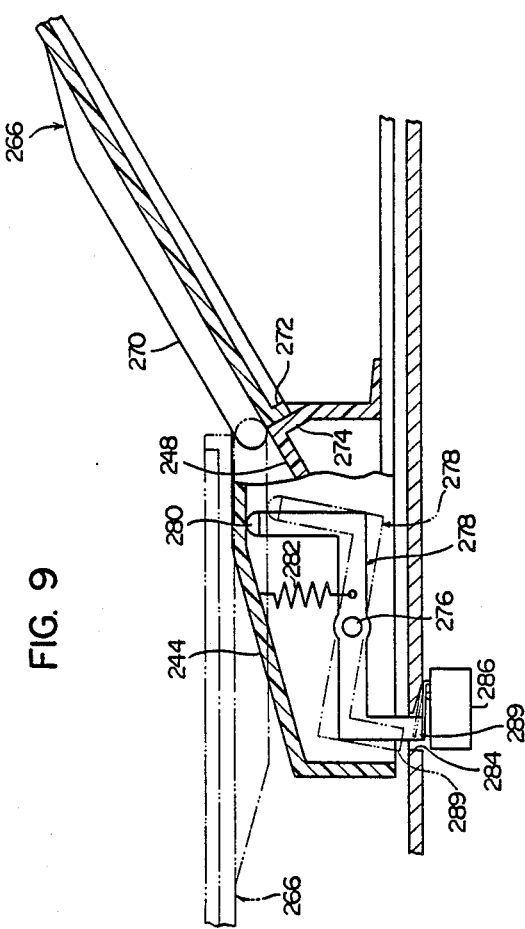
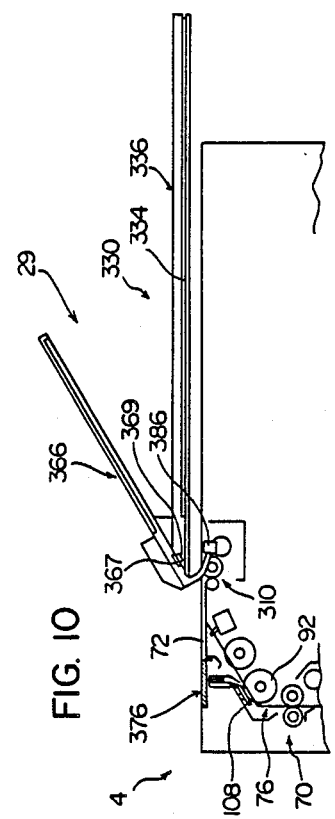
FIG. 9
FIG. 10

FIG. 16
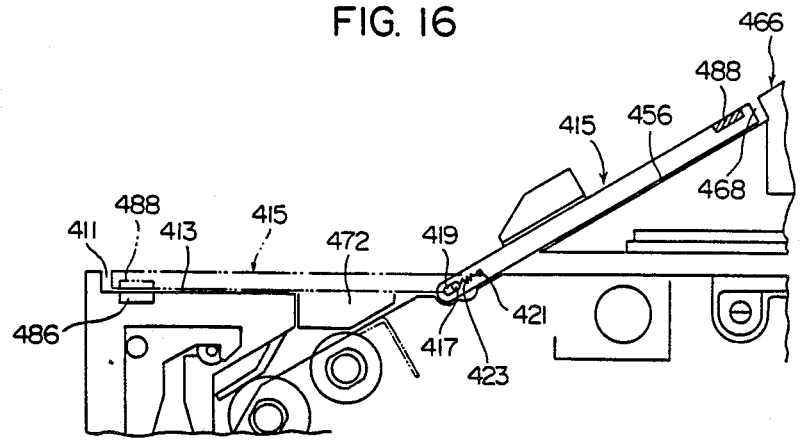
FIG. 17-A
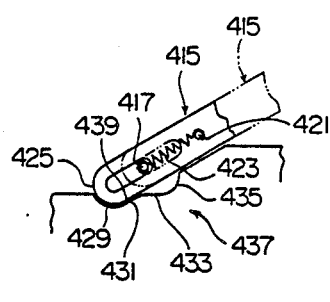
FIG. 17-B
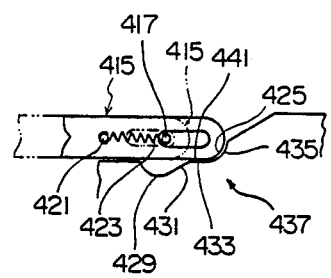

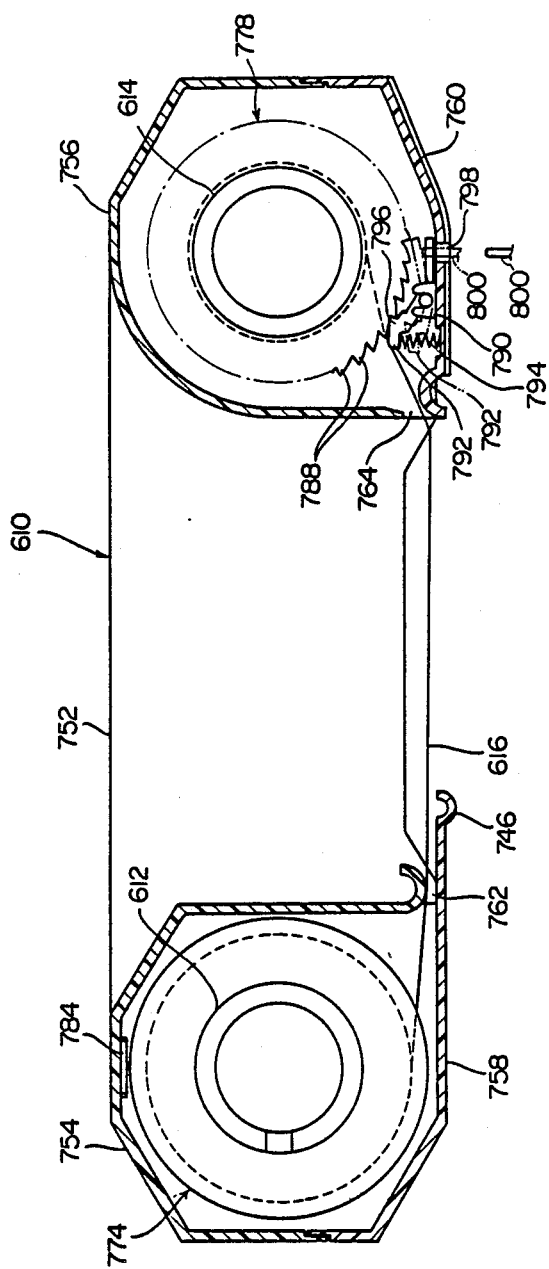

IMAGE PROCESSING MACHINE

FIELD OF THE INVENTION

This invention relates to an image processing machine equipped with document scanning means and/or image forming means. The document scanning means optically scans a document to be converted into a transmission signal or copied. The image forming means forms an image on a printing substrate according to the received signal or to the optically scanned document.

DESCRIPTION OF THE PRIOR ART

An image processing machine such as a copying machine, a printing machine, or a facsimile machine capable of functioning as a copying machine or a printing machine is equipped with the document scanning means and/or the image forming means.

Document scanning means for optically scanning a document which have so far been proposed and gained commercial acceptance are of the stationary document placing stand type, the movable document placing stand type or the sheet-like document conveying type. In document scanning means of the stationary document placing stand type, the document is placed on a transparent plate of the stationary document placing stand, and scanned by moving movable optical means along the transparent plate. In document scanning means of the movable document placing stand type, the document is placed on a transparent plate of the movable document placing stand, and scanned by moving the movable document placing stand across a scanning zone in which stationary optical means is in action. In document scanning means of the last-mentioned type, a sheet-like document conveying passage is provided extending across a scanning zone in which stationary optical means is in action, and the sheet-like document is scanned by conveying it through the conveying passage.

The document scanning means of the sheet-like document conveying type can automatically scan a number of sheet-like documents more easily and rapidly than those of the other two types, but cannot scan documents of other shapes such as a book. The document scanning means of the stationary document placing stand type or the movable document placing stand type can scan various types of documents including a sheet-like document and a book. It has therefore been desired to develop document scanning means which functions not only as the sheet-like document conveying type but also as the stationary or movable document placing stand type.

Conventional techniques proposed in an attempt to meet this desire have one or more problems to be solved. For example, since two systems of optical means which act independently from each other or a complex and expensive document placing stand is required, the cost of production is high and the machine becomes large-sized. If the operation of causing the document scanning means to function as the sheet-like document conveying type is confused by error with the operation of causing the document scanning means to function as the stationary document placing stand type or the movable document placing stand type, it is likely that the operator's hand will be injured or the document will be damaged. Furthermore, the conventional document scanning means functioning as the sheet-like document conveying type permits only a single mode of opening the sheet-like document conveying passage, and the opening mode of the document conveying passage cannot be varied according to the elimination of document jamming or the cleaning, repair or inspection of a specific part.

The image-forming means for forming an image on a printing substrate such as paper comprises printing means having a print output area at a predetermined site, a printing substrate conveying passage extending across the print output area, printing substrate feed means for feeding the printing substrate to the printing substrate conveying passage and printing substrate conveying means for conveying the fed printing substrate through the printing substrate conveying passage. A printing device comprised of a print head such as a thermal head and an ink ribbon cartridge is conveniently used as the printing means.

The conventional image-forming means, however, has various problems to be solved.

(a) It is required to mount the ink ribbon cartridge so as to be easily replaceable and adapt the printing substrate conveying passage to be easily opened for removing the printing substrate. But this requirement cannot be fulfilled without an increase in size, cost of production and complexity.

(b) Various inconveniences occur when the operator forgets by inadvertence to close a printing substrate conveying passage which has been opened.

(c) It is desired to drivingly connect a ribbon take-up shaft automatically to ink ribbon driving means when an ink ribbon cartridge has been mounted on the take-up shaft. This desire cannot be fulfilled without complicating the mounting and detaching operations of the ink ribbon cartridge and adversely affecting the positioning of the ink ribbon cartridge.

(d) When the ink ribbon of the ink ribbon cartridge is accidentally broken and the printing fails, this accident cannot be detected.

(e) It is desired to permit rotation of the ribbon take-up shaft without causing inconveniences such as large noises when the ink ribbon cartridge is mounted in position and to prevent reverse rotation of the ribbon take-up shaft for avoiding loosening of the ink ribbon when the ink ribbon cartridge has been detached from the mounting site of the take-up shaft. This desire, however, cannot be fulfilled.

SUMMARY OF THE INVENTION

It is a first object of this invention to provide an image processing machine provided with relatively small-sized and inexpensive document scanning means which functions both as a sheet-like document conveying type and as a movable document placing stand type document scanning means.

A second object of this invention is to provide an image processing machine equipped with document scanning means having safety characteristics so as to not injure the operator's hand nor damage a document even when the operation of causing the document scanning means to function as the sheet-like document conveying type is confused by error with the operation of causing it to function as the movable document placing stand type.

A third object of this invention is to provide an image processing machine provided with document scanning means which permits selection of the mode of opening a sheet-like document conveying passage according to the removal of a jammed document, the cleaning, repair or inspection of a specific part.

A fourth object of this invention is to provide an image processing machine provided with relatively small-sized, simplified and inexpensive image-forming means in which an ink ribbon cartridge of a printing means can be easily replaced and a printing substrate conveying passage can be easily opened for removal of a jammed printing substrate or otherwise.

A fifth object of this invention is to provide an image processing machine provided with image-forming means which does not cause inconveniences even no special operation is need to be performed for closing and opening a printing substrate conveying passage A sixth object of this invention is to provide an image processing machine provided with image-forming means in which, when an ink ribbon cartridge is mounted at a predetermined position, its ribbon take-up shaft is automatically drivingly connected to ink ribbon driving means without marring the ease of the cartridge mounting and detaching operations and adversely affecting the positioning of the ink ribbon cartridge.

A seventh object of this invention is to provide an image processing machine provided with image-forming means in which, when the ink ribbon of an ink ribbon cartridge in a printing means is broken and printing fails, the breakage is automatically detected An eighth object of this invention is to provide an image processing machine provided with image-forming means in which, when an ink ribbon cartridge in a printing means is mounted at a predetermined position, its ribbon take-up shaft is permitted to rotate without causing inconveniences such as the occurrence of large noises, and when the ink ribbon cartridge is detached from the predetermined position, the reverse rotation of the ribbon take-up shaft is prevented.

Further objects of this invention will become apparent from the following description taken in conjunction with the, accompanying drawings.

BRIEF DESCRIPTION OF THE DRAWINGS

FIGS. 5, 6, 7, 8 and 9 are a simplified partial sectional view, a perspective view, a simplified partial sectional view, a perspective view and a partial sectional view of a first modified embodiment of the movable document placing stand;

FIGS. 10, 11 and 12 are a simplified partial sectional view, a perspective view and a simplified partial sectional view showing a second modified embodiment of the movable document placing stand;

FIGS. 13, 14, 15, 16, 17-A and 17-B are a simplified partial sectional view, a perspective view, a simplified partial sectional view, a partial sectional view, an enlarged partial view and an enlarged partial view showing a third modified embodiment of the movable document placing stand;

FIG. 32 is a sectional view of the ink ribbon cartridge shown in FIG. 30;

DETAILED DESCRIPTION OF PREFERRED EMBODIMENTS

Preferred embodiments of the image processing machine of this invention will be described in detail with reference to the accompanying drawings.

Figure 1:
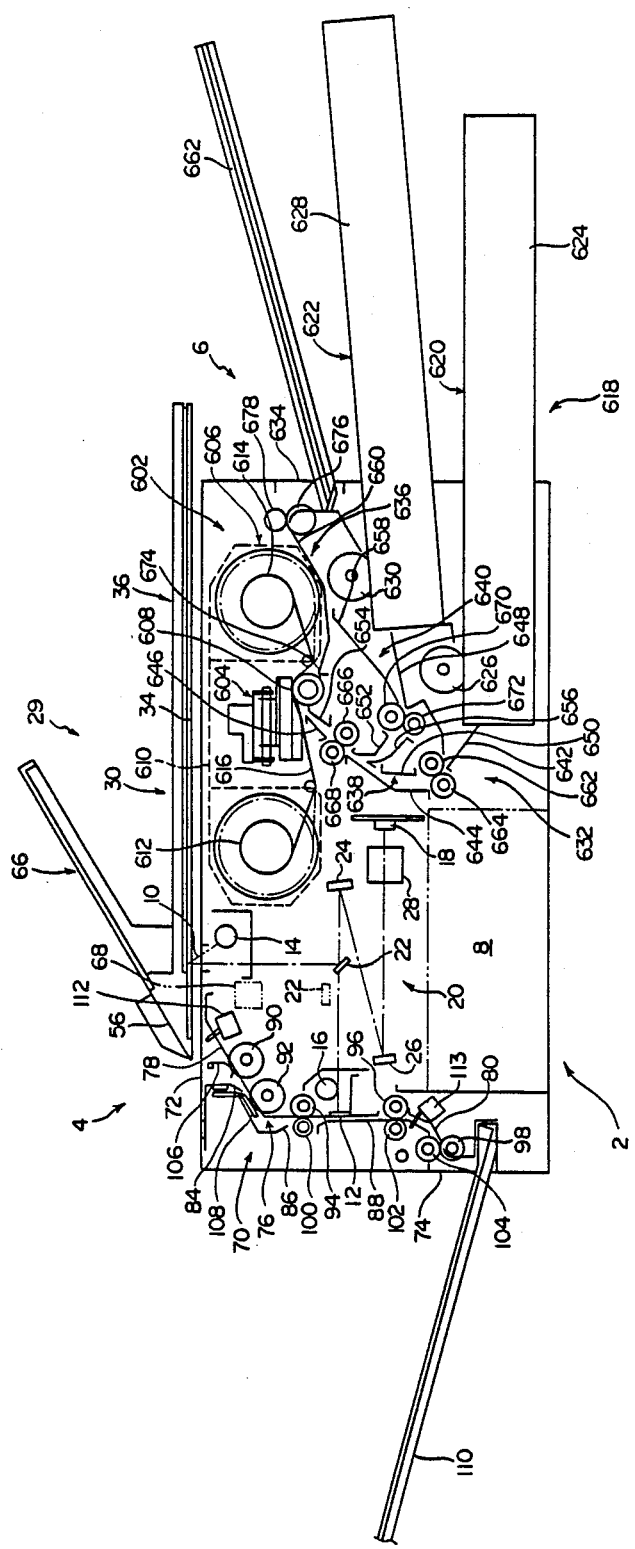
FIG. 1 is a simplified sectional view showing one embodiment of the image processing machine of the invention.

FIG. 1 shows one embodiment of the image processing machine of this invention embodied as a facsimile machine capable of functioning as a copying machine. The illustrated image processing machine has a nearly rectangular parallelpipedal housing 2. Document scanning means shown generally at 4 and image-forming means shown generally at 6 are mounted on the housing 2. In the left lower portion of the housing 2 is disposed control means 8 for controlling the actions of various means in the image processing machine and the transmission and receiving of image signals when the image processing means functions as a facsimile machine. A detailed description of the control means 8 itself is omitted in the present specification because it has nothing directly to do with the novel features of the image processing machine of the invention.

Construction of the Document Scanning Means in its entirety

The document scanning means 4 will be described in detail with reference to FIG. 1. An opening extending in the widthwise direction (the direction perpendicular to the sheet surface in FIG. 1) is formed at a predetermined site on the upper surface of the housing 2, and a first scanning zone 10 is defined by the opening. A second scanning zone 12 defined by a widthwise extending transparent plate (or slit) is disposed in the left side portion of the inside of the housing 2. First document illuminating means 14 is disposed within the housing 2 in relation to the first scanning zone 10, and second document illuminating means 16 is disposed in relation to the second document scanning zone 12. The first and second document illuminating means 14 and 16 include suitable lamps extending in the widthwise direction, such as halogen lamps.

Image-receiving means 18 is disposed nearly centrally in the housing 2. The image receiving means 18 may be constructed of a known optical reading device composed of an array of many suitable solid image pick-up elements, such as CCD (where it is not necessary for the image processing machine to function as a facsimile machine, the image receiving means 18 may be comprised of an electrostatographic material used in ordinary copying machines). Within the housing 2 is also provided optical means shown generally at 20. The optical means 20 comprises a light path changing reflecting mirror 22, a first stationary reflecting mirror 24, a second stationary reflecting mirror 26 and a lens assembly 28. The light path changing reflecting mirror 22 is selectively held at a first position shown by a solid line and a second position shown by a two-dot chain line. When the light path changing reflecting mirror 22 is held at the first position, the first scanning zone 10 is optically connected to the image receiving means 18 via the light path changing reflecting mirror 22, the first stationary reflecting mirror 24, the second reflecting mirror 26 and the lens assembly 28. On the other hand, the light path between the second scanning zone 12 and the first reflecting mirror 24 is shut off by the light path changing reflecting mirror 22, and therefore, the second scanning zone 12 is not optically connected to the image receiving means 18. When the light path changing reflecting mirror 22 is held at the second position, the first scanning zone 10 fails to be connected optically to the first reflecting mirror 24 by the light path changing reflecting mirror 22, and consequently, the first scanning zone 10 is not optically connected to the image receiving means 18. On the other hand, the light path changing reflecting mirror 22 recedes from the light path between the second scanning zone 12 and the first reflecting mirror 24 and the second scanning zone 12 is connected optically to the image receiving means 18 via the first reflecting mirror 24, the second reflecting mirror 26 and the lens assembly 28. The structure of the optical means 20, particulary the structure of the light path changing reflecting mirror 22, will be described in detail hereinafter.

Figure 2:
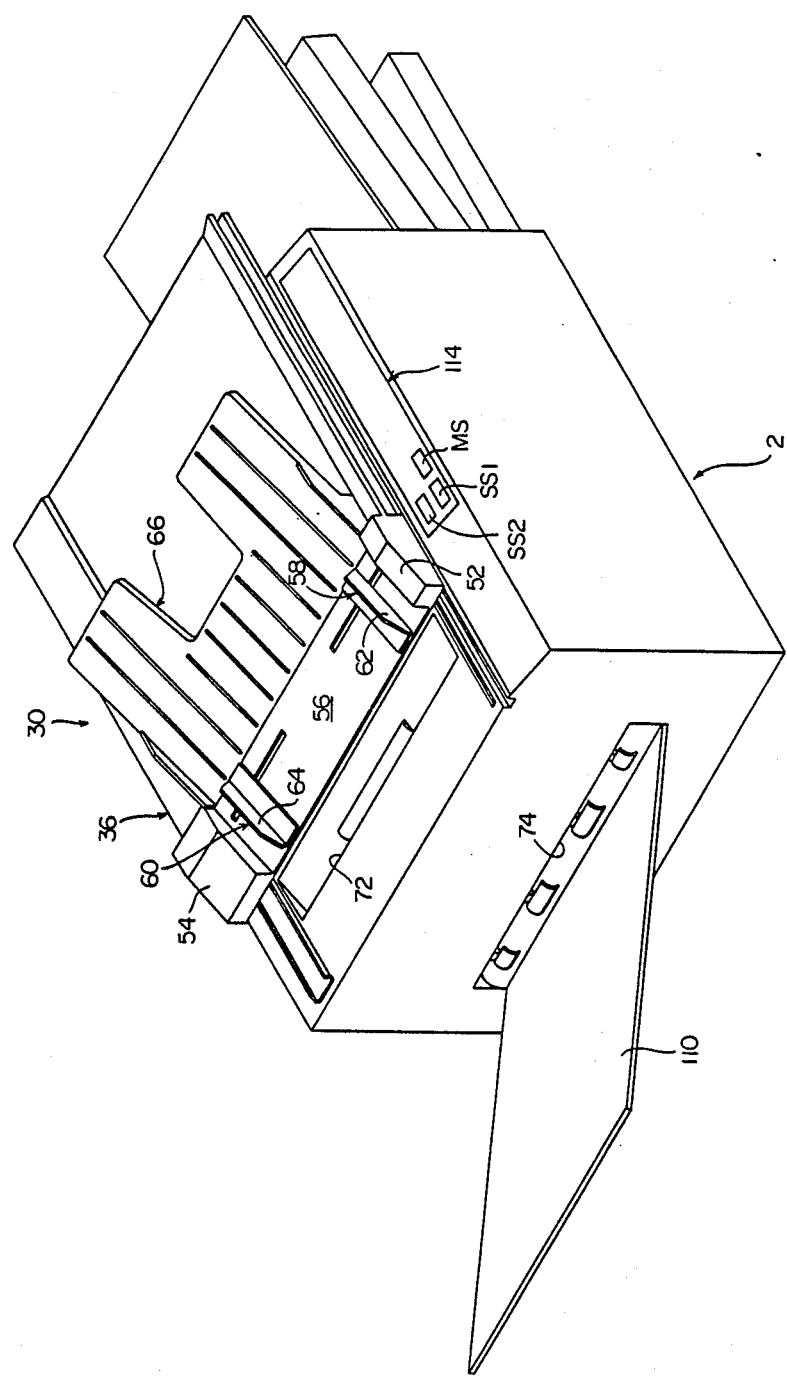
FIG. 2 is a perspective view of the image processing machine shown in FIG. 1.
Figure 3:
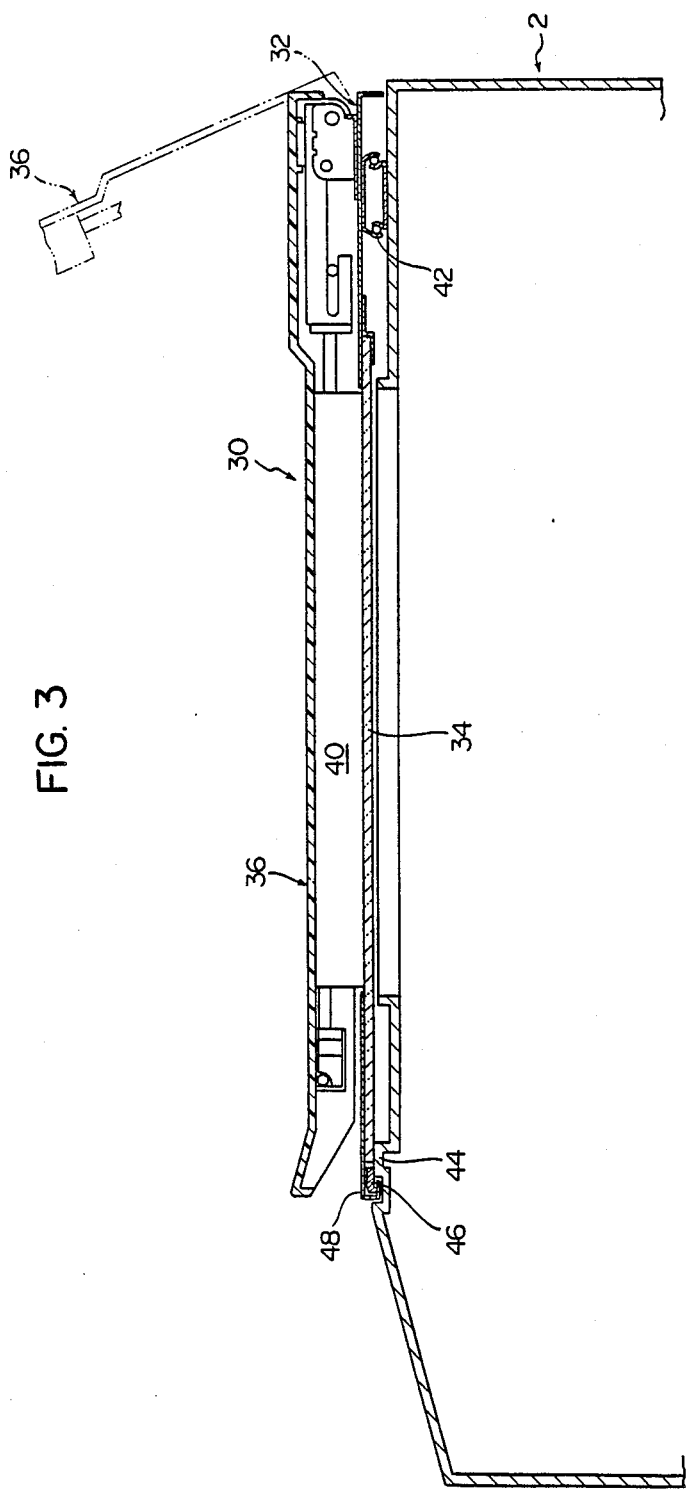
FIG. 3 is a partial sectional view showing the method of mounting a movable document placing stand in a document scanning means of the image processing machine shown in FIG. 1.

In relation to the first scanning zone 10, there is provided first document scan moving means 29 including a movable document placing stand 30 disposed on the upper surface of the housing 2. With reference to FIGS. 1, 2 and 3, the movable document placing stand 30 includes a frame member 32, a transparent plate 34 and a document cover 36. As clearly shown in FIG. 3, the frame member 32 is constructed of a plate-like member extending longitudinally (in the left-right direction in FIG. 1 and in the direction perpendicular to the sheet surface in FIG. 3) along the rear part of the upper surface of the housing 2. The transparent plate 34 is rectangular, and its rear edge portion is fixed to the frame member 32. The document cover 36 is mounted on the frame member 32 via suitable mounting means so as to be free to pivot between a closed position shown by a solid line in FIG. 3 and an open position shown by a two-dot chain line in FIG. 3 about a pivot axis extending along the rear end portion of the document cover 36. A rectangular elastic member 40 is fixed to the under surface of the main portion of the document cover 36. The movable document placing stand 30 as a whole is mounted on the upper surface of the housing 2 so as to be free to reciprocate across the first scanning zone 10, namely in the longitudinal direction (the left-right direction in FIG. 1 and the direction perpendicular to the sheet surface in FIG. 3). More specifically, as clearly shown in FIG. 3, the frame member 32 is mounted longitudinally movably on the upper surface wall of the housing 2 via sliding means 42 which may be a sliding mechanism commercially available under the tradename "Aculide". A longitudinally extending guiding projection 44 is formed integrally in the front edge portion of the upper surface wall of the housing 2 and the front edge portion of the transparent plate 34 is supported slidably on the guiding projection 44. A forwardly projecting restraining member 46 is fixed to the front end portion (the left end portion in FIG. 3) of the projection 44. The restraining member 46 needs not extend over the entire length in the left-right direction in FIG. 1 (the direction perpendicular to the sheet surface in FIG. 3), and may extend over part of the entire length.

A longitudinally extending member 48 to be restrained is fixed to the front edge portion of the transparent plate 34. The member 48 may be made of an iron plate, an aluminum plate or a plastic plate. It projects forwardly from the transparent plate 34 and a nearly L-shaped downwardly extending portion is formed integrally at its front end. The horizontal free end portion of the downwardly extending portion of the member 48 is positioned opposite to, and below, the under surface of the free end of the restraining member 46. The restraining member 46 and the member 48 to be restrained cooperate with each other and prevent the front edge of the transparent plate 34 from being displaced upwardly when the movable document placing stand 30 moves longitudinally. Preferably, a low-friction member, such as a plastic tape having a low coefficient of friction, is adhered to the upper surface of the guiding projection 44 and the under surface of the free end of the restraining member 46. One example of the plastic tape is a plastic tape sold under the tradename "Bearee" by Toyo Bearing Co., Ltd.

With reference to FIGS. 1 and 2, the document cover 36 of the movable document placing stand 30 has box-like projecting portions 52 and 54 formed integrally in its left and front end portion and its left and rear end portion. Between the projecting portions 52 and 54 a left side surface 56 of the document cover 36 is inclined upwardly to the right from its lower end. The angle of inclination of the left side surface 56 may be about 25 to 35 degrees. A pair of width-restricting members 58 and 60 are mounted on the left side surface 56 so as to be free to move in the widthwise direction (the direction perpendicular to the sheet surface in FIG. 1). The width-restricting members 58 and 60 have restriction wall portions 62 and 64 which are upstanding from the left side surface 56. These width-restricting members 58 and 60 are interlocked with each other by a known interlocking mechanism (disposed beneath the document cover 36 but not shown), which may be comprised of racks annexed to the width-restricting members and a pinion gear interposed between the racks. Conveniently, the width-restricting members 58 and 60 are moved simultaneously in a direction in which they come closer to each other and in a direction in which they move away from each other. As will become clear from the description given hereinafter, the left side surface 56 and the pair of width-restricting members 58 and 60 function as a document insertion guiding passage for sheet-like documents to be conveyed through the second scanning zone 12. Furthermore, to the document cover 36 is fixed a sheet-like document supporting plate 66 having an upper surface which follows the left side surface 56 and extends inclinedly upwardly to the right.

The movable document placing stand 30 is connected to document placing stand reciprocating means 68 (FIG. 1), which may be an electric motor, via a suitable power transmission mechanism (not shown), and is moved, as is required, by the means 68.

In relation to the second scanning zone 12, second document scan moving means 70 is provided within the housing 2. The second document scan moving means 70 comprises a sheet-like document conveying passage 76 extending from a document insertion opening 72 formed in the left side portion of the upper surface wall of the housing 2 adjacent to the first scanning zone 10 to a document discharge opening 74 formed in the left side wall of the housing 2 across the second scanning zone 12 and sheet-like document conveying means for conveying a sheet-like document through the document conveying passage. As shown clearly in FIG. 2, the document insertion opening 72 and the document discharge opening 74 are of a slender shape extending in the widthwise direction. The sheet-like document conveying passage 76, from the document insertion opening 72 to the document discharge opening 74, is defined by inside guiding plates 78 and 80 and outside guiding plates 84, 86 and 88. The transparent plate defining the second scanning zone 12 is fixed to an opening formed in the inside guiding plate 78. The sheet-like document conveying means 76 includes driven rollers 90, 92, 94, 96 and 98 and follower rollers 100, 102 and 104 cooperating with the driven rollers 94, 96 and 98. An introducing member 106 cooperating with the driven roller 90 and a separating member 108 cooperating with the driven roller 92 are further provided. The introducing member 106 is formed of a flexible material such as a plastic film commercial available under the tradename "Lumirror", and its free end portion is pressed against the driven roller 90. The separation member 108, formed of synthetic rubber or the like having a high coefficient of friction, is contacted at its acting surface with the driven roller 92. To the left side wall of the housing 2 is detachably mounted a sheet-like document receiving tray 110 extending to the left, while being slightly upwardly inclined from below the document discharge opening 74. In relation to the upstream end portion and the downstream end portion of the sheet-like document conveying passage 76, there are provided a detector 112 for detecting the insertion of a sheet-like document into the sheet-like document conveying passage 76 and a detector 113 for detecting the discharge of the document from the document conveying passage 76. These detectors 112 and 113 may be microswitches having detecting arms projecting into the sheet-like document conveying passage 76.

The operation and advantage of the document scanning means 4 described above will now be described.

When one or more sheet-like documents are to be scanned, the second document scan moving means 70 can be used. In this case, a selection switch SS1 provided in an operating panel 114 (FIG. 2) disposed in the front portion of the upper surface of the housing 2 is depressed. As a result, the movable document placing stand 30 is held at a rest position shown in FIGS. 2 and 4. When the document placing stand 30 is held at the rest position, the document insertion opening 72 of the sheet-like document conveying passage 76 is not covered with the document placing stand 30 but is exposed to view, as clearly shown in FIG. 2. Moreover, the left side surface 56 (document insertion guiding passage) of the document cover 36 in the movable document placing stand 30 comes into alignment with the document insertion opening 72, and more specifically, the left side edge of the left side surface 56 matches, or approaches, the right side edge of the document insertion opening 72. Furthermore, when the selection switch SS1 is operated, the light path changing reflecting mirror 22 of the optical means 20 is held at the second position shown by a solid line in FIG. 4 (by the two-dot chain line in FIG. 1).

Figure 4:
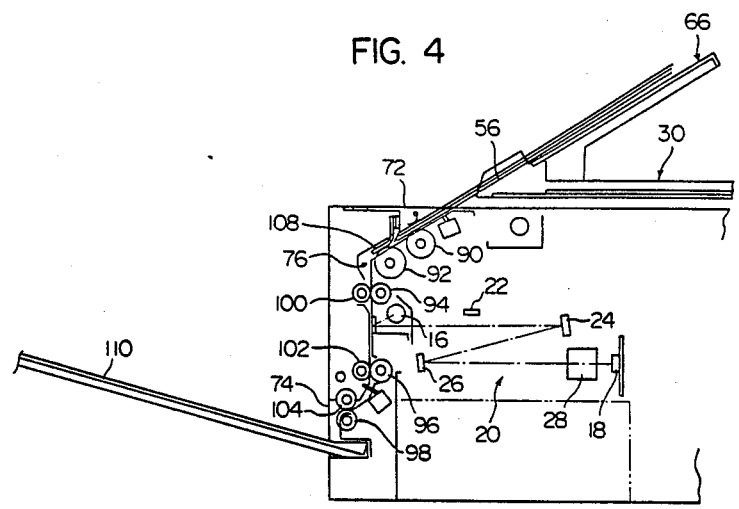
FIG. 4 is a simplified partial sectional view for illustrating one mode of using the document scanning means of the image processing machine shown in FIG. 1.

Then, the widthwise distance between the width-restricting members 58 and 60 provided in the left side surface 56 is set correspond the width of the document to be scanned. The document to be scanned is placed with its surface downward on the left side surface 56 and the sheet-like document supporting plate 66 between the pair of width-restricting members 58 and 60, and as shown in FIG. 4, inserted into the document conveying passage 76 through the document insertion opening 72 until its leading end portion comes to a predetermined position (a position upstream of the driven roller 92 and the separating member 108). Thereafter, a scan movement starting switch MS provided in the operating panel 114 (FIG. 2) is depressed. As a result, the driven rollers 90, 92, 94, 96 and 98 are driven as is required to deliver documents one by one, starting with the lowermost document, through the document conveying passage 76, and discharge them onto the receiving tray 110 from the document discharge opening 74. The separating member 108 prevents two or more documents from being conveyed at a time. While the document is being conveyed through the sheet-like document conveying passage 76, the second document illuminating means 16 in the second scanning zone 12 illuminates the surface of the document and the light reflected from the surface of the document is projected onto the image receiving means 18 via the first stationary reflecting mirror 24, the second stationary reflecting mirror 26 and the lens assembly 28. The image receiving means 18 produces an electrical signal in response to the projected light. This electrical signal is transmitted to a receiver when the image-processing machine is used as a facsimile machine, or fed into the image-forming means 6 (more specifically, its printing head) when it is used as a copying machine.

When the document to be scanned is not sheet-like, but is of another form such as a book, the second document scan moving means 70 cannot be used. The first document scan moving means 29, however, can be used not only when the document to be scanned is a sheet-like document but also when it is a book, for example. To use the first document scan moving means 29, a selection switch SS2 provided in the operating panel 114 (FIG. 2) is operated. As a result, the movable document placing stand 30 is held at a start-of-scan position shown in FIG. 1, and the light path changing reflecting mirror 22 of the optical means 20 is held at the first position shown by the solid line in FIG. 1. When the document placing stand 30 is held at the start-of-scan position, the document insertion opening 72 formed on the upper surface wall of the housing 2 is covered with the document placing stand 30. Then, the document cover 36 is pivoted to the open position shown by the two-dot chain line in FIG. 3 and the document is placed with its surface downward on a predetermined site of the transparent plate 34. The document cover 36 is then again returned to the closed position to cover the transparent plate 34 and the document placed on it. Then, the scan movement starting switch MS is operated, whereupon the movable document placing stand 30 is moved to a predetermined position to the left in FIG. 1 and then moved back to the start-of-scan position to the right in FIG. 1. During the movement of the document placing stand 30 to the left, the first document illuminating means 14 in the first scanning zone 10 illuminates the surface of the document on the transparent plate 34, and the light reflected from the surface of the document is projected onto the image receiving means 18 via the light path changing reflecting mirror 22, the first stationary reflecting mirror 24, the second stationary reflecting mirror 26 and the lens assembly 28. The image receiving means 18 produces an electrical signal according to the light projected.

Modified Embodiment I Relating to Movable Document Placing Stand

FIGS. 5 to 9 illustrate a modified embodiment relating to the movable document placing stand.

Figure 5:
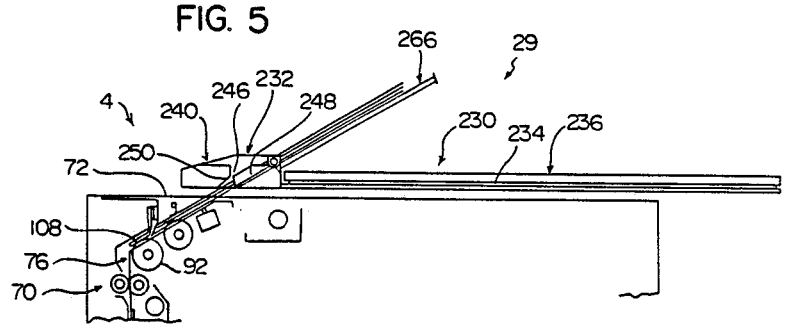
Figure 6:
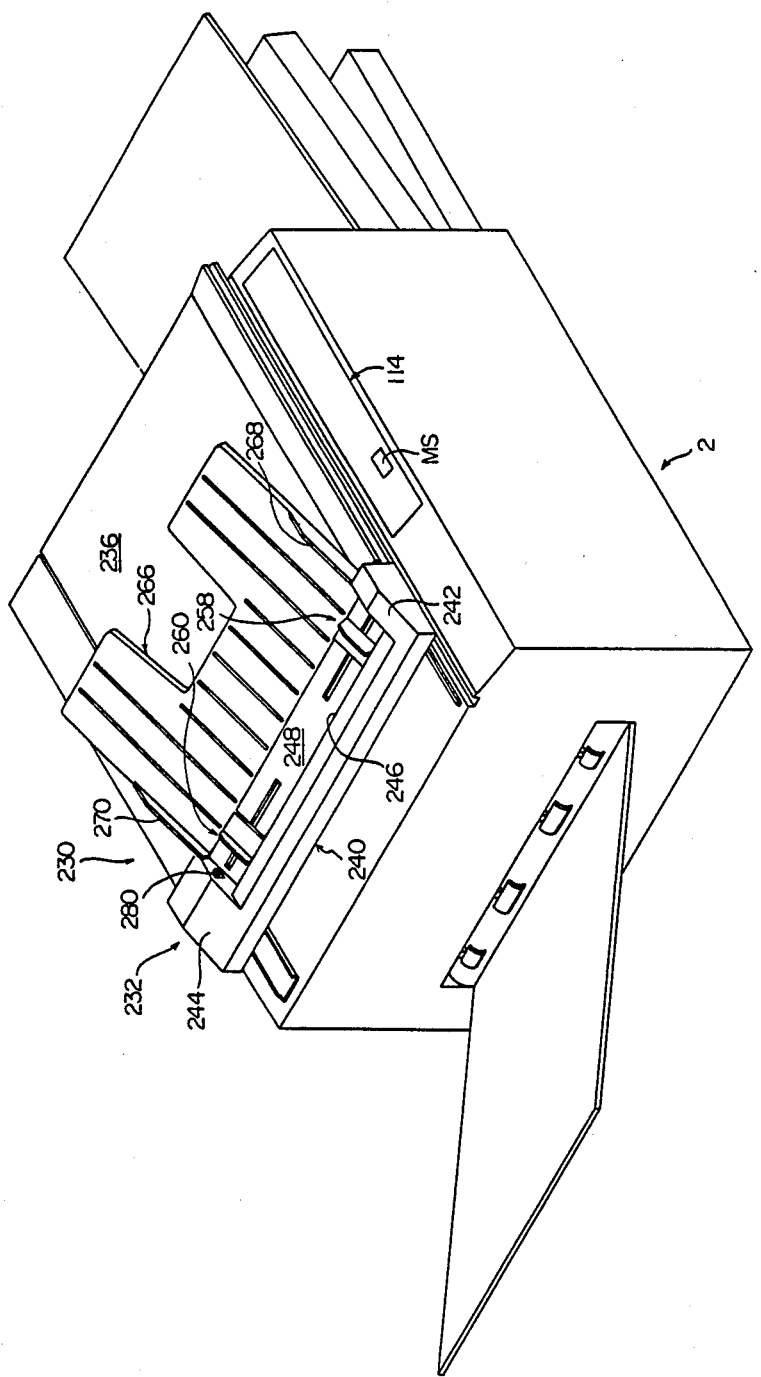

With reference to FIGS. 5 and 6, the movable document placing stand generally shown at 230 includes a frame 232, a transparent plate 234 and a document cover 236. The frame 232 has a plate-like portion (see FIG. 3 also) extending longitudinally (in the left-right direction in FIG. 5) along the rear portion of the upper surface of the housing 2 and sheet-like document insertion guiding portion 240 formed integrally with the plate-like portion and extending laterally (in the direction perpendicular to the sheet surface in FIG. 5) along the left side portion of the document stand 230. Box-like projecting portions 242 and 244 are provided in the front end portion and the rear end portion respectively of the insertion guiding portion 240. Between the box-like projecting portions 242 and 244 is formed an elongate insertion opening 246 extending in the widthwise direction in the insertion guiding portion 240. An inclined wall 248 is formed which extends inclinedly to the right and upwardly from the right side edge of the insertion opening 246. The angle of inclination of the inclined wall 248 may be about 25 to 30 degrees. As shown in FIG. 5, in the left side of the insertion opening 246 is formed a wall 250 which extends nearly parallel to the inclined wall 248 from the left side edge of the insertion opening 246 upwardly and inclinedly to the right and then extends upwardly in a substantially vertical fashion. A pair of width regulating members 258 and 260 corresponding to the pair of width regulating members 58 and 60 in the movable document placing stand shown in FIG. 2 are mounted on the inclined wall 248 so as to be free to move in the widthwise direction. The insertion opening 246, the inclined wall 248 and the pair of width regulating members 258 and 260 function as a document insertion guiding path.

Figure 7:
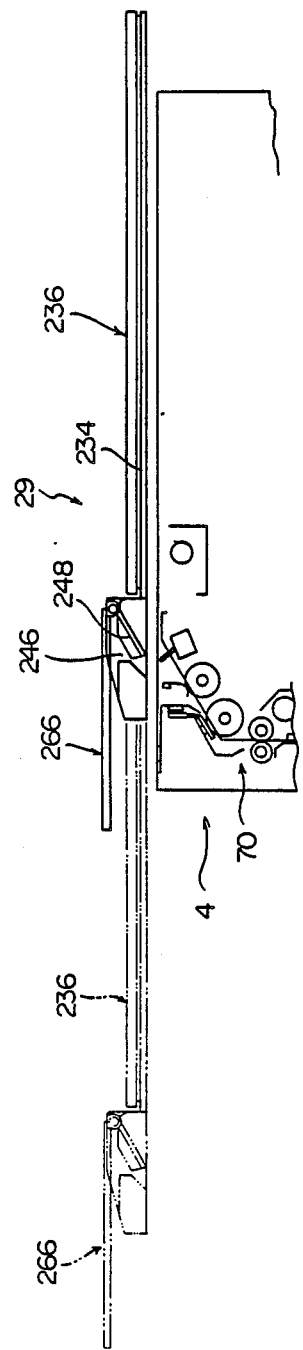
Figure 8:
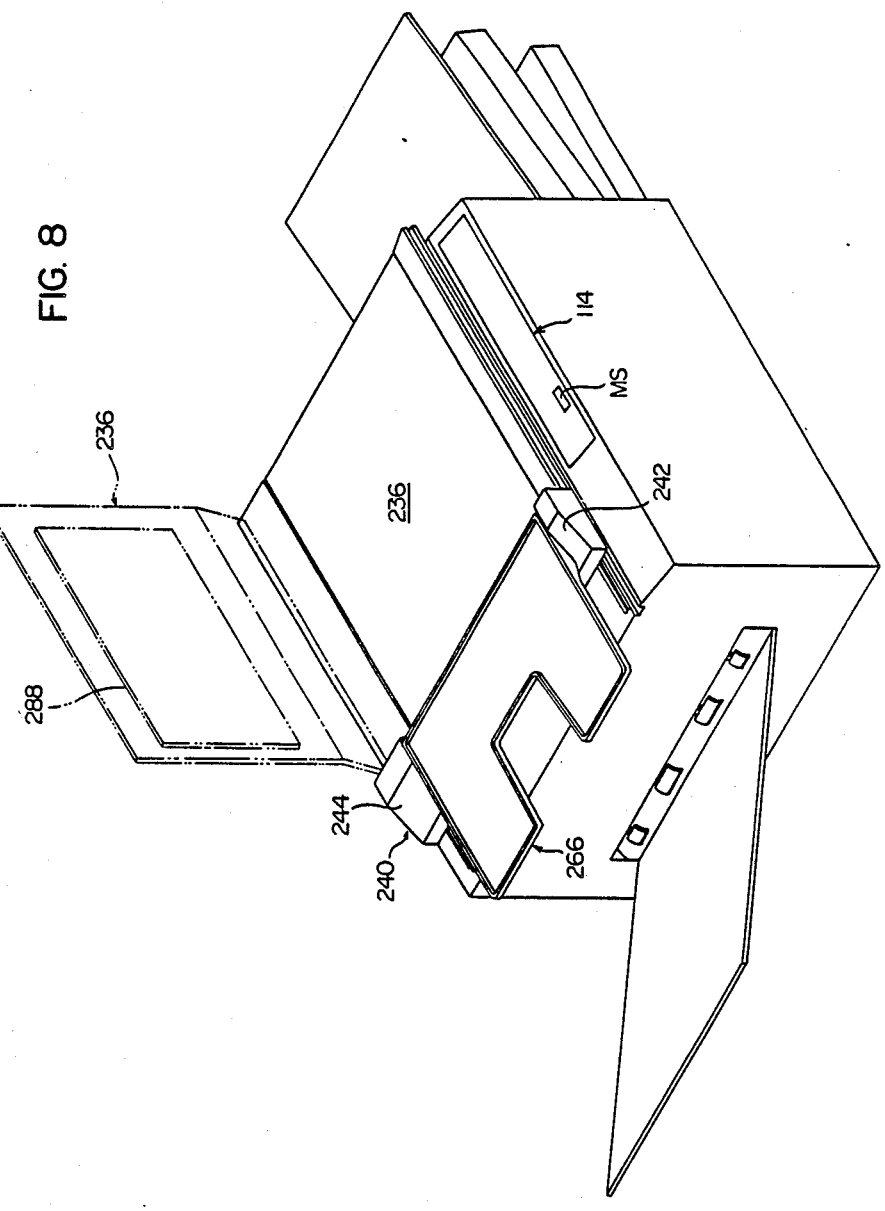

Further, between the box-like protruding portions 242 and 244 is mounted a sheet-like document supporting plate 266 so as to be free to pivot between an operative position shown in FIGS. 5 and 6 and by a solid line in FIG. 9 and an in-operative position shown in FIGS. 7 and 8 and by a two-dot chain line in FIG. 9. It will be appreciated by reference to FIGS. 6 and 9 that upstanding pieces 268 and 270 are formed integrally on the two side edges of the front end portion (the left end portion) of the sheet-like document supporting plate 266, and by mounting short rods formed on the outside surfaces of the upstanding pieces 268 and 270 on the upstanding inside walls of the box-like projecting portions 242 and 244, the sheet-like document supporting plate 266 is mounted between the box-like projecting portions 242 and 244. As clearly shown in FIG. 9, a downwardly extending piece 272 is formed in the front end (left end) of the sheet-like document supporting plate 266, and an abutting wall 274 extending to the right and downwardly inclinedly is formed in the sheet-like document insertion guiding portion 240. When the sheet-like document supporting plate 266 is brought to the operative position, the downwardly extending piece 272 abuts with the abutting wall 274 thereby to hamper further pivoting of the document supporting plate 266 in the clockwise direction in FIG. 9 and the sheet-like document supporting plate 266 is held at the operative position. When the document supporting plate 266 is held at the operative position, its upper surface follows the upper surface of the inclined wall 248 and extends upwardly to the right, as will be seen from FIGS. 5 and 6. On the other hand, when the document supporting plate 266 is brought to the inoperative position, the upstanding pieces 268 and 270 of the sheet-like document supporting plate 266 abut with the upper surface of the left side portion of the document insertion guiding portion 240 to hamper further pivoting of the document supporting plate 266 in the counterclockwise direction in FIG. 9, and the supporting plate 266 is held at the inoperative position. When the document supporting plate 266 is held at the inoperative position, the document insertion guiding path defined by the insertion opening 246, the inclined wall 248 and the pair of width regulating members 358 and 260 is covered with the sheet-like document supporting plate 266.

With reference to FIG. 9, a lever member 278 is pivotally set up by a pin 276 within the box-like projecting portion 244. One end portion (upper end portion) 280 of the lever member 278 extends forwardly in the widthwise direction, passes through an opening formed in the upstanding inside wall of the box-like projecting portion 244, and projects forwardly thereof, as shown in FIG. 6. A tension spring 282 is stretched between the lever member 278 and the upper wall of the box-like projecting portion 244. The tension spring 282 elastically biases the lever member 278 counterclockwise and holds it at a position shown by the solid line. On the other hand, an opening 284 is formed in the upper surface wall of the housing 2, and a detector 286, which may be a microswitch, is disposed within the housing 2 in correspondence to the opening 284. When the sheet-like document supporting plate 266 is held at the operative position, the lever member 278 is held at the position shown by the solid line by the elastic biasing action of the tension spring 282. In this state, the other end portion 289 (lower end portion) of the lever member 278 gets into the opening 284 to close the detector 286. On the other hand, when the sheet-like document supporting plate 266 is held at the inoperative position shown by a two-dot chain line, the upstanding piece 270 of the document supporting plate 266 abuts with the one end portion 280 of the lever member 278 and pivots the lever member 278 clockwise to a position shown by the two-dot chain line against the elastic biasing action of the tension spring 282. As a result, the other end portion 289 of the lever member 278 moves away upwardly from the opening 284 to release the detector 286 and thereby permit movement of the movable document placing stand 230. In other words, when the detector 286 is closed, movement of the document placing stand 230 is electrically hampered.

With reference to FIG. 8, the rectangular document cover 236 is disposed on the right of the insertion guiding portion 240, and mounted on the plate-like portion of the frame 232 via suitable mounting means in such a manner that it is free to pivot between a closed position shown by the solid line and an open position shown by the two-dot chain line about a pivot axis extending along its rear edge portion. A rectangular elastic member 288 is fixed to the under surface of the document cover 236. It will be understood by reference to FIGS. 5 and 6 together with FIGS. 7 and 8 that when the sheet-like document supporting plate 266 is held at the inoperative position, the document cover 236 can be freely opened or closed without being interfered by the document supporting plate 266, but that when it is held at the operative position, it interferes with the pivoting of the document cover 236 from the closed position toward the open position.

The rectangular transparent plate 234, like the transparent plate 34 in the document placing stand 30 shown in FIGS. 1 to 4, is fixed at its rear edge portion to the plate-like portion of the frame member 232. The movable document placing stand 230 as a whole is mounted on the upper surface wall of the housing 2 so as to be free to move in the left-right direction in FIGS. 5 and 6 by substantially the same method as in the case of the document placing stand 30 shown in FIGS. 1 to 4, and can be moved by the reciprocating means 68 (FIG. 1).

When the second document scan moving means 70 is to be used in the document scanning means 4 provided with the movable document placing stand 230 described above, the document placing stand 230 is held at a stop position shown in FIGS. 5 and 6 (which corresponds to the start-of-scan position). It will be appreciated by reference to FIG. 5 that in this state the insertion opening 246 formed in the insertion guiding portion 240 is kept in alignment with the document insertion opening 72 (see FIG. 2 also) formed in the upper surface wall of the housing 2. The sheet-like document supporting plate 266 is held at the operative position shown in FIGS. 5 and 6. Accordingly, the detector 286 (FIG. 9) is closed, and the movable document placing stand 230 cannot be moved by the reciprocating means 68 (FIG. 1). The operator is accordingly prevented from undergoing injury when he moves the document placing stand 230 while inserting his hand into the document insertion hole 24 in the housing 2 through the insertion opening 246 formed in the insertion guiding portion 240. It is also possible to prevent a sheet-like document from being damaged when the movable document placing stand 230 is moved while the document is inserted in the insertion opening 240 or the document insertion opening 72.

Then, as in the case of the movable document placing stand 30 shown in FIGS. 1 to 4, the widthwise distance between the width regulating members 258 and 260 is set at a value corresponding to the width of the sheet-like document. The document to be scanned is placed with its surface downward on the inclined wall 248 and the sheet-like document supporting plate 266 between the pair of width regulating members 258 and 260, and inserted into the sheet-like document conveying passage 76 through the insertion opening 246 and the document insertion opening 72 so that its leading end portion reaches a predetermined position (upstream of the driven roller 92 and the separating member 108). Thereafter, the scan movement starting switch MS in the operation panel 114 (FIG. 6) is operated to start to convey the document.

When the first document scan moving means 29 is to be used, the sheet-like document supporting plate 266 is held at the inoperative position shown in FIGS. 7 and 8. This results in covering of the document insertion guiding passage defined by the insertion opening 246, the inclined wall 248 and the width regulating members 258 and 260 with the sheet-like document supporting plate 266. This can prevent erroneous insertion of a document or the operator's hand into the document insertion guiding passage. The detector 286 (FIG. 9) is released, and the movable document placing stand 230 is in condition for movement.

Then, the document cover 236 is pivoted to the open position shown by the two-dot chain line in FIG. 8 and the document is placed with its surface downward at a predetermined position on the transparent plate 234. If at this time the sheet-like document supporting plate 266 is at the operative position, the supporting plate 266 interferes with the opening movement of the document cover 236. Accordingly, it is possible to surely prevent opening movement of the document cover 236 while the sheet-like document supporting plate 266 is not held at the inoperative position. The scan movement start switch MS is then depressed whereby the movable document placing stand 230 is moved, for example, to the position shown by a two-dot chain line in FIG. 7 and then moved back to the position shown by a solid line in FIG. 7.

Modified Embodiment II Relating to Movable Document Placing Stand

Figure 11:
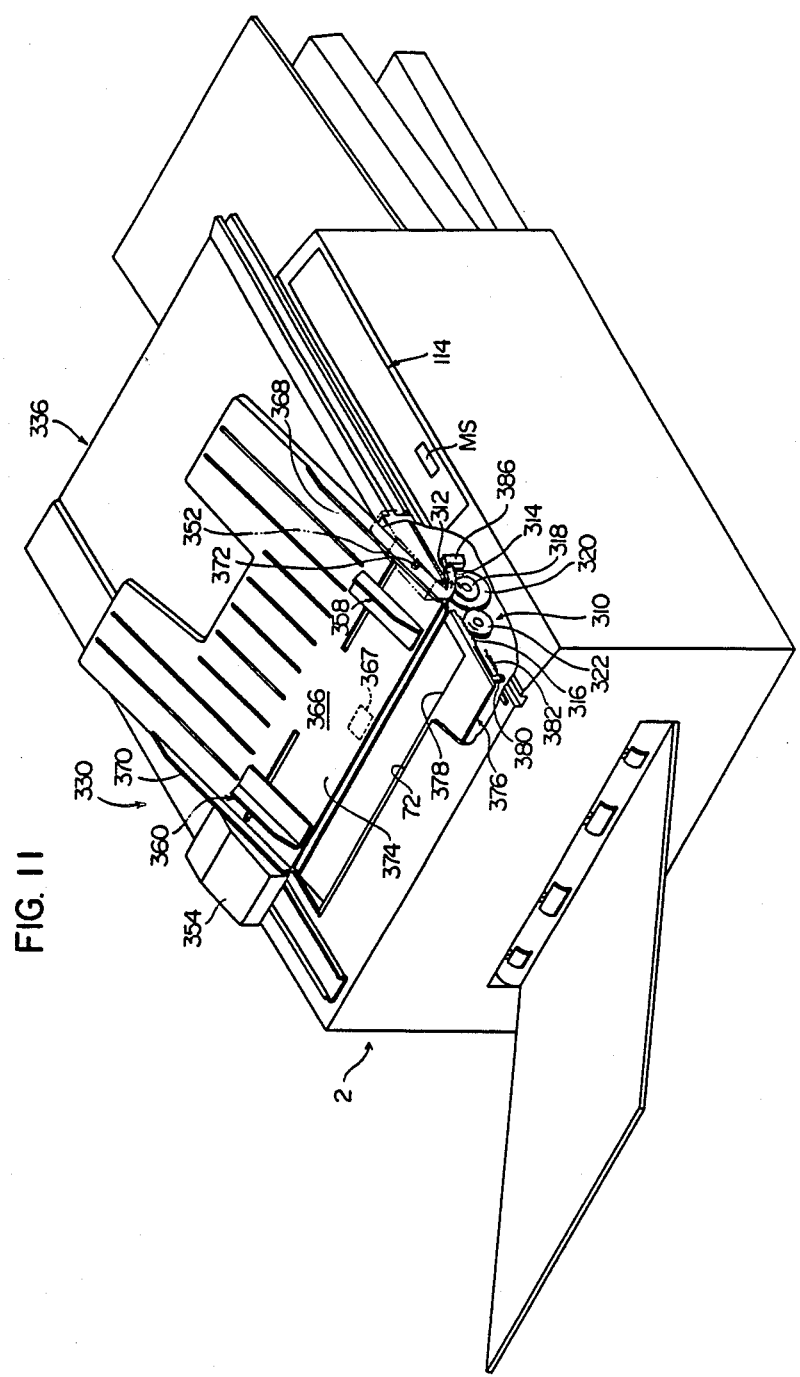
Figure 12:
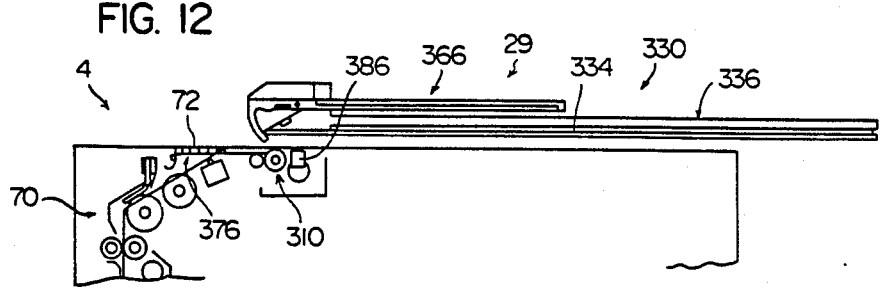

FIGS. 10 to 12 show another modified embodiment relating to the movable document placing stand. This modified embodiment has resulted from making the following changes or modifications in the embodiment shown in FIGS. 1 to 4.

With reference to FIGS. 10 to 12, particularly FIG. 11, in the movable document placing stand shown generally at 330, a sheet-like document supporting plate 366 is mounted between box-like projecting portions 352 and 354 formed in a document cover 336 in such a manner that it is free to pivot between an operative position shown in FIGS. 10 and 11 and an inoperative position shown in FIG. 12. More specifically, upstanding pieces 368 and 370 are formed integrally on the two side edges of the document supporting plate 366, and short rods 372 (FIG. 11 shows only the sort rod 372 formed in the upstanding piece 368) are formed on the outside surfaces of the upstanding pieces 368 and 370. The sheet-like document supporting plate 366 is mounted between the box-like projecting portions 352 and 354 by securing these short rods 372 pivotally to the upstanding inside walls of the box-like projecting portions 352 and 354. The document supporting plate 366 extends to a site abutting with the upper surface wall of the housing 2 when it is held at the operative position shown in FIGS. 10 and 11. A pair of width regulating members 358 and 360 corresponding to the pair of width regulating members 58 and 60 in the movable document placing stand 30 shown in FIG. 2 are mounted for free widthwise movement on the forward extending portion 374 of the document supporting plate 366. Accordingly, in the modified embodiment shown in FIGS. 10 to 12, the upper surface of the forward extending portion 374 of the document supporting plate 366 and the pair of width regulating members 358 and 360 define a document insertion guiding passage. A magnetic member 367 such as an iron plate is embedded in the under surface of the forward extending portion of the document supporting plate 366, and a permanent magnet 369 is embedded at a corresponding site in the document cover 336. When the document supporting plate 366 is brought to the operative position shown in FIGS. 10 and 11, the magnetic member 367 is attracted to the permanent magnet 369 to hamper further counterclockwise rotation of the document supporting plate 366 in FIG. 10. The document supporting plate 366 is thus held at the operative position. When the document supporting plate 366 is held at the inoperative position shown in FIG. 12, the under surface of the rear portion of the document supporting plate 366 abuts with the upper surface of the main portion of the document cover 336 to hamper further clockwise pivoting of the document supporting plate 366 in FIG. 12. The document supporting plate 366 is held at the inoperative position.

An opening-closing member 376 is mounted by suitable mounting means under the upper surface wall of the housing 2 so that it is free to move substantially horizontally between ann open position shown in FIGS. 10 and 11 and a closed position shown in FIG. 12. As clearly shown in FIG. 11, the opening-closing member 376 is comprised of a plate-like member having formed in its right half a rectangular notch 378 of a shape corresponding to the document insertion opening 72 formed in the upper surface wall of the housing 2. When the opening-closing member 376 is held at the open position, the notch 378 is in alignment with the document insertion opening 72, and therefore, the document insertion opening 72 remains open. When the opening-closing member 376 is held at the closed position, the left half of the opening-closing member 376 is in alignment with the document insertion opening 72 to close it. Downwardly extending pieces 380 are formed at both side edges of the opening-closing member 376, and to each of these downwardly extending pieces 380 is connected one end of a tension spring 382 having the other end fixed to a suitable site within the housing 2. (FIG. 11 shows only one downwardly extending piece 380 and one tension spring 382.) The tension springs 382 elastically bias the opening-closing member 376 to the above closed position.

Further with reference to FIG. 11, interlocking means shown generally at 310 is disposed between the sheet-like document supporting plate 366 and the opening-closing member 376. An arcuate piece 312 extending from the front edge of the forward end of the document supporting plate 366 is formed integrally with the supporting plate 366. An input rack 314 is formed on the outer circumferential surface of the arcuate piece 312, and an output rack 316 is formed in the front edge part of the right half of the opening-closing member 376. Within the housing 2, gears 318, 320 and 322 are rotatably mounted. The gears 318 and 320 rotate as a unit, and the gear 320 is in mesh with the gear 322. The gear 322 is in mesh with the output rack 316. It will be understood by comparing FIG. 12 with FIGS. 10 and 11 that when the document supporting plate 366 is pivoted from the inoperative position shown in FIG. 12 to the operative position shown in FIGS. 10 and 11, the input rack 314 comes into mesh with the gear 314 and rotates it in the latter half of the pivoting movement, and that the pivoting movement of the document supporting plate 366 is transmitted to the opening-closing member 376 via the input rack 314, the gears 318, 320 and 322 and the output rack 316 to move the opening-closing member 376 from the closed position to the open position. When the document supporting plate 366 is pivoted from the operative position to the inoperative position, the input rack 314 is in mesh with the gear 318 in the first half of this pivoting movement. Hence, the pivoting movement of the document supporting plate 366 is transmitted to the opening-closing member 376 via the input rack 314, the gears 318, 320 and 322 and the output rack 316 to move the opening-closing member 376 from the open position to the closed position.

As clearly shown in FIG. 11, a detector 386, which may be a microswitch, is also provided within the housing 2. When the document supporting plate 366 is held at the inoperative position, the detector 386 is released. When it is held at the operative position, the free end of the arcuate piece 312 formed in it acts on the detector 386 to close it. While the detector 386 is released, the movable document placing stand 330 can be moved, but when it is closed, the movement of the movable document placing stand 330 is electrically hampered.

When the second document scan moving means 70 is used in the document scanning means 4 provided with the movable document placing stand 330 described above, the stand 330 is held at the stop position shown in FIGS. 10 and 11 (which is identical with the start-of-scan position), and the document supporting plate 366 is held at the operative position shown in FIGS. 10 and 11. In this state, the document supporting plate 366 extends upwardly, and is inclined to the right, from its forward end located at or near the right side edge of the document insertion opening 72 formed in the upper surface wall of the housing 2. The angle of inclination of the upper surface of the document supporting plate 366 may be about 25 to 35 degrees. When the document supporting plate 366 is held at the operative position, the detector 386 is closed to make it impossible to move the document placing stand 330 by the reciprocating means 68 (FIG. 1). Accordingly, the operator's hand is accurately prevented from undergoing injury when the operator moves the document placing stand 330 while his hand is inserted in the document insertion opening 72. Furthermore, the sheet-like document is accurately prevented from being damaged when the document placing stand 330 is moved while the document is inserted in the document insertion opening 72.

Thereafter, as in the case of the movable document placing stand 30 shown in FIGS. 1 to 4, the widthwise distance between the pair of width regulating members 358 and 360 is set at a value corresponding to the width of the sheet-like document to be scanned. The document to be scanned is placed with its surface downward on the document supporting plate 366 between the width regulating members 358 and 360, and inserted into the document conveying passage 76 through the document insertion opening 72 until its leading end reaches a predetermined position (upstream of the driven roller 92 and the separating member 108). Then, the scan movement starting switch MS in the operating panel 114 (FIG. 11) is depressed to start conveying of the document.

When the first document scan moving means 29 is to be used, the document supporting plate 366 is brought to the inoperative position shown in FIG. 12. As a result, the opening-closing member 376 is moved to the closed position to close the document insertion opening 72. Hence, the insertion of a document or the operator's hand into the document insertion opening 72 by error can be prevented. Moreover, the detector 386 is open and the document placing stand 330 is in condition for movement.

Then, the document cover 336 is opened, and the document is placed with its surface downward at a predetermined position on the transparent plate 334. The document cover 336 is then returned to the closed position, and the scan movement starting switch MS is depressed. As a result, the movable document placing stand 330 is moved to the left in FIG. 12 to a predetermined position and moved back to the position shown in FIG. 12.

Modified Embodiment III Relating to the Movable Document Placing Stand

FIGS. 13 to 16 and 17-A and 17-B show still another modified embodiment relating to the movable document placing stand. This modified embodiment result from making the following changes or modifications in the embodiment illustrated in FIGS. 1 to 4.

Figure 15:
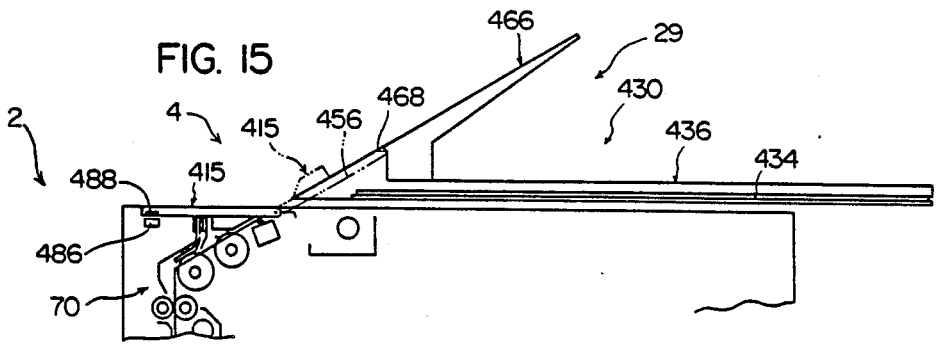

As clearly shown in FIGS. 15 and 16, in the movable document placing stand 430, an inclined left side surface 456 existing between box-like projecting portions 452 and 454 formed in a document cover 436 is not on the same plane as the inclined upper surface of a sheet-like document supporting plate 466 fixed to its rear (right side), but is displaced downward by a predetermined amount with respect to the inclined upper surface of the document supporting plate 466. Hence, a stepped portion 468 exists between the inclined upper surface of the document supporting plate 466 and the inclined left side surface 456.

Figure 14:
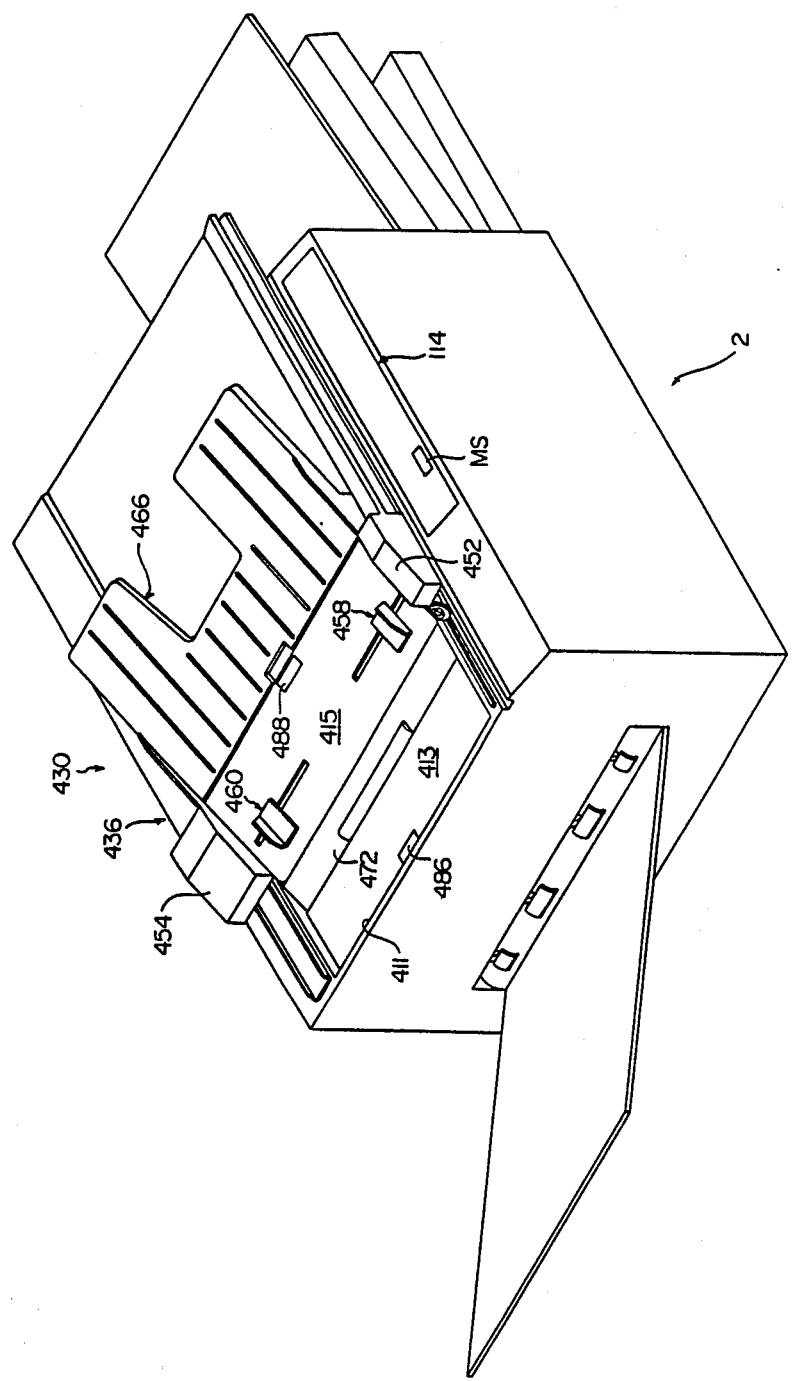

As clearly shown in FIGS. 14 and 16, a relatively large rectangular opening 411 is formed in the left side part of the upper surface wall of the housing 2. A plate-like member 413 located beneath the upper surface wall of the housing 2 by a predetermined distance projects to the right from the left side wall of the housing 2. The plate-like member 413 is formed integrally with the left side wall of the housing 2, or may be separately formed and fixed at a predetermined position. The free edge, or the right side edge, of the plate-like member 413 is spaced to the left a predetermined distance from the right side edge of the opening 411, and therefore, the right side part of the opening 411 is open without being closed by the plate-like member 413. This open part of the opening 411 defines a document insertion opening 472. A sheet-like document guiding member 415 is mounted on the upper surface of the housing 2 so as to be free to move between an operative position shown by a solid line in FIG. 16 and an inoperative position shown by a two-dot chain line in FIG. 16. The sheet-like document guiding member 415 may be in the form of a thin-walled box. The method of mounting the document guiding member 415 will be described with reference to FIG. 16. A short rod 417 projecting inwardly is formed in both the front portion and the rear portion of the inside of the housing 2. An elongate slot 419 is formed in each of the front wall and the rear wall of the document guiding member 415. By inserting the short rods 417 into the slots 419, the document guiding member 415 is mounted on the short rods 417. A protrusion 421 is formed in each of the front wall and the rear wall of the document guiding member 415, and spring means 423, which may be a tension coil spring, is stretched between each protrusion 421 and each short rod 417. As clearly shown in FIGS. 17-A and 17-B, one end surface 425 of the document guiding member 415 is formed in an arcuate shape, and correspondingly to it, a receiving portion 437 having an arcuate part 429, a straight line part 431, a straight line part 433 and an arcuate part 435 is formed in a front upstanding base plate and a rear upstanding base plate disposed within the housing 2. The receiving portion 437 functions as a locking means for releasably locking the document guiding member 415 in the operative position and the inoperative position. When the document guiding member 415 is held at the operative position, the arcuate end surface 425 of the document guiding member 415 is received in the arcuate part 429 of the receiving portion 437, and a flat surface 439 following the end surface 425 abuts with the straight line part 431 of the receiving portion 437. Since the flat surface 439 and the straight line part 431 exist below the short rod 417, the abutting of the flat surface 439 with the straight line part 431 hampers the counterclockwise pivoting of the document guiding member 415 about the short rod 417 in FIG. 17-A. On the other hand, the clockwise pivoting of the document guiding member 415 is hampered by abutting with the inclined left side surface 456 of the document cover 438, as can be understood from FIG. 16. Thus, the document guiding member 415 is locked in the operative position. The document guiding member 415 may be brought from the operative position to the inoperative position by moving the document guiding member 415 upwardly to the right against the elastic biasing action of the spring means 423, as shown by a two-dot chain line in FIG. 17-A, to move the flat surface 439 away from the straight line part 431, and thereafter pivoting the document guiding member counterclockwise. When the document guiding member 415 is held at the inoperative position as shown in FIG. 17-B, the document guiding member 415 is forced toward the right by the elastic biasing action of the spring member 423. Consequently, its arcuate end surface 425 is received in the arcuate part 435 of the receiving portion 437, and a flat surface 441 following the end surface 425 abuts with the straight line part 433 of the receiving portion 437. Since the flat surface 441 and the straight line part 433 are to the right of the short rod 417, the abutting of the flat surface 441 with the straight line part 433 hampers the clockwise pivoting of the document guiding member 415 about the short rod 417 in FIG. 17-B. On the other hand, the counterclockwise pivoting of the document guiding member 415 is hampered by abutting with the plate-like member 413, as can be understood from FIG. 16. Thus, the document guiding member 415 is locked in the inoperative position. The document guiding member 415 may be brought from the inoperative position to the operative position by moving the document guiding member 415 to the left against the elastic biasing action of the spring means 423, as shown by a two-dot chain line in FIG. 17-B, to move the flat surface 441 away from the straight line part 433, and then pivoting the document guiding member 415 clockwise.

Figure 13:
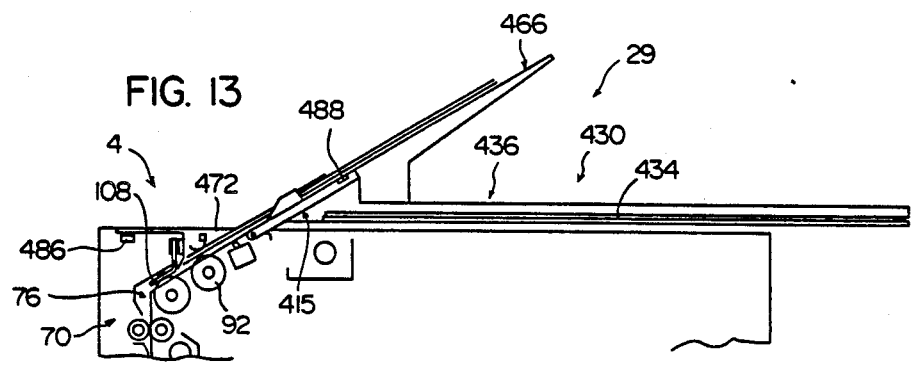

It will be appreciated by reference to FIGS. 13 and 14, which show the document guiding member 415 as it is held at the operative position, that when the document guiding member 415 is held at the operative position, its upper surface is substantially on the same plane as the inclined upper surface of the document supporting plate 466 extending rearwardly thereof (on the right hand side thereof). As shown in FIG. 14, a pair of width regulating members 458 and 460, which correspond to the pair of width regulating members 58 and 60 in the movable document placing stand 30 illustrated in FIG. 2, are mounted movably in the widthwise direction on the upper surface of the document guiding member 415. In this modified embodiment, the upper surface of the document guiding member 415 held at the operative position and the pair of width regulating members 458 and 460 define a document insertion guiding passage.

On the other hand, as can be seen by reference to FIGS. 15 and 16, when the document guiding member 415 is held at the inoperative position, a document insertion opening 472 in the upper surface wall of the housing 2 is covered with the document guiding member 415. Since the document guiding member 415 does not project upwardly beyond the upper surface wall of the housing 2, the movable document placing stand 430 can move back and forth in FIG. 15 over the document guiding member 415 without being interfered with by the guiding member 415.

As FIGS. 14 and 16 clearly show, a detector 486, which may be a reed switch, is embedded in the plate-like member 413. An actuator 488, which may be a magnet, is embedded in the document guiding member 415. When the document guiding member 415 is at the operative position, the detector 486 is released. But when the document guiding member 416 is held at the inoperative position, the detector 486 is closed by the actuator 488. When the detector 486 is released, movement of the movable document placing stand 430 is electrically hampered, and when the detector 486 is closed, the movable document placing stand 430 is in condition for movement.

When the second document scan moving means 70 is used in the document scanning means provided with the movable document placing stand 430 described above, the document placing stand 430 is held at the stop position shown in FIGS. 13 and 14 (which is identical with the start-of-scan position). The sheet-like document guiding member 415 is held at the operative position shown in FIGS. 13 and 14. In this state, the upper surface of the document guiding member 415 and the upper surface of the document supporting plate 466, which are substantially on the same plane, extend upwardly and are inclined to the right from their front ends, located at or near the right side edge of the document insertion opening 472 formed in the upper surface wall of the housing 2. The angles of inclination of the upper surface of the document guiding member 415 and the upper surface of the document supporting plate 466 may be about 25 to 35 degrees. When the document guiding member 415 is held at the operative position, the detector 486 is released, and therefore the movable document placing stand 430 cannot be moved by the reciprocating means 68. Accordingly, the operator's hand can be accurately prevented from undergoing injury when the operator moves the document placing stand 430 while his hand is inserted in the document insertion opening 472. Moreover, a sheet-like document can be accurately prevented from being damaged when the movable document placing stand 430 is moved while the document is inserted in the document insertion opening 472.

Then, as in the case of the movable document placing stand 30 illustrated in FIGS. 1 to 4, the widthwise distance between the pair of width regulating members 458 and 460 is set at a value corresponding to the width of the sheet-like document to be scanned. The document to be scanned is placed with its surface downward on the document guiding member 415 and the document supporting plate 466 between the pair of width regulating members 458 and, 460, and as shown in FIG. 13, is inserted into the sheet-like document conveying passage 76 through the document insertion opening 472 until its leading end portion reaches a predetermined position (upstream of the driven roller 92 and the separating member 108). Thereafter, the scan movement starting switch MS in the operating panel 114 (FIG. 14) is depressed to start conveying of the document.

When the first document scan moving means 29 is to be used, the document guiding member 415 is held at the inoperative position shown in FIG. 15. As a result, the document insertion opening 472 is covered with the document guiding member 415. Hence, the insertion of a document or the operator's hand in the document insertion opening 472 by error can be prevented. Furthermore, the detector 486 is closed to permit movement of the movable document placing stand 430.

Then, the document cover 436 is opened and the document is placed with its surface downward at a predetermined position on the transparent plate 434. The document cover 436 is then returned to the closed position. The document guiding member 415 is held at this time at the inoperative position but at the operative position, so the document guiding member 415 interferes with the opening movement of the document cover 430. Therefore, the operator is accurately prevented from opening the document cover 436 while forgetting to hold the document guiding member 415 at the inoperative position. Thereafter, the scan movement starting switch MS is operated. As a result, the movable document placing stand 430 is moved to the left in FIG. 15 to a predetermined position and then moved back to the position shown in FIG. 15.

Opening of the Sheet-like Document Conveying Passage

Figure 18:
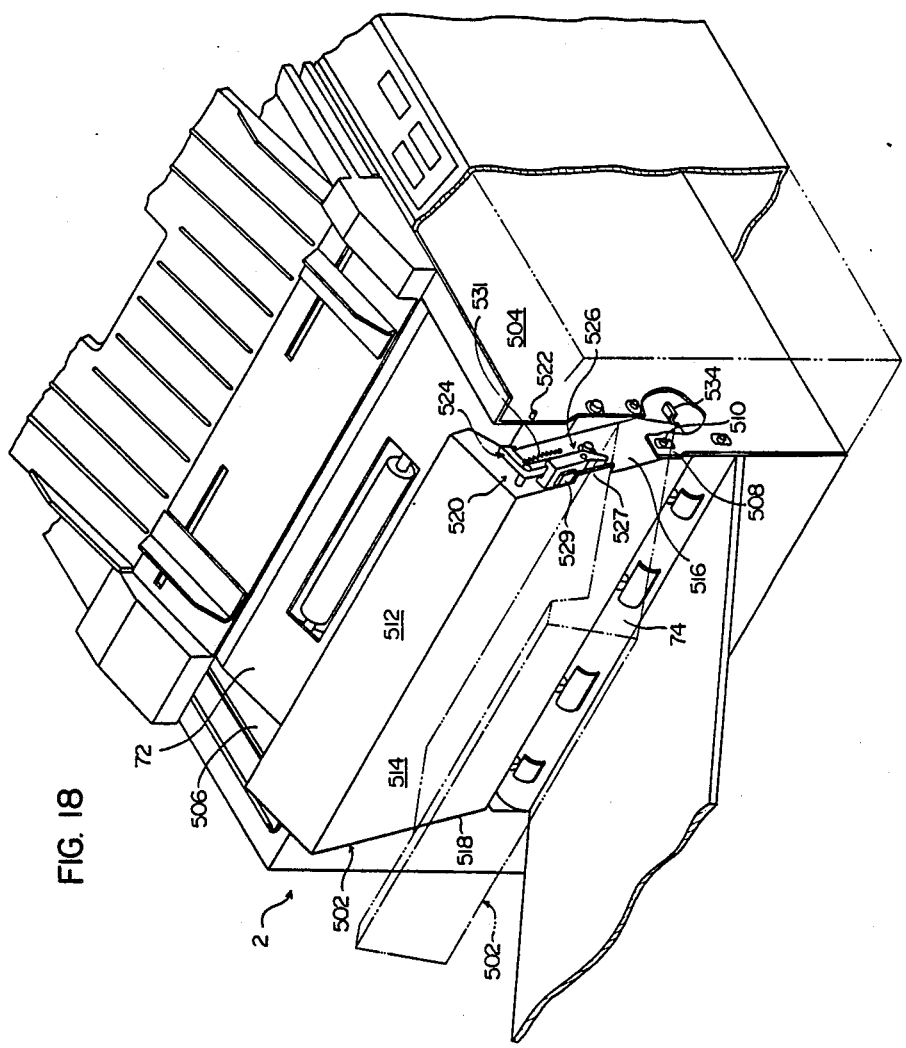
FIG. 18 is a perspective view showing the mode of opening a sheet-like document conveying passage in a document scanning means in the image processing machine shown in FIG. 1.
Figure 19:
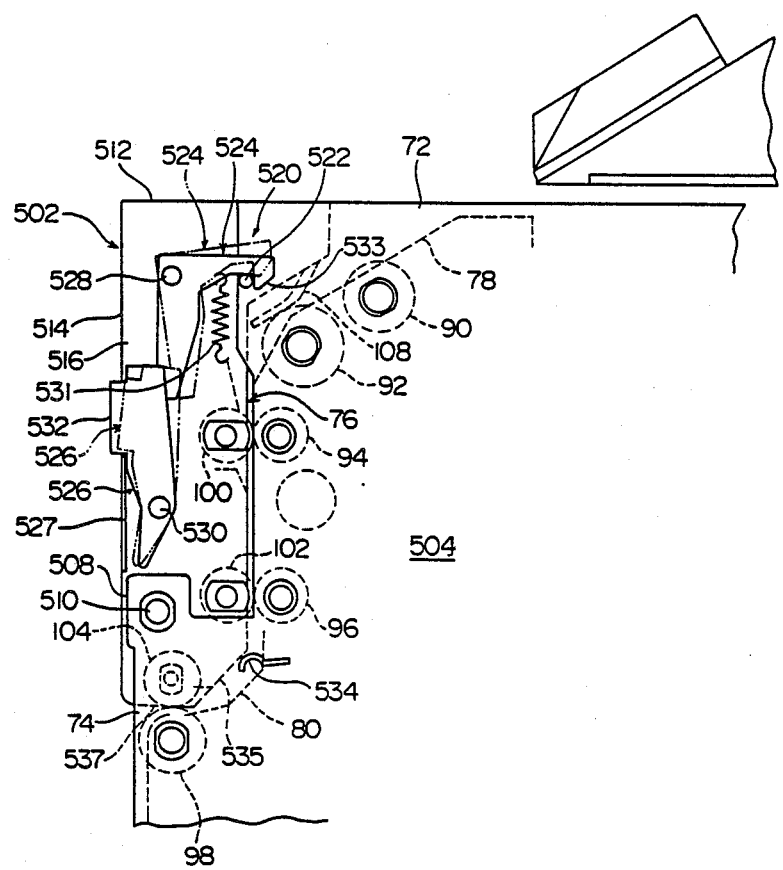
FIGS. 19 and 20 are partial sectional views showing the sheet-like document conveying passage of the document scanning means in the image processing machine shown in FIG. 1, in a closed and an open state, respectively.
Figure 20:
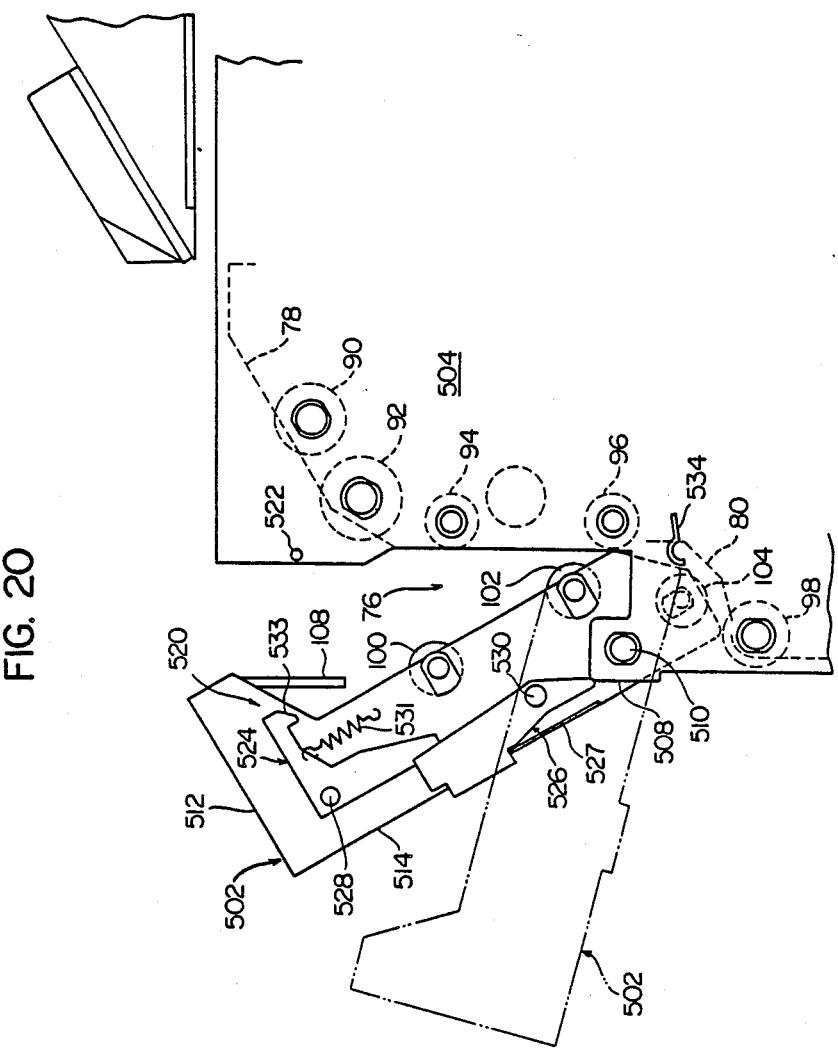

The sheet-like document conveying passage 76 in the document scanning means 4 described with reference to FIG. 1 is constructed so as to be opened as required. With reference to FIGS. 18 to 20, the housing 2 includes a movable frame member 502. As shown in FIG. 18, the housing 2 has a front upstanding base plate 504 and a rear upstanding base plate 506 provided with a predetermined space therebetween in the front-rear direction. The upper half of the left side edge of each of the base plates 504 and 506 is of a shape nearly corresponding to the document conveying passage 76. Supporting protrusions 508 are formed in the left side edges of the base plates 504 and 506 (FIGS. 18 to 20 only show the supporting protrusion 508 formed in the base plate 504). The movable frame member 502 is mounted pivotally across the supporting protrusions 508 by a supporting shaft 10. As will be described hereinafter, the movable frame member 502 can pivot from a closed position shown in FIG. 19 to an open position shown by a two-dot chain line in FIGS. 18 and 20 via a half-open position shown by a solid line in FIGS. 18 and 20. As can be seen from FIG. 18, the movable frame member 502 has an upper wall 512, a left side wall 514, a front wall 516 and a rear wall 518. When the movable frame member 502 is brought to the closed position shown in FIG. 19, its upper wall 512 defines the left side portion of the upper surface of the housing 2, and the free edge (right side edge) of the upper wall 512 defines the left side edge of the document insertion opening 72. The left side wall 514 of the movable frame member 502 defines the upper half of the left side surface of the housing 2, and the free edge (lower edge) of the left side wall 514 defines the upper edge of the document discharge opening 74. The free edges of the front wall 516 and the rear wall 518 of the movable frame member 502 are of a shape nearly corresponding to the document conveying passage 76.

Locking means 520 for locking the movable frame member 502 releasably at the closed position is provided. The locking means 520 comprises an anchoring pin 522 fixed to the front upstanding base plate 504, a hook member 524 mounted on the front wall 516 of the movable frame member 502 and a manually operating member 526. As FIGS. 19 and 20 clearly show, the hook member 524 is pivotally mounted on the front wall 516 by means of a pin 528. The operating member 526 is mounted pivotally on the front wall 516 by a pin 530. It will be appreciated by reference to FIG. 18 that a protrusion 529 is formed in the upper part of the operating member 526, and a projecting piece 527 is formed in the front end of the left side wall 514 of the movable frame member 502. The pivotal movement of the operating member 526 is limited to the range from a first position shown by a solid line in FIG. 19 and a second position shown by a two-dot chain line in FIG. 19. At the first position, the under surface of the protrusion 529 of the operating member 526 abuts with the upper edge of the projecting piece 527, and the counterclockwise pivoting of the operating member 526 is hampered. At the second position, the lower end of the rear portion of the operating member 526 abuts with the inside surface of the projecting piece 527, and the clockwise pivoting of the operating member 526 is hampered. Spring means 531, which may be a tension coil spring, is stretched between the front wall 516 and the hook member 524. The spring means 531 elastically biases the hook member 524 clockwise. The lower end portion of the hook member 524 abuts with the upper end portion of the operating member 526. Hence, the elastic biasing action of the spring means 531 is transmitted to the operating member 526 via the hook member 524 and elastically biases the operating member 526 counterclockwise. The operating member 526 is thus elastically held at the first position shown by a solid line in FIG. 19 and in FIG. 20, and the hook member 524 is elastically held at the position shown by a solid line in FIG. 19 and in FIG. 20.

The operation of the locking means 520 will be described. For example, let us assume that the movable frame member 502 is to be pivoted clockwise from the half-open position shown by a solid line in FIG. 20 toward the closed position. When the movable frame member 502 approaches the closed position, an inclined edge 533 formed in the front end of the hook member 524 abuts with the anchoring pin 522. When the movable frame member 502 is further pivoted clockwise, the hook member 524 is pivoted counterclockwise and the operating member 526 clockwise, against the elastic biasing action of the spring means 531. When the movable frame member 502 is pivoted to the closed position shown in FIG. 19, the inclined edge 533 of the hook member 524 advances over and beyond the anchoring pin 522, and the hook member 524 is pivoted clockwise and the operating member counterclockwise to the position shown by the solid line by the elastic biasing action of the spring means 531. Consequently, the hook member 524 is anchored on the anchoring pin 522, and the movable frame member 502 is locked in the closed position shown in FIG. 19. The movable frame member 502 may be pivoted counterclockwise from the closed position by pressing the protrusion 532 of the operating member 526 and thereby pivoting the operating member 526 clockwise and the hook member 524 counterclockwise to the position shown by a two-dot chain line in FIG. 19. As a result, the hook member 524 comes out of engagement with the anchoring pin 522 to release the movable frame member 502 from locking, and the movable frame member 502 can pivot counterclockwise.

One end portion of a spring means 534 is fixed to the inside surface of the front upstanding base plate 504. The spring means 534 serves to elastically hamper further counterclockwise pivoting of the movable frame member 502 when the frame member 502 has been pivoted counterclockwise to the half-open position shown by the solid line in FIGS. 18 and 20. The spring means 534 may be formed of a plate spring having an inverse U-shaped free end portion. When the movable frame member 502 has been pivoted counterclockwise to the half-open position, the inclined portion 535 of the lower edge of the front wall 516 of the movable frame member 502 abuts with the inverse U-shaped free end portion of the spring means 534 to hold the movable frame member 502 elastically at the half-open position. When the movable frame member 502 is further forced in the counterclockwise direction, the inclined portion 535 of the lower edge of the front wall 516 elastically deforms the inverse U-shaped free end portion of the spring means 534 and advances over it and thus the movable frame member 502 is pivoted to the open position. Consequently, the horizontal portion 537 of the lower edge of the front wall 516 of the frame member 502 abuts with the inverse U-shaped free end portion of the spring means 534, and the movable frame member 502 is held at the open position. When the movable frame member 502 is to be pivoted from the open position to the closed position shown in FIG. 19, the inclined portion 535 of the lower edge of the front wall 516 elastically deforms the inverse U-shaped free end portion of the spring means 534 and advances over and beyond it. If desired, the spring means may be fixed to a suitable position of on the movable frame member 502 instead of fixing the spring means 534 to the front upstanding base plate 504, so that when the movable frame member 502 is pivoted to the half-open position, a suitable member provided in the front upstanding base plate 504 acts on the spring means.

It will be appreciated by reference to FIGS. 19 and 20, in conjunction with FIG. 1, that the inside guiding plates 78 and 80 and the driven rollers 90, 92, 94, 96 and 98 located on one side (inwardly) of the sheet-like document conveying passage 76 are mounted between the front upstanding base plate 504 and the rear upstanding base plate 506. On the other hand, the outside guiding plates 84, 86 and 88, the separating members 108, and the follower rollers 100, 102 and 104 located on the other side (outwardly) of the sheet-like document conveying passage 76 are mounted between the front wall 516 and the rear wall 518 of the movable frame member 502. Hence, the sheet-like document conveying passage 76 is opened when the movable frame member 502 is brought to the half-open position or the open position from the closed position.

When document jamming occurs in the document conveying passage in the document scanning means 4 described above, the frame member 502 is brought to the half-open position shown by a solid line in FIGS. 18 and 20. This results in opening of the document conveying passage 76, and the document that has jammed up can be easily taken out. The half-open position of the movable frame 502 is conveniently displaced by 20 to 40 degrees from the closed position.

For cleaning, repair or inspection of the document conveying passage 76, the movable frame member 502 is pivoted to the open position shown by a two-dot chain line in FIGS. 18 and 20 beyond the half-open position. As a result, the document conveying passage 76 is opened to a sufficiently large extent, and it can be easily cleaned, repaired, or inspected. The open position of the movable frame member 502 is conveniently displaced by 50 to 100 degrees from the closed position. The following fact should be noted with regard to the cleaning of the sheet-like document conveying passage 76. When the image receiving means 18 is comprised of many solid image pick-up elements as described with reference to FIG. 1, a colored region for shading, colored in white for example, exists at a certain predetermined site (corresponding to the second scanning zone 12) of the outside guiding plate 88, as is known in the art. Before document scanning, shading is performed to adjust the sensitivities of the respective solid image pick-up elements electrically according to the light reflected from the colored region for shading. If the shading colored region is soiled, the shading cannot be properly carried out. Accordingly, the shading colored region should be regularly cleaned. For this cleaning operation, the movable frame member 502 may be held at the open position.

Since in the document scanning means 4, the movable frame member 502 can be held selectively at the half-open position and the completely open position, the machine can be conveniently used. Furthermore, the movable frame member 502 does not pivot directly and abruptly to the open position from the closed position, but always stops at the half-open position on the way. Accordingly, the user will not be astonished by the unexpected abrupt pivoting of the movable frame member 502, nor is there a possibility of his finger or other body parts being injured by the frame member 502.

Optical Means

Now, the structure of the optical means 20, particularly its light path changing reflecting mirror 22, in the document scanning means 4, described with reference to FIG. 1, will be described in greater detail.

Figure 21:
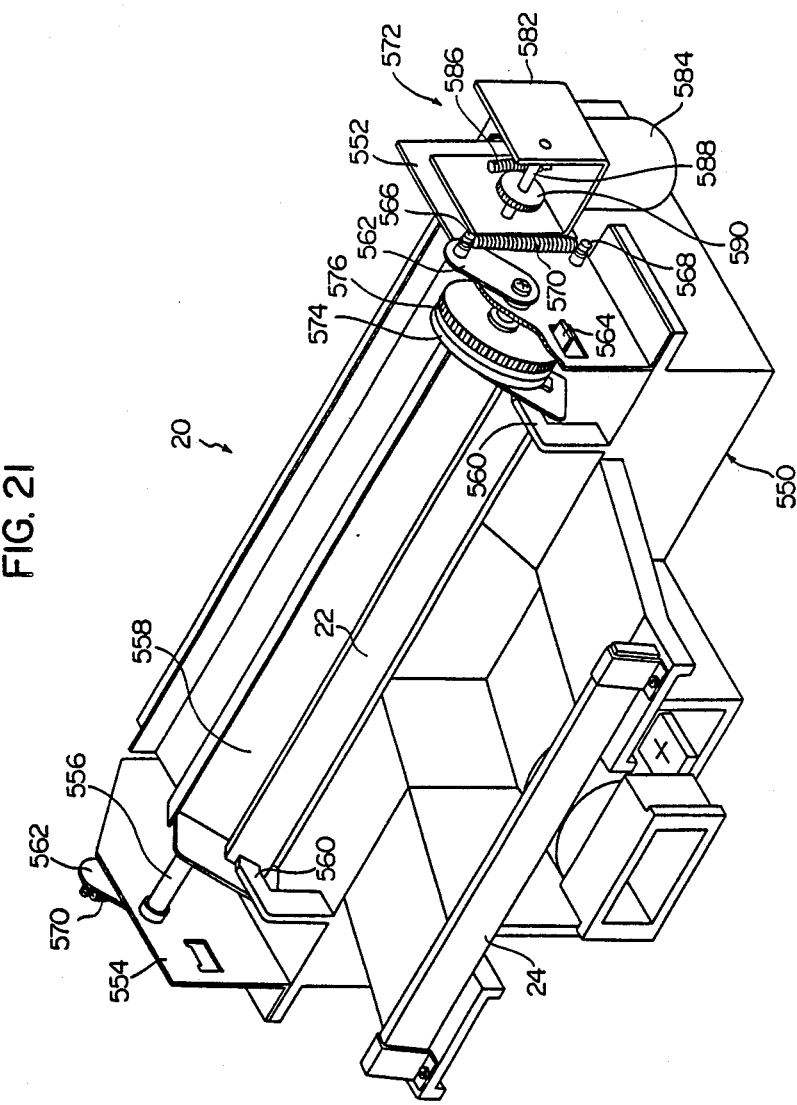
FIGS. 21, 22, 23, 24 and 25 show optical means in document scanning means in the image processing machine of FIG. 1 in a state where a light path changing reflecting mirror is at a first position (perspective view), it is at the first position (side view), it is at a second position (perspective view), it is at the second position (side view), and it is in the first position (top plan view)
Figure 22:
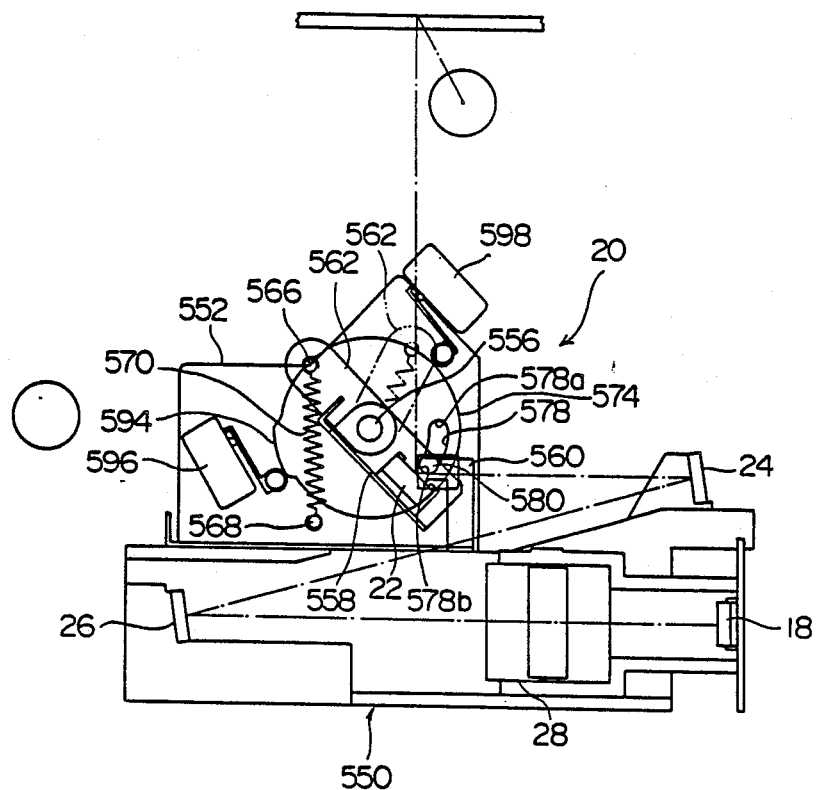

With reference to FIGS. 21 and 22, the illustrated optical means 20 includes a supporting frame 550 molded in the desired shape from a synthetic resin. The first stationary reflecting mirror 24, the second stationary reflecting mirror 26 and the lens assembly 28 are fixed to the supporting frame 550, and the image receiving means 18 is also fixed to the supporting frame 550. As clearly shown in FIG. 21, a pair of supporting walls 552 and 554 spaced from each other in the widthwise direction (the direction perpendicular to the sheet surface in FIG. 22) are also fixed to the supporting frame 550. The light path changing reflecting mirror 22 is mounted between the pair of supporting walls 552 and 554. Thus, in the illustrated embodiment, the optical means 20 and the image receiving means 18 are formed as a unit having the supporting frame 550. This unit is detachably mounted at a predetermined position within the housing 2. A detailed description of the structures of the first stationary reflecting mirror 24, the second stationary reflecting mirror 26, the lens assembly 28 and the image receiving means 18 will be omitted in the present specification because they do not constitute the novel features of the improvement achieved in this invention.

Figure 23:
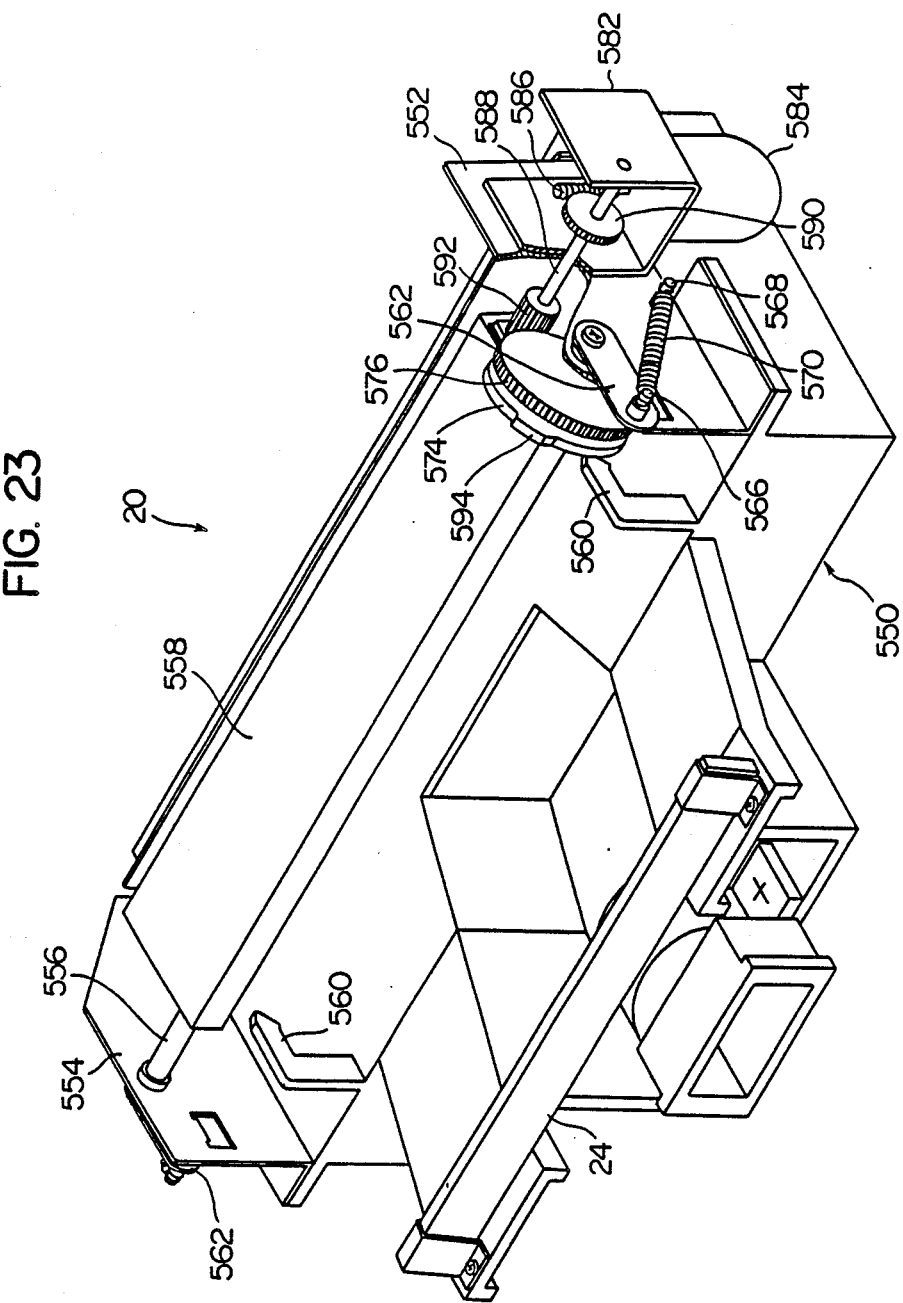
Figure 24:
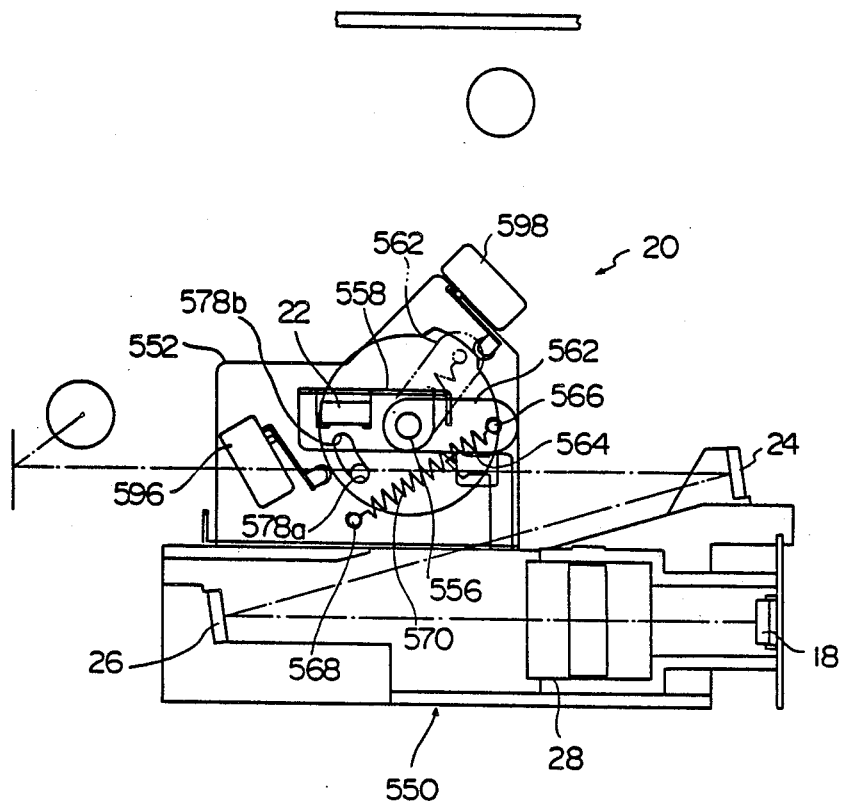
Figure 25:
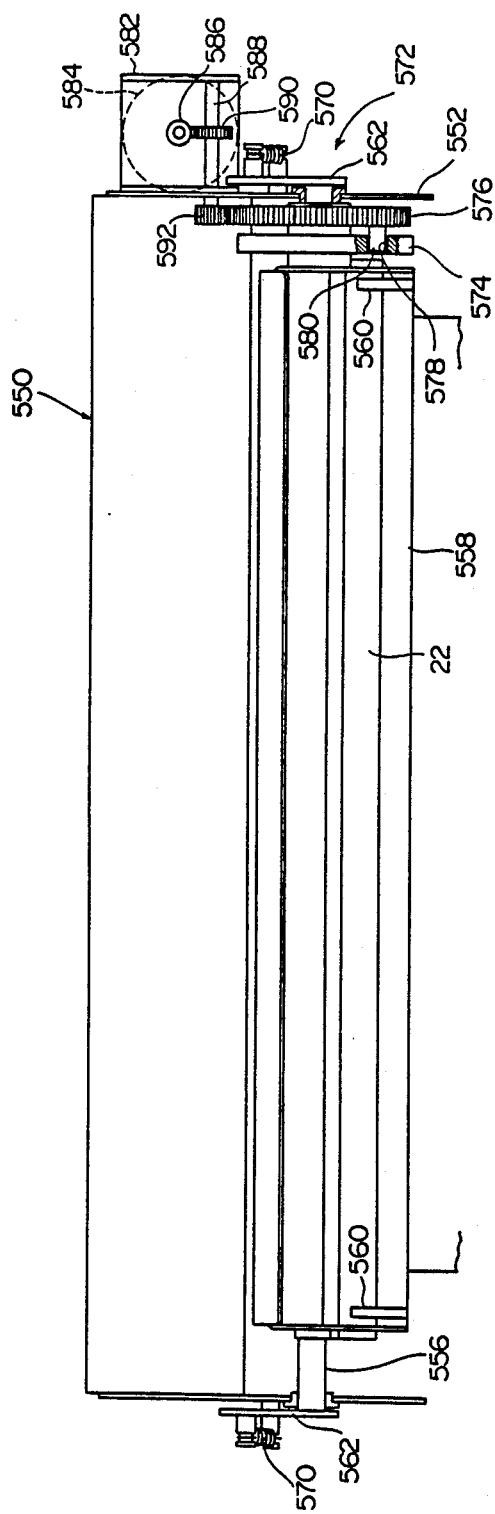

With reference to FIGS. 21 to 25, particularly FIGS. 21 and 25, a rotating shaft 556 is rotatably mounted between the supporting walls 552 and 554. A supporting plate 558 extending in the widthwise direction is fixed to the rotating shaft 556, and the light path changing reflecting mirror 22 is fixed to the supporting plate 558. The rotating shaft 556 and the supporting plate 558 and the light path changing reflecting mirror 22 fixed to it are free to rotate between a first position shown in FIGS. 21, 22 and 25 and a second position shown in FIGS. 23 and 24. As shown in FIGS. 21 and 22, a pair of first positioning stop pieces 560, nearly L-shaped, are formed integrally in the supporting frame 550 in spaced-apart relation in the widthwise direction. When the light path changing reflecting mirror 22 is held at the first position, both side portions of the reflecting mirror surface of the mirror 22 abut with the free ends of the positioning stop pieces 560 to hamper further counterclockwise rotation of the mirror 22 in FIG. 22. When the mirror 22 is held at the first position, the first scanning zone 10 is optically connected to the image receiving means 18 via the light path changing reflecting mirror 22, the first stationary reflecting mirror 24, the second stationary reflecting mirror 26 and the lens assembly 28. On the other hand, the light path between the second scanning zone 12 and the first stationary reflecting mirror 24 is shut off by the light path changing reflecting mirror 22, and therefore, the second scanning zone 12 is not optically connected to the image receiving means 18. Since the light path changing reflecting mirror 22 held at the first position optically connects the first scanning zone 10 to the first stationary reflecting mirror 24, it is critical that the reflecting mirror surface of the mirror 22 should be positioned fully precisely. Since in the illustrated embodiment, the reflecting mirror surface itself directly abuts with the first positioning stop pieces 560, the reflecting mirror surface of the reflecting mirror 22 can be positioned fully precisely at a predetermined position if the positioning stop pieces 560 are made with sufficient precision. On the other hand, the opposite end portions of the rotating shaft 556 project outwardly through the supporting walls 552 and 554 as shown in FIGS. 21 and 22, and a lever member 562 is fixed to the projecting ends. Second positioning stop pieces 564 projecting outwardly are formed in the supporting walls 552 and 554. As shown in FIGS. 23 and 24, when the light path changing reflecting mirror 22 is held at the second position, the lever members 562 abut with the second positioning stop pieces 564 to hamper further clockwise rotation of the reflecting mirror 22 in FIG. 24. When the reflecting mirror 22 is held at the second position, the first scanning zone 10 is no longer connected optically to the first stationary reflecting mirror 24 by the reflecting mirror 22. Hence, the first scanning zone 10 is not optically connected with the image receiving means 18. On the other hand, the reflecting mirror 22 moves away from the light path between the second scanning zone 12 and the first stationary reflecting mirror 24, and therefore, the second scanning zone 12 is optically connected to the image receiving means 18 via the first stationary reflecting mirror 24, the second stationary reflecting mirror 26 and the lens assembly 28. Since the light path changing reflecting mirror 22 held at the second position does not function as an optical element, the second position does not have to be precise.

A pin 566 is implanted in the free end portion of the lower member 562, and a pin 568, in the outside surfaces of the supporting walls 552 and 554. Spring means 570, which may be a tension coil spring, is stretched between the pin 566 and the pin 568. When the pin 566 implanted in the lever member 562 is at a neutral angular position shown by a two-dot chain line in FIGS. 22 and 24, the spring means 570 is in the most stretched state. But when as shown in FIGS. 21 and 22 the lever member 562 is brought to a site displaced counterclockwise in FIG. 22 from the neutral angular position, the spring means 570 elastically biases the lever member 562 counterclockwise and thus holds the light path changing reflecting mirror 22 elastically at the first position. As shown in FIGS. 23 and 24, when the lever member 562 is at a site displaced clockwise in FIG. 24 from the neutral angular position, the spring means 570 elastically biases the lever member 562 clockwise and thus holds the reflecting mirror 22 elastically at the second position.

The optical means 20 is further provided with light path changing means shown generally at 572 which selectively holds the reflecting mirror 22 at the first position and the second position. With reference to FIG. 25 taken in conjunction with FIG. 21, an output rotating member 574, which may be a circular plate, is fixed to the rotating shaft 556, and an input rotating member 576, which may be a gear, is rotatably mounted on the rotating shaft 556. The output rotating member 574 and the input rotating member 576 are connected to each other in such a manner that they can rotate relative to each other over an angular range of, for example, about 40 degrees. In the illustrated embodiment, an arcuate slot 578 is formed in the output rotating member 574 and a protrusion 580 projecting into the slot 578 is formed on the input rotating member 576, as shown in FIGS. 22 and 24. The protrusion 580 can freely rotate from one end 578a of the slot 578 to its other end 578b to permit the output rotating member 574 and the input rotating member 576 to rotate relative to each other over a predetermined angular range. As most clearly shown in FIG. 23, a supporting bracket 582 is fixed to the outside surface of the supporting wall 552, and an electric motor 584 is mounted to the underside of the supporting bracket 582. The output shaft 586 of the electric motor 584 extends upwardly through the bottom wall of the supporting bracket 582, and a worm is provided in the output shaft 586. To the side wall of the supporting bracket 582 is rotatably mounted a rotating shaft 588 one end portion of which projects inwardly through the supporting wall 552. A gear 590 in mesh with the output shaft of the motor 584 and a gear 592 in mesh with the input rotating member 576 are fixed to the rotating shaft 588. Thus, the input rotating member 576 is drivingly connected to the output shaft 586 of the electric motor 584 via the gear 592, the rotating shaft 588 and the gear 590. One actuating projection 594 is formed in the output rotating member 574 as shown clearly in FIGS. 22 and 24. On the inside surface of the supporting wall 552 are mounted two detectors 596 and 598, which may be microswitches to be closed by the actuating projection 594, with a predetermined angular distance therebetween.

The operation and advantage of the light path changing means 572 described above will now be described. To rotate the light path changing reflecting mirror 22 from the first position shown in FIG. 22 to the second position shown in FIG. 24, the electric motor 584 is energized and rotated in a predetermined direction, to rotate the input rotating member 576 clockwise in FIG. 22. When the input rotating member 576 has slightly rotated clockwise, the protrusion 580 formed in it abuts with one end 578b of the slot 578 formed in the output rotating member 574. Thereafter, incident to the rotation of the input rotating member 576, the output rotating member 574 is also rotated clockwise against the elastic biasing action of the spring means 570. When the output rotating member 574 has been rotated clockwise to a site beyond the neutral angular position shown by a two-dot chain line in FIG. 22, the elastic biasing action of the spring means 570 biases the output rotating member 574 clockwise. As a result, the output rotating member 574 rotates clockwise relative to the input rotating member 576, and the light path changing reflecting mirror 22 is held at the second position shown in FIG. 24 by the elastic biasing action of the spring means 570. Simultaneously with, or slightly earlier than, this positioning, the actuating projection 594 formed in the output rotating member 574 closes the detector 598 and thus deenergizes the electric motor 584. Consequently, the input rotating member 576 runs by inertia clockwise by some angle smaller than the predetermined angular range defined by the slot 578 and the protrusion 580, and stops. Thus, even if the angular position at which the input rotating member 576 stops by deenergization of the electric motor 584 is not sufficiently precise (it is extremely difficult, if not impossible, to control this stop angular position for the input rotating member 576 with sufficient precision), the reflecting mirror 22 can be surely and precisely held at the second position.

To rotate the light path changing reflecting mirror 22 from the second position shown in FIG. 24 to the first position shown in FIG. 22, the electric motor 584 is energized and rotated in a reverse direction to rotate the input rotating member 576 counterclockwise in FIG. 24. When the input rotating member 576 has been rotated slightly counterclockwise, the protrusion 580 formed on it abuts with the other end 578a of the slot 578 formed in the output rotating member 574. Thereafter, incident to the rotation of the input rotating member 576, the output rotating member 574 is rotated counterclockwise against the elastic biasing action of the spring means 570. When the output rotating member 574 has been rotated counterclockwise to a site beyond the neutral angular position shown by a two-dot chain line in FIG. 24, the elastic biasing action of the spring means 570 biases the output rotating member 574 counterclockwise. Consequently, the output rotating member 574 rotates counterclockwise relative to the input rotating member 576, and the light path changing reflecting mirror 22 is held at the first position shown in FIG. 22 by the elastic biasing action of the spring means 570. Simultaneously with, or slightly earlier than, this positioning, the actuating protrusion 594 formed in the output rotating member 574 closes the detector 596 and deenergizes the electric motor 584. As a result, the input rotating member 576 runs by inertia counterclockwise by some angle which is smaller than the predetermined angular range defined by the slot 578 and the protrusion 580, and stops. Thus, even if the stop angular position for the input rotating member 576 by deenergization of the motor 584 is not sufficiently precise, the light changing reflecting mirror 22 can be held at the first position surely and precisely.

General Structure of the Image-forming Means

Again with reference to FIG. 1, the image-forming means 6 in the illustrated image processing device is provided with printing means 602 disposed in the upper part of the right side of the housing 2. The printing means 602 includes a printing head 604 and an ink ribbon cartridge 606. The printing head 604 may be a known thermal head, and a print output zone 608 is formed in the right side of its under surface. The ink ribbon cartridge 606 has a cartridge case 610, a ribbon pay-off shaft 612 and a ribbon take-up shaft 614 loaded rotatably in the cartridge case 610 and a thermosensitive ink ribbon 616. The ribbon pay-off shaft 612 and the ribbon take-up shaft 614 are spaced a predetermined distance and run parallel to each other. The ink ribbon 616 is unwound from the ribbon pay-off shaft 612, passes through the print output zone 608, and is taken up by the ribbon take-up shaft 614. The ribbon cartridge 606 will be described in detail hereinafter.

The image-forming means 6 is further provided with printing substrate feed means 618 disposed in the lower part of the right side of the housing 2. The printing substrate feed means 618 includes lower cassette-type feed means 620 and upper cassette-type feed means 622. The lower feed means 620 has a cassette 624 and a feed roller 626. The cassette 624 is constructed of a receptacle which can be detachably loaded into the housing 2 by inserting its front half into the housing 2 through an opening formed in the right side wall of the housing 2. A stack of sheet-like printing substrates, which may have an A4 size according to JIS standards, are placed within the cassette 624. The printing substrates may be ordinary plain paper. The feed roller 626 is selectively rotated clockwise to deliver the printing substrates one by one forwardly (to the left) from the cassette 624. The upper feed means 622 also has a cassette 628 and a feed roller 630. Sheet-like printing substrates, which may be ordinary plain paper having a B5 size according to JIS standards, are placed in a stacked state in the cassette 628, which is constructed of a receptacle to be detachably loaded into the housing 2. The feed roller 630 is selectively rotated clockwise to deliver the printing substrates one by one forwardly (to the left) from the casette 628. The printing substrate feed means 618 may be substantially the same as known cassette-type sheet material feed means used in electrostatic copying machines. Accordingly, a detailed description of the printing substrate feed means 618 will be omitted in the present specification.

The image-forming means 6 further comprises a printing substrate carry-in path shown generally at 632 extending from the delivery end (left end) of the printing substrate feed means 618 to the print output zone 608 and a printing substrate delivery path 636 extending from the print output zone 608 to a printing substrate discharge opening 634 formed in the right side wall of the housing 2. The printing substrate carry-in path 632 has a main printing substrate carry-in path 638 extending from the delivery end of the lower feed means 620 to the print output zone 608 and a subsidiary printing substrate carry-in path 640 extending from the delivery end of the upper feed means 622 to a midway point of the main printing substrate carry-in path 638 and joining the main printing substrate carry-in path 638. One side of the main printing substrate carry-in path 638 extending in a nearly semi-arcuate shape is defined by guiding plates 642, 644 and 646, and its other side, by the left half of a guiding plate 648, a guiding plate 650, the upper end portion of a guiding plate 652 and a guiding plate 654. One side of the subsidiary printing substrate carry-in path 640 is defined by the right half of the guiding plate 648 and a guiding plate 656, and its other side, by a guiding plate 658 and the main portion of the guiding plate 652. One side (lower side) of the printing substrate delivery path 636 is defined by a guiding plate 660, and its other side (upper side), by the right side part of the under surface of the cartridge case 610 of the ink ribbon cartridge 606. A printing substrate receiving tray 662 extending from below to the right of the printing substrate discharge opening 634 is detachably mounted on the right side wall of the housing 2. Printing substrate conveying means for conveying the printing substrate through the printing substrate carry-in path 632, across the print output zone 608, and then through the printing substrate delivery path 636 is comprised of a pair of main conveyor rollers 662 and 664, a pair of main conveyor rollers 666 and 668, a pair of subsidiary conveyor rollers 670 and 672 disposed in the subsidiary printing substrate carry-in path 640, a platen roller 674 disposed opposite to the print output zone 608, and a pair of delivery rollers 676 and 678 disposed in the downstream end portion of the printing substrate delivery path 636.

The operation and advantage of the image-forming means 6 will now be described.

In performing printing, the printing substrate is delivered from either the lower feed means 620 or the upper feed means 622. The printing substrate delivered from the lower feed means 620 is carried into the print output zone 608 through the main printing substrate carry-in path 638, and the printing substrate delivered from the upper feed means 622 is carried into the print output zone 608 through the subsidiary printing substrate carry-in path 640 and the downstream portion of the main printing substrate carry-in path 638. In the print output zone 608, the platen roller 674 presses the printing substrate against the ink ribbon 616 moving in synchronism with the printing substrate, and the ink ribbon 616 is selectively heated by the selective heating action of the printing head 604. Consequently, the required print is applied to the substrate. The selective heating action of the printing head 604 is electronically controlled according to the signal received from the sender when the image processing machine is used as a facsimile machine, and according to the signal produced by the image receiving means 18 in the document scanning means 4 when the image processing machine is used as a copying machine. The printing substrate on which the print has been applied is conveyed through the printing substrate delivery path 636, and discharged onto the printing substrate receiving tray 662 through the printing substrate discharge opening 636.

Opening of the Printing Substrate Carry-in and Delivery Paths

Figure 26:
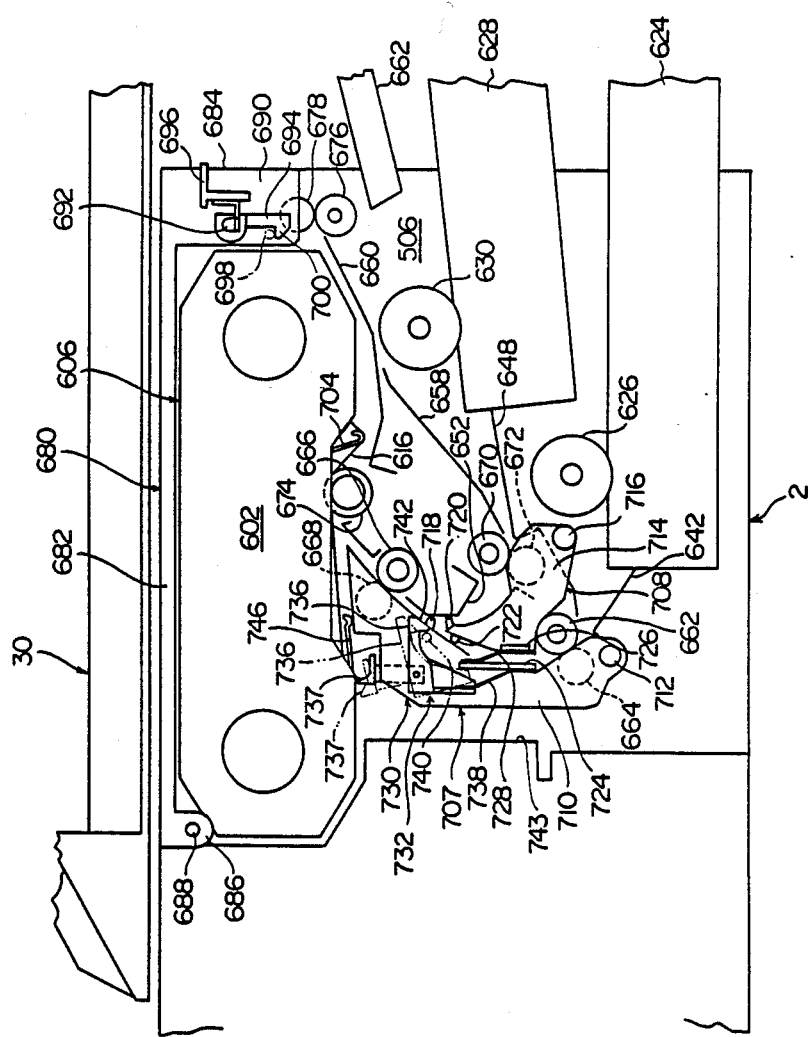
FIGS. 26, 27, 28 and 29 show a printing substrate feed-in and delivery passage in image-forming means of the image processing machine of FIG. 1 in a closed state (partial sectional view), in an open state (partial sectional view), in a closed state (partial perspective view), and in an open state (partial perspective view)
Figure 27:
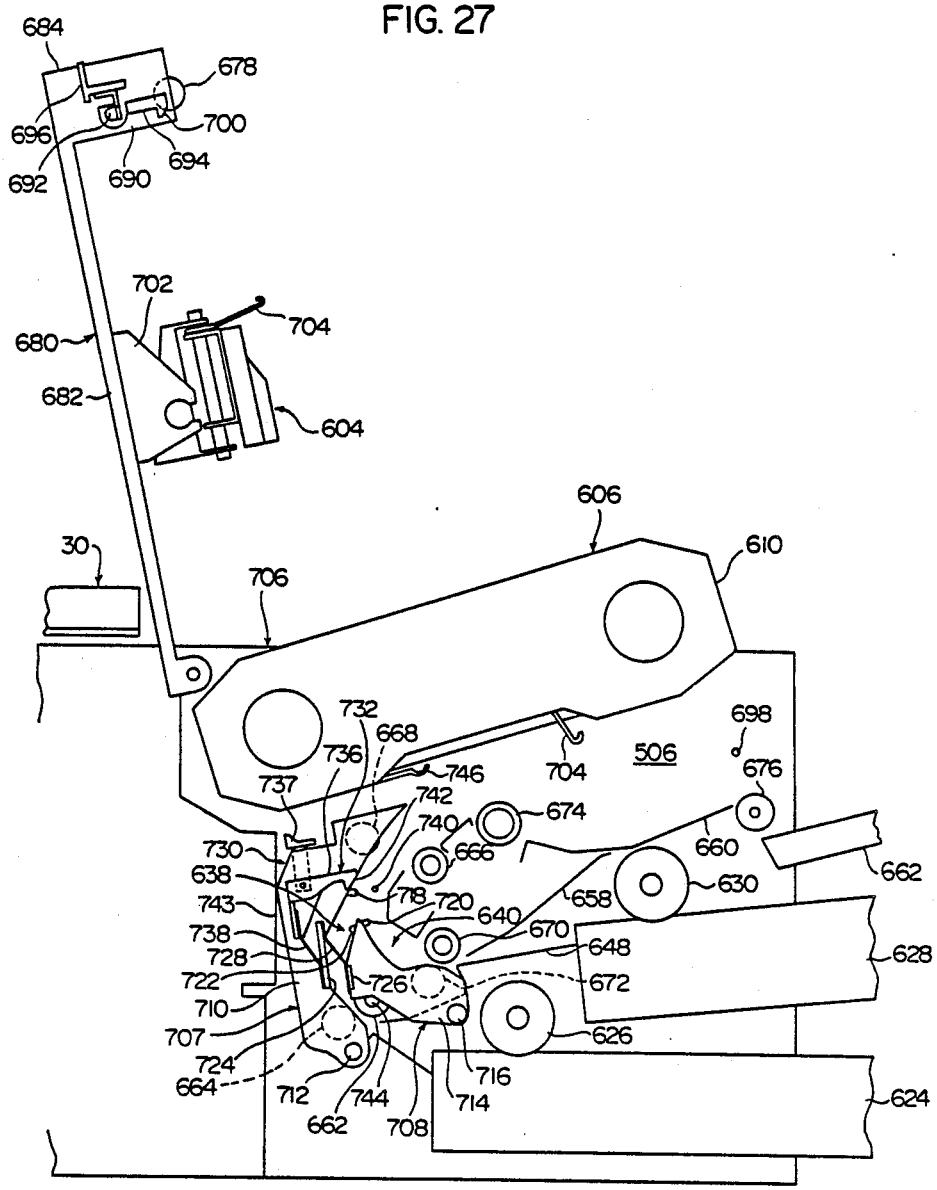

With reference to FIG. 26, the right side portion of the upper surface of the housing 2 (the portion above the printing means 602) and the upper end portion of the right side surface of the housing 2 (the portion above the upper edge of the printing substrate discharge opening 634) are defined by a movable door member 680. The door member 680 has a main portion 682 extending in the left-right direction in FIG. 26 and a portion 684 downwardly extending from the right end of the main portion 682. With reference to FIGS. 26 and 27, the door member 680 is mounted on the stationary main frame member of the housing 2 in such a member that it is free to pivot between a closed position shown in FIG. 26 and an open position shown in FIG. 27. The main frame member of the housing 2 has the front upstanding base plate 504 and the rear upstanding base plate 506 already described hereinabove with reference to FIG. 18 (FIGS. 26 and 27 only show the rear upstanding base plate 506). The door member 680 has projecting pieces 686 projecting downwardly from the front part and the rear part of the left end of the main portion 682. By pivotally mounting such projecting pieces 686 on the front upstanding base plate 504 and the rear upstanding base plate 506, the movable door member 680 is mounted across these upstanding base plates 504 and 506 so as to be free to pivot between the closed position and the open position. To bring the door member 680 from the closed position to the open position, it is necessary, as shown in FIG. 27, to move the movable document placing stand 30 mounted on the upper surface of the housing 2 to the left of the left end of the door member 680. The downwardly extending portion 684 of the door member 680 has a rectangular front wall 690 and a rectangular rear wall (FIGS. 26 and 27 only show the front wall 690). A rod 692 is rotatably mounted across the front wall 690 and the rear wall. The opposite end portions of the rod 692 project through the front wall 690 and the rear wall respectively, and a hook member 694 is fixed to the opposite end portions of the rod 692. The rod 692 and the hook member 694 fixed to it are elastically biased clockwise by suitable spring means (not shown), and elastically held at an operative position shown in FIGS. 26 and 27. To the front end portion of the rod 692 is further fixed a manually operable lever 696 whose free end projects to the right beyond the right side wall of the housing 2. On the other hand, an anchoring pin 698 is implanted in the inside surface of each of the front upstanding base plate 504 and the rear upstanding base plate 506. When the movable door member 680 is pivoted to a site near the closed position shown in FIG. 26 clockwise from the open position shown in FIG. 27, the inclined lower edge 700 in the front end portion of the hook member 694 abuts with the anchoring pin 698, and thereafter, the hook member 694 is pivoted counterclockwise against the elastic biasing action of the spring means according to the clockwise pivoting of the movable door member 680. When the door member 680 has been pivoted to the closed position shown in FIG. 26, the inclined lower edge 700 advances over and beyond the anchoring pin 698. Hence, the hook member 694 is returned to the operative position by the elastic biasing action of the spring means and anchored at the anchoring pin 698. Thus, the movable door member 680 is locked at the closed position. To bring the door member 680 to the open position shown in FIG. 27, the free end of the manually operable lever 696 is pushed upwardly to pivot the hook member 694 counterclockwise and remove it from the anchoring pin 698 and thus release the door member 680 from locking.

The delivery roller 678 is mounted between the front wall 690 and the rear wall of the door member 680, and the delivery roller 676 cooperating with the delivery roller 678 is mounted between the front upstanding base plate 504 and the rear upstanding base plate 506. As can be clearly seen from FIG. 27, a pair of downwardly extending pieces 702 (FIG. 27 shows only one downwardly extending piece 702) spaced in the front-rear direction are fixed to the under surface of the main portion 682 of the door member 680. The printing head 604 of the printing means 602 is mounted between the pair of downwardly extending pieces 702 by a suitable method. A guiding member 704 extending downwardly is fixed to the printing head 604.

An ink ribbon cartridge supporting member is mounted on the inside surface of each of the upstanding base plates 504 and 506. The ink ribbon cartridge 606 is detachably mounted between the ink ribbon cartridge supporting members by lowering it through an opening 706 formed on the upper surface of the housing 2 by holding the door member 680 at the open position shown in FIG. 27. The ink ribbon cartridge supporting members and the ink ribbon cartridge 606 will be described in greater detail hereinafter.

Figure 30:
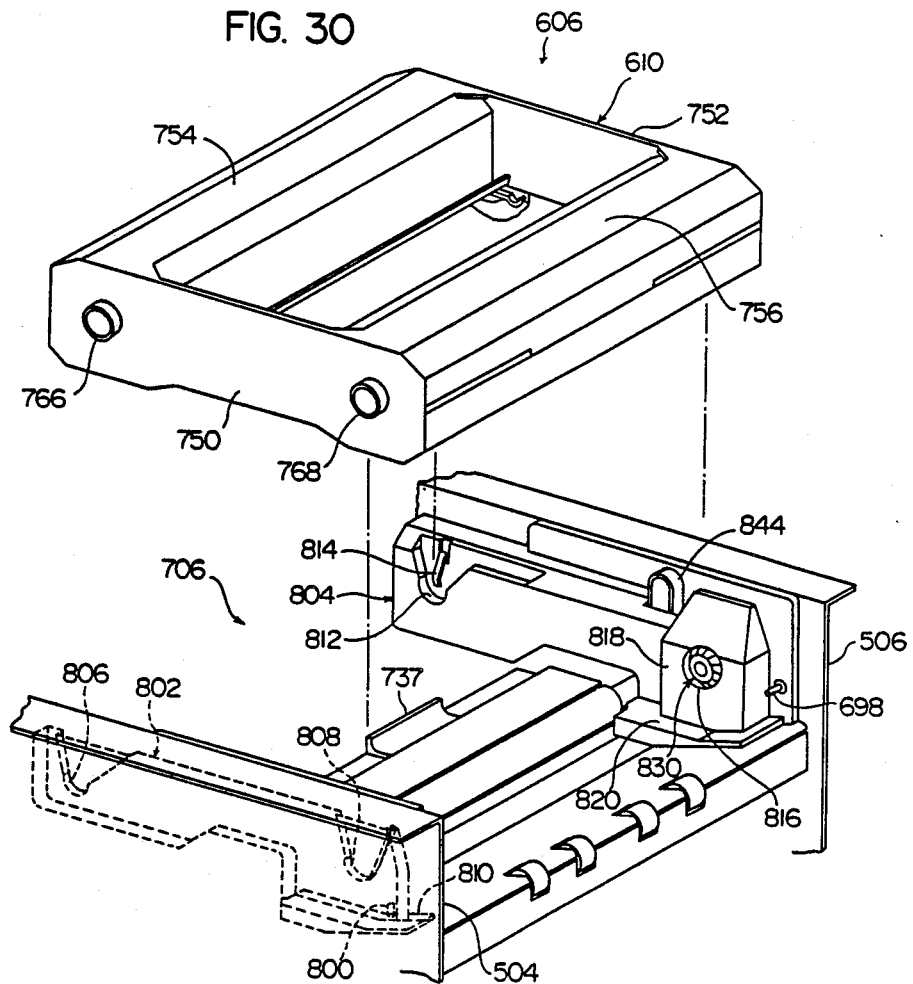
FIG. 30 is a partial perspective view showing an ink ribbon cartridge and a portion for receiving it in image-forming means of the image processing machine shown in FIG. 1.

When the ink ribbon cartridge 606 is mounted at a required position and then the door member 680 is held at the closed position, the printing head 604 advances into a space at the center of the cartridge case 610 of the cartridge 606 and is held at a required position (see FIG. 30 also). The guiding member 704 mounted on the printing head 604 acts on the ink ribbon 616 (and the printing substrate) immediately downstream of the print output zone 608 and guides them downwardly. This prevents the front edge portion of the printing substrate from accompanying the ink ribbon 616 and advancing into the ink ribbon cartridge 606.

Figure 28:
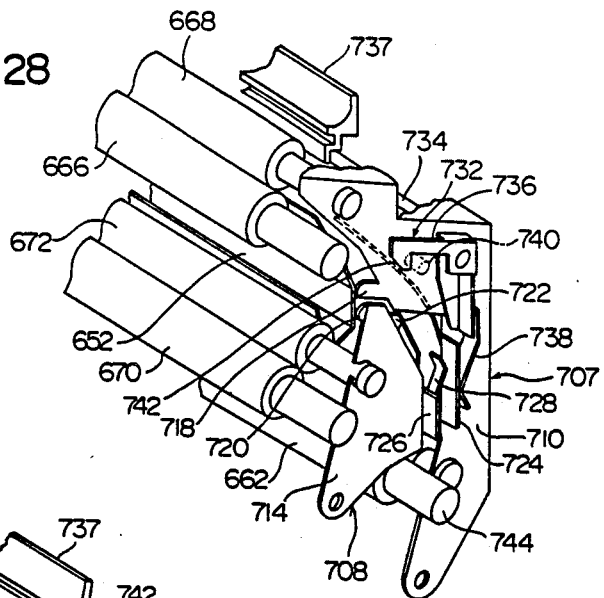
Figure 29:
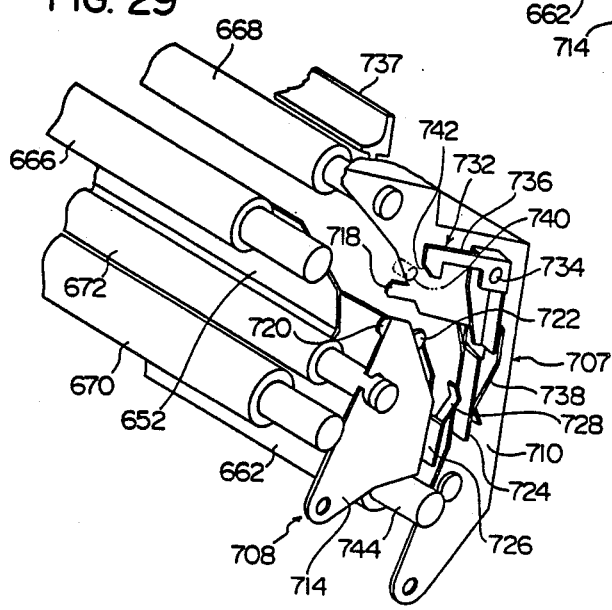

With reference to FIGS. 26 and 27, a main movable frame member 707 and a subsidiary movable frame member 708 are disposed between the front upstanding base plate 504 and the rear upstanding base plate 506. The main movable frame member 707 has a front wall 710 and a rear wall (FIGS. 26 and 27 show only the front wall 710) spaced from each other a predetermined distance in the front-rear direction (the direction perpendicular to the sheet surface in FIGS. 26 and 27). The main movable frame member 707 is mounted between the front upstanding base plate 504 and the rear upstanding base plate 506 in such a manner that it is free to pivot between a closed position shown in FIG. 26 and an open position shown in FIG. 27. The subsidiary movable frame member 708 also has a front wall 714 and a rear wall (FIGS. 26 and 27 show only the front wall 714) spaced from each other a predetermined distance in the front-rear direction. The subsidiary movable frame member 708 is mounted between the front upstanding base plate 504 and the rear upstanding base plate 506 by a shaft 716 so that it is free to pivot between a closed position shown in FIG. 26 and an open position shown in FIG. 27. With reference to FIGS. 28 and 29 as well as FIGS. 26 and 27, positioning protrusions 718 are formed in one side edges (the right side edges in FIGS. 26 and 27) of the front wall 710 and the rear wall of the main movable frame member 707, respectively. Positioning protrusions 720 are formed in one side edges (the right side edges in FIGS. 26 and 27) of the front wall 714 and the rear wall of the subsidiary movable frame member 708, and positioning protrusions 722 are formed on their other side edges. Furthermore, outwardly extending projecting pieces 724 are formed in the front wall 710 and the rear wall of the main movable frame member 707, and outwardly extending projecting pieces 726 are also formed in the front wall 714 and the rear wall of the subsidiary movable frame member 708. One end portion of a plate spring 728 is fixed to each of the projecting pieces 726, and the free end portion of the plate spring 728 is positioned opposite to the projecting piece 724. Furthermore, locking means 730 is disposed for releasably locking the main movable frame member 707 and the subsidiary movable frame member 708 at the closed position shown in FIG. 26. The locking means 730 includes a hook mechanism 732 mounted on the main movable frame member 707. With reference to FIGS. 28 and 29, a rod 734 is rotatably mounted between the front wall 710 and the rear wall of the main movable frame member 707. A hook member 736 is fixed to both end portions of the rod 734 projecting outwardly through the front wall 710 and the rear wall, and an intermediate portion of the rod 734 has fixed thereto a manually operable lever 737 projecting upwardly therefrom. Furthermore, one end portion of a spring means 738 which may be a plate spring, is fixed to the hook member 736. The other end portion of the spring means 738 abuts with the back surface of the projecting piece 724, and thus, the spring means 738 elastically retains the hook member 736 at an operative position (the rod 734, the hook member 736 and the lever 737 have a tendency to pivot counterclockwise in FIGS. 26 and 27 by their own weight, and this counterclockwise pivoting is hampered by the abutting of the other end portion of the spring means 738 with the back surface of the projecting piece 724). An anchoring pin 740 is implanted in the inside surface of each of the front upstanding base plate 504 and the rear upstanding base plate 506.

When the main movable frame 707 is pivoted from the open position shown in FIG. 27 (and FIG. 29) toward the closed position shown in FIG. 26 (and FIG. 28), the projecting piece 724 formed in the main movable frame member 707 acts on the plate spring 728 fixed to the subsidiary movable frame member 708, and the subsidiary movable frame member 708 is also pivoted from the open position shown in FIG. 27 (and FIG. 29) toward the closed position shown in FIG. 26 (and FIG. 28). Thus, when the subsidiary movable frame member 708 is held at the closed position shown in FIG. 26, the positioning protrusions 720 formed in the subsidiary movable frame member 708 abut with the front end portion and the rear end portion of the guiding plate 652 fixed between the front upstanding base plate 504 and the rear upstanding base plate 506, whereby the subsidiary movable frame member 708 is kept from pivoting further in the clockwise direction in FIG. 26. Thereafter, the main movable frame member 707 is pivoted against the elastic biasing action of the plate spring 728. When the main movable frame member 707 has been pivoted to near the closed position shown in FIG. 26, an inclined edge 742 at the front end portion of the hook member 736 abuts with the anchoring pin 740. Thereafter, the hook member 736 is pivoted counterclockwise in FIG. 26 against the elastic biasing action of the spring means 738 according to the pivoting of the main movable frame member 707. When the main movable frame member 707 has been pivoted to the closed position shown in FIG. 26, the inclined edge 742 of the hook member 736 advances over and beyond the anchoring pin 740, and therefore, the hook member 736 is returned to the illustrated operative position and anchored on the anchoring pin 740 by the elastic biasing action of the spring means 738. Thus, the main movable frame member 707 and the subsidiary movable frame member 708 are locked in the closed position shown in FIG. 26. When the main movable frame member 707 has been pivoted to the closed position, the positioning protrusions 718 formed in the main movable frame member 707 abut with the front end portion and the rear end portion of the guiding plate 652 to hamper further pivoting of the main frame member 707. The positioning protrusions 722 formed in the subsidiary movable frame 708 abut with the movable frame member 707. As a result, the main movable frame member 707 and the subsidiary movable frame member 708 are held at the closed position with respect to the guiding plate 652.

The main movable frame member 707 and the subsidiary movable frame member 708 can be brought to the open position shown in FIG. 27 (and FIG. 29) by pressing the manually operable lever 737 of the hook mechanism 732 to pivot the hook member 736 counterclockwise in FIG. 26 against the elastic biasing action of the spring means 738, and thus releasing the main movable frame member 707 and the subsidiary movable frame member 708 from locking. As a result, the main movable frame member 707 is automatically pivoted to the open position shown in FIG. 27 by the elastic biasing action of the plate spring 728 fixed to the subsidiary movable frame member 708 and by the weight of the main movable frame member 707. When the main movable frame member 707 is held at the open position shown in FIG. 27, the main movable frame member 707 abuts with a partitioning wall 743 positioned rearwardly thereof (to the left in FIG. 27) and is held at the open position. The subsidiary movable frame member 708 is pivoted to the open position shown in FIG. 27 by its own weight. When the subsidiary movable frame member 708 is held at the open position shown in FIG. 27, its front wall 714 and rear wall abut with the opposite end portions of a shaft 744 (on which the main conveyor roller 662 is mounted) mounted between the front upstanding base plate 504 and the rear upstanding base plate 506, and the subsidiary movable frame member 708 is thus held at the open position.

As can be understood by reference to FIGS. 26 and 27 in conjunction with FIG. 1, the guiding plates 644 and 646 and the main conveyor rollers 664 and 668 positioned on one side (left side) of the main printing substrate carry-in path 638 are mounted on the main movable frame member 707. The base plate 650 located on the other side of the main printing substrate carry-in path 638 and the guiding plate 656 and the subsidiary conveyor roller 672 located on one side of the subsidiary printing substrate carry-in path 640 are mounted on the subsidiary movable frame member 708. On the other hand, the guiding plates 642, 648, 652, 654 and 658, the main conveyor rollers 662 and 666, the subsidiary conveyor roller 670 and the platen roller 674 are directly attached to the stationary main frame member (i.e., the front upstanding base plate 504 and the rear upstanding base plate 506). Thus, when the main movable frame member 707 and the subsidiary movable frame member 708 are held at the open position, most of the main printing substrate carry-in path 638 and the subsidiary printing substrate carry-in path 640 are opened and the main conveyor rollers 664 and 668 and the subsidiary conveyor roller 672 move away from the co-acting main conveyor rollers 662 and 666 and subsidiary conveyor roller 670.

In the illustrated embodiment, an elastic actuating piece 746 adapted to act on the main movable frame member 707 is formed integrally in the under surface of the cartridge case 610 of the ink ribbon cartridge 606 as shown in FIGS. 26 and 27 (the operation and effect of the elastic actuating piece 46 will be described hereinafter).

When need arises in the image-forming means 6 to replace the ink ribbon cartridge 606, the movable door member 680 is brought to the open position shown in FIG. 27. The ink ribbon cartridge 606 is elevated and taken out from the opening 706 and then a fresh ink ribbon cartridge 606 is lowered through the opening 706 and mounted in position. Thereafter, the door member 680 is brought to the closed position shown in FIG. 26.

In the event that jamming of the printing substrate occurs in the printing substrate delivery path 636 or the print output zone 608, the movable door member 680 is brought to the open position shown in FIG. 27. As a result, the printing head 604 moves upwardly away from the platen roller 674 and the delivery roller 678 moves upwardly away from the co-acting delivery roller 676. Then, the ink ribbon cartridge 606 is elevated and taken out from the opening 706. As a result, the printing substrate delivery path 636 is opened, and the printing substrate that has jammed up can be easily removed.

In the event that jamming of the printing substrate occurs in the main printing substrate carry-in path 638 and/or the subsidiary printing substrate carry-in path 640, the door member 680 is brought to the open position and the ink ribbon cartridge 606 is taken out. Subsequently, the manually operable lever 737 of the hook mechanism, which has been exposed as a result of removing the ink ribbon cartridge 606, is pressed. As a result, the main movable frame member 707 and the subsidiary movable frame member 708 are automatically brought to the open positions shown in FIG. 27. Hence, most of the main printing substrate carry-in path 638 and the subsidiary printing substrate carry-in path 640 are opened, and the rollers 664, 668 and 672 move away from the co-acting rollers 662, 666 and 670 respectively. Consequently, the printing substrate that has jammed up can be easily taken out upwardly from the main printing substrate carry-in path 638 and/or the subsidiary printing substrate carry-in path 640. Thereafter, the main movable frame member 707 and the subsidiary movable frame member 708 are returned to the closed positions shown in FIG. 26 and the ink ribbon cartridge 606 is again mounted at the required position. Alternatively, the ink ribbon cartridge 606 can be directly mounted at the required position without returning the main and subsidiary movable frame members 707 and 708 to the closed positions. As can be understood by reference to FIGS. 27 and 26, when the ink ribbon cartridge 606 is lowered for remounting while holding the main and subsidiary moving frame members 707 and 708 at the open position without returning them to the closed position, the elastic actuating piece 746 formed in the under surface of the cartridge case 610 of the cartridge 606 abuts with the upper surface of the main movable frame member 707 to pivot the main and subsidiary movable frame members 707 and 708 toward the closed positions shown in FIG. 26. When the ink ribbon cartridge 606 has descended to the required position, the main and subsidiary movable frame members 707 and 708 are held at the closed positions shown in FIG. 26. Accordingly, in the illustrated embodiment in which the elastic actuating piece 746 is provided in the ink ribbon cartridge 606, no trouble occurs even if the operator reloads the ribbon cartridge 606 while forgetting to bring the main and subsidiary movable frame members 707 and 708 to the closed positions. When the elastic actuating piece 746 is provided in the ink ribbon cartridge 606, the elastic actuating piece 746 holds the main and subsidiary movable frame members 707 and 708 at the closed positions upon mounting the ink ribbon cartridge 606 at the required position. If desired, therefore, the locking means 730 for locking the main and subsidiary movable frame members 707 and 708 at the closed positions may be omitted. In this case, as soon as the ink ribbon cartridge 606 is elevated from the required position, the main and subsidiary movable frame members 707 and 708 are pivoted to the open position.

Ink Ribbon Cartridge

Figure 31:
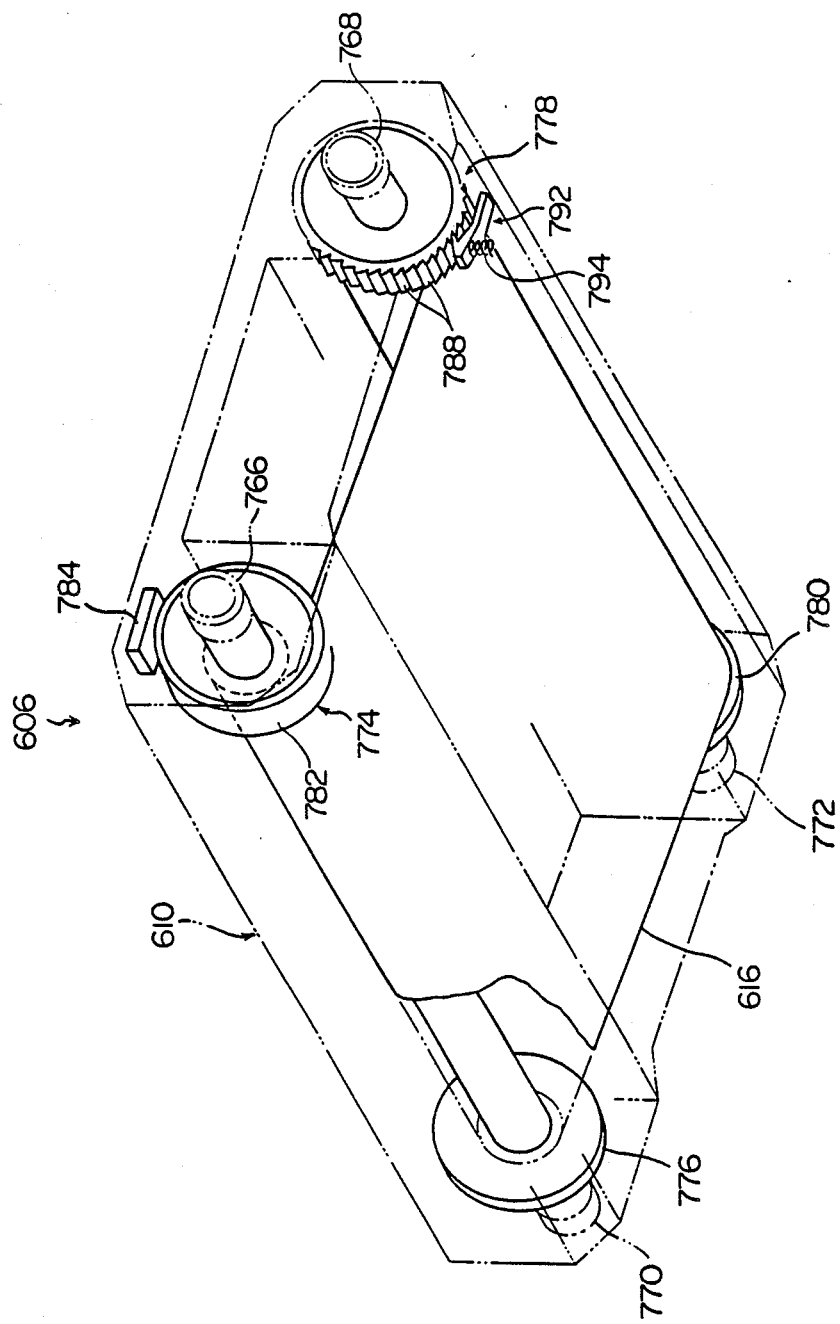
FIG. 31 is a perspective view showing the components of a cartridge case in the ink ribbon cartridge shown in FIG. 30.

As already described with reference to FIG. 1, the ink ribbon cartridge 606 includes the cartridge case 610, the ribbon pay-off shaft 612, the ribbon take-up shaft 614 and the thermosensitive ink ribbon 616. With reference to FIGS. 30, 31 and 32, the cartridge case 610, which may be formed of a suitable synthetic resin, has a front wall 750 and a rear wall 752 spaced from each other in the front-rear direction (the direction perpendicular to the sheet surface in FIG. 32) and a covering wall 754 over the pay-off shaft extending from the front wall 750 to the rear wall 752 in the left side of FIG. 32 and a covering wall 756 over the take-up shaft extending from the front wall 750 to the rear wall 752 in the right side of FIG. 32. Furthermore, between the front wall 750 and the rear wall 752 are detachably mounted a covering member 758 beneath the pay-off shaft surrounding the ribbon pay-off shaft 612 in cooperation with the upper covering wall 754 and a covering member 760 beneath the take-up shaft surrounding the ribbon take-up shaft 614 in cooperation with the upper covering wall 756. As clearly shown in FIG. 32, a space 762 for unwinding the ink ribbon exists between the upper covering wall 754 and the lower covering member 758, and a space 764 for taking up the ink ribbon exists between the upper covering wall 756 and the lower covering member 760. The lower covering member 758 for the ribbon pay-off shaft 612 projects to the right in FIG. 32 beyond the site of the space 762, and this projecting portion forms the aforesaid elastic actuating piece 746.

As illustrated in FIG. 30, forwardly projecting hollow sleeve portions 766 and 768 are formed in both side portions of the front wall 750. In the rear wall 752, a hollow sleeve portion 770 (FIG. 31) projecting rearwardly is formed at that site which corresponds to the hollow sleeve portion 766. At a site corresponding to the hollow sleeve portion 768, a circular hole 772 (FIG. 31) is formed and no hollow sleeve portion exists (the reason for which will become apparent from the description given hereinafter). The ribbon pay-off shaft 612 is rotatably mounted at its both end portions on the hollow sleeve portions 766 and 770. One end portion of the ribbon take-up shaft 614 is rotatably mounted on the hollow sleeve portion 768, and its other end portion is rotatably mounted in the circular hole 772. As clearly shown in FIG. 31, wheels 774 and 776 of a relatively large diameter are fixed to the ribbon pay-off shaft 612 in spaced-apart relationship in the front-rear direction (the direction perpendicular to the sheet surface in FIG. 32). Wheels 778 and 780 of a relatively large diameter spaced from each other by a predetermined distance in the front-rear direction are fixed to the ribbon take-up shaft 614. The ink ribbon 616 wound on the ribbon pay-off shaft 612 between the wheels 774 and 776 is unwound from the ribbon pay-off shaft 612, passes through the space 762, extends along the under surface of the cartridge case 610, and is wound on the ribbon take-up shaft 614 between the wheels 778 and 780 through the space 764.

With reference to FIGS. 31 and 32, an axially projecting cylindrical collar 782 is formed integrally in the wheel 774 fixed to the ribbon payoff shaft 612. In correspondence to this, a brake member 784, which is conveniently formed of a material having a high coefficient of friction, is bonded to the inside surface of the upper covering wall 754 of the cartridge case 610. The brake member 784 is kept in contact with the collar 782 and applies a braking force to the rotation of the ribbon pay-off shaft 612. Thus, the ribbon pay-off shaft 612 is prevented from freely rotating and causing loosening in the ink ribbon 616 between the space 762 and the space 764.

With reference to FIGS. 31 and 32, a cylindrical collar projecting axially is also integrally formed in the wheel 778 fixed to the ribbon take-up shaft 614. A number of protrusions 788 having a gentle inclined surface forwardly and a steep inclined surface rearwardly as viewed in the ink ribbon take-up direction (clockwise in FIG. 32), which may preferably be ratchet teeth, are formed on the peripheral surface of the collar. A journal portion 790 is formed integrally on the upper surface of the lower covering member 760, and an anchoring member 792 is pivotally mounted on the journal portion 790 by attaching thereto a shaft portion formed integrally with it to the journal portion 790. Spring means 794, which may be a compression coil spring, is interposed between one end portion of the anchoring member 792 and the lower covering member 760. The spring means 794 elastically biases the anchoring member 792 clockwise and elastically holds it at an operative position shown by a solid line in FIG. 32 at which an anchoring claw 796 formed in one end portion of the anchoring member 792 engages the steep inclined surface of the protrusions 788. An opening 798 for permitting entry of a releasing piece is formed at that site of the lower covering member 760 which corresponds to the other end portion of the anchoring member 792. When the ink ribbon cartridge 606 is removed from the predetermined position within the housing 2, the anchoring member 792 is kept at the operative position by the elastic biasing action of the spring means 794. Accordingly, when the anchoring claw 796 of the anchoring member 792 engages the steep inclined surface of the protrusions 788, the rotation of the ribbon take-up shaft 614 in a direction opposite (clockwise in FIG. 32) to the take-up direction is hampered. This prevents the take-up shaft 614 from rotating in a direction opposite to the take-up direction and causing loosening of the ink ribbon 616 between the space 762 and the space 764. In the event that loosening occurs in the ink ribbon 616 for some reason, the loosening can be removed by forcibly rotating the ribbon take-up shaft 614 in the take-up direction. At this time, the gentle inclined surfaces of the protrusions 788 act on the anchoring claw 796 of the anchoring member 792 to pivot the anchoring member 792 counterclockwise against the elastic biasing action of the spring means 794 and thereby permit rotation of the ribbon take-up shaft 614 in the take-up direction. On the other hand, when the ink ribbon cartridge 606 is loaded at a predetermined position within the housing 2 by a method to be described, a releasing piece 800 (see FIG. 30 also) implanted in a predetermined position within the housing 2 advances through the opening 798 and acts on the other end portion of the anchoring member 792, as shown by a two-dot chain line in FIG. 32, and thus pivots the anchoring member 792 to its inoperative position against the elastic biasing action of the spring means 794. As a result, the anchoring claw 796 of the anchoring member 792 moves away from the protrusions 788 and permits the ribbon take-up shaft 614 to rotate freely. Accordingly, as described hereinbelow, the ribbon take-up shaft 614 can be rotated in the take-up direction without producing undesirable noises. The ribbon take-up shaft 614 can be rotated in the take-up direction even when the anchoring member 792 is held at the operative position shown by a solid line in FIG. 32. In this case, the counterclockwise pivoting of the anchoring member 792 by the gentle inclined surfaces of the protrusions 788 and the clockwise pivoting of the anchoring member 792 by the elastic biasing action of the spring means 794 are repeatedly carried out. Hence, considerably large noises are repeatedly produced, and smooth rotation of the ribbon take-up shaft 614 is likely to be hampered.

With reference to FIG. 30, a supporting member 802 for supporting the front portion of the ink ribbon cartridge is mounted on the inside surface of the front upstanding base plate 504, and a supporting member 804 for supporting the rear portion of the ink ribbon cartridge is mounted on the inside surface of the rear upstanding base plate 506. A space for receiving the ink ribbon cartridge is defined between the front supporting member 802 and the rear supporting member 804. Supporting depressed portions 806 and 808 are formed in both side portions of the inside surface of the front supporting member 802. The bottom surfaces of the supporting depressed portions 806 and 808 are semicircular. A supporting surface 810 projecting rearwardly below the supporting depressed portion 808 is also provided in the front supporting member 802. On the other hand, a supporting depression 812 is formed in the left side portion of the inside surface of the rear supporting member 804. The bottom surface of the supporting depressed portion 812 is also semicircular. A plate spring 814, whose upper end is fixed to the rear supporting member 804 is in the supporting depressed portion 812. A covering wall 818 having a circular hole 816 formed therein is detachably mounted on the right side portion of the inside surface of the rear supporting member 804. The covering wall 818 covers the output end portion of an ink ribbon driving means, to be describe below. Furthermore, a supporting surface 820 projecting forwardly below the covering wall 818 is formed in the rear supporting member 804.

The ink ribbon cartridge 606 is mounted between the front supporting member 802 and the rear supporting member 804 by lowering it through the opening 706. More specifically, the hollow sleeve portions 766 and 768 formed in the front surface of the front wall 750 of the cartridge case 610 are respectively placed on the semicircular bottom surfaces of the supporting depressed portions 806 and 808 of the front supporting member 802, and the hollow sleeve portion 770 (FIG. 31) formed in the rear surface of the rear wall 752 of the cartridge case 610 is placed on the semicircular bottom surface of the supporting depressed portion 812 of the rear supporting member 804. Furthermore, the under surface of the right side portion of the cartridge case 610 is placed on the supporting surface 810 of the front supporting member 802 and the supporting surface 820 of the rear supporting member 804. The free end surface of the spring 814 in the supporting depressed portion 812 of the rear supporting member 804 acts on the hollow sleeve 770 of the cartridge case 610 and elastically biases the case 610 forwardly. When the ink ribbon cartridge 606 is mounted at the predetermined position between the front supporting member 802 and the rear supporting member 804 as above, the rear end (i.e., input end) of the ribbon take-up shaft 614 supported rotatably in the circular hole 772 (FIG. 31) formed in the rear wall 752 of the cartridge case 610 is aligned axially with the circular hole 816 formed in the covering wall 818.

Figure 33:
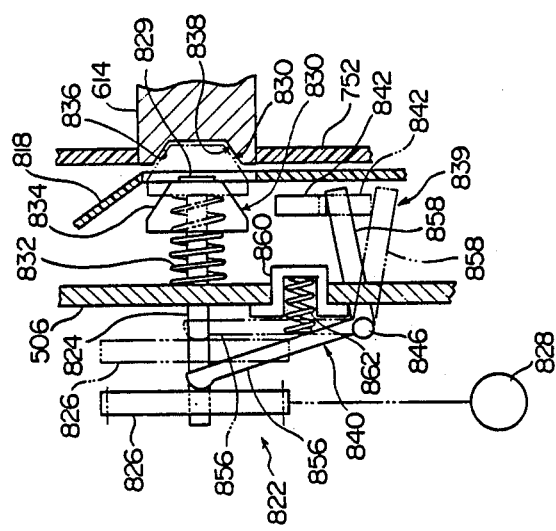

With reference to FIGS. 30 and 33, an output shaft 824 of an ink ribbon driving means 822 is rotatably and axially movably mounted on the rear upstanding base plate 506. The output shaft 824 is axially aligned with the ribbon take-up shaft 614 in the ink ribbon cartridge 606. A gear 826 is fixed to the rear end portion of the output shaft 824. The gear 826 is drivingly connected to an electric motor 828 by a suitable linking means (not shown). A stop ring 829 is fixed to the front end of the output shaft 824, which projects forwardly beyond the rear upstanding base plate 506. Between the rear upstanding base plate 506 and the stop ring 829 is mounted an output element 830 which rotates as a unit with the output shaft 824 but is free to move axially with respect to the output shaft 824. Spring means 832, which may be a compression coil spring, is mounted to the output shaft 824 between the output element 830 and the rear upstanding base plate 506. The spring means 832 elastically biases the output element 830 forwardly and presses it against the stop ring 829, and elastically biases the output shaft 824 forwardly via the output element 830 and the stop ring 829. The output element 830 has a truncated conical outer circumferential surface 834, and a number of teeth are formed on the outer circumferential surface 834 (see FIG. 30 also). On the other hand, an input element 838 having an inner circumferential surface corresponding to the outer circumferential surface 834 of the output element 830 is formed integrally on the rear end portion of the ribbon take-up shaft 614 in the cartridge 606 which is positioned opposite to the output element 830. A number of teeth are formed also on the inner circumferential surface 836. If desired, contrary to the illustrated embodiment, it is possible to use an output element having a truncated conical inner circumferential surface with many teeth formed on it and an input element having a truncated conical outer circumferential surface with many teeth formed on it.

Figure 34:
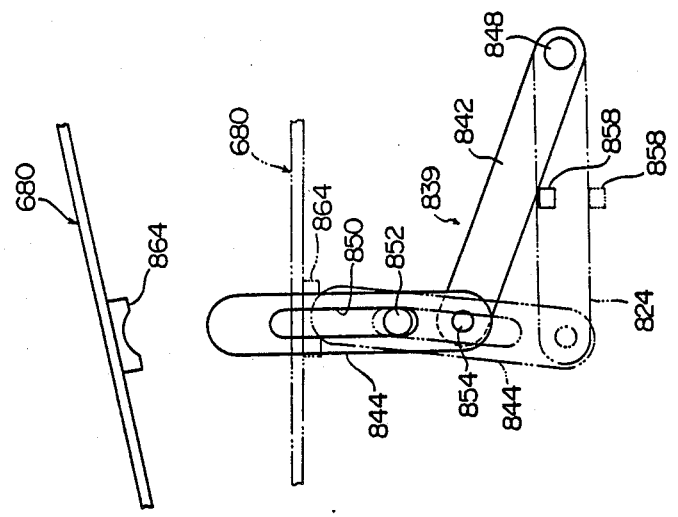
FIGS. 33 and 34 are partial sectional views showing ink ribbon driving means and interlocking means relating to the ink ribbon cartridge shown in FIG. 30.

With reference to FIGS. 33 and 34, there is provided an interlocking mechanism 839 which selectively holds the output shaft 824 at a receded position, shown by a solid line in FIG. 33, and a projecting position, shown by a two-dot chain line in FIG. 33, according to the opening and closing pivotal movement of the movable door member 680 (FIGS. 26 and 27). The interlocking mechanism 839 includes an L-shaped arm members 840 and lever member 842 and 844. The arm member 840 has a shaft portion 846 formed integrally and rotatably mounted on a bracket (not shown) fixed to the rear upstanding base plate 506. One end portion of the lever member 842 is mounted pivotally on a pin 848 implanted in the rear upstanding base plate 506. An elongate slot 850 is formed in the lever member 844 and a pin 852 implanted in the rear upstanding base plate 506 is inserted into the slot 850. Thus, the lever member 844 is mounted so as to be free to move in the extending direction of the slot 850 and to pivot about the pin 852 as a center. The free end portion (the left end portion in FIG. 34) of the lever member 842 and the lower end portion of the lever member 844 are pivotally linked to each other by a pin 854. The arm member 840 has a first arm 856 located forwardly of the gear 826 and a second arm 858 located under the lever member 844. A spring receiving member 860 is fixed to the rear upstanding base plate 506, and spring means 862, which may be a compression coil spring, is provided between the spring receiving member 860 and the first arm 856 of the arm member 840. The spring means 862 elastically biases the arm member 840 counterclockwise in FIG. 33 by a larger elastic biasing force than the spring means 832. As shown in FIG. 34, an actuating piece 864 having an under surface of a shape corresponding to the upper end of the lever member 844 is fixed to the under surface of the movable door member 680. For the upper end of the lever member 844, reference may also be made to FIG. 30.

The operation and advantage of the interlocking mechanism 839 are described below.

When the door member 680 is open, the actuating piece 864 fixed to its under surface is away upwardly from the upper end of the lever member 844 as shown by a solid line in FIG. 34. In this state, the spring means 862 elastically biases the arm member 840 counterclockwise in FIG. 33, the lever member 842 clockwise in FIG. 34 via the second arm 858 of the arm member 840, and the lever member 844 upwardly via the lever member 842. Accordingly, the lever member 844 is held at an elevated position at which the lower end of its slot 850 abuts with the pin 852 as shown by a solid line in FIG. 34, and consequently, the lever member 842 and the arm member 840 are held elastically at the positions shown by solid lines in FIGS. 33 and 34. The first arm 856 of the arm member 840, held elastically at the position shown by a solid line in FIG. 33, acts on the gear 826 fixed to the output shaft 824 and elastically holds the output shaft 824 at the receded position shown by a solid line in FIG. 33 against the elastic biasing action of the spring means 832. When the output shaft 824 is at the receded position, its forward end does not project forwardly beyond the covering wall 818 (see FIG. 30 also). Hence, the forward end portion of the output shaft 824 does not obstruct loading of the ink ribbon cartridge 606 into the predetermined position.

On the other hand, when the door member 680 is closed after the ink ribbon cartridge 606 has been loaded at the predetermined position, the actuating piece 864 fixed to the under surface of the door member 680 acts on the lever member 844 and lowers it as shown by a two-dot chain line in FIG. 34, and therefore, pivots the lever member 842 to the position shown by a two-dot chain line in FIG. 34. As a result, the lever member 842 acts on the second arm 868 of the arm member 840 to pivot the arm member 840 to the position shown by a two-dot chain line in FIG. 33. Thus, the output shaft 824 is held at the projecting position shown by a two-dot chain line in FIG. 33 by the elastic biasing action of the spring means 832. When the output shaft 824 is held at the projecting position, the output element 830 fitted to its forward end portion projects forwardly through the circular hole 816 formed in the covering wall 818 and elastically engages the input element 838 disposed at the rear end of the ribbon take-up shaft 614 of the ink ribbon cartridge 606. Consequently, the output shaft 824 is drivingly connected to the ribbon take-up shaft 614, and when the electric motor 828 is energized, the ribbon take-up shaft 614 rotates in the take-up direction.

In the illustrated embodiment, there is also provided an ink ribbon detecting device which detects ribbon breakage when the ink ribbon 616 in the cartridge 606 mounted at the predetermined position is broken and further printing fails.

Figure 35:
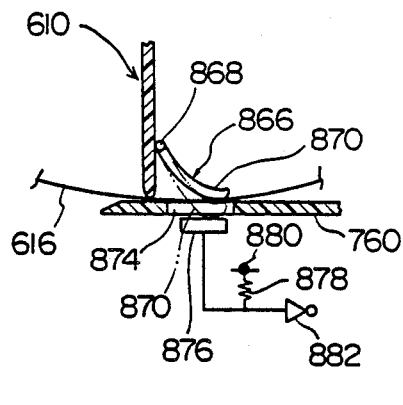
FIGS. 35 and 36 are partial sectional views showing an ink ribbon breakage detection device relating to the ink ribbon cartridge shown in FIG. 30.
Figure 36:
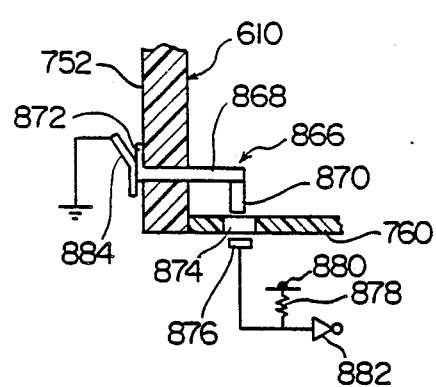

With reference to FIGS. 35 and 36, an element 866 to be detected, formed of an electrically conductive material such as steel, is attached to the rear wall 752 of the cartridge case 610. The element 866 to be detected includes a shaft portion 868, a portion 870 to be detected extending from the inside end of the shaft portion 868, and a contact portion 872 annexed to the outside end of the shaft portion 868. The shaft portion 868 is rotatably mounted on the rear wall 752 of the cartridge case 610. The element 866 to be detected is biased clockwise in FIG. 35 owing to its own weight, and its portion 870 to be detected is pressed against the inside surface of a non-wound travel portion of the ink ribbon. An opening 874 is formed in the lower covering member 760 of the cartridge case 610 in correspondence to the portion 870 to be detected. On the other hand, a detection element 876 located immediately below the opening 874 is disposed within the housing 2 in which the ink ribbon cartridge 606 is to be loaded. The detecting element 876 is formed of an electrically conductive material such as steel, and is connected to a voltage supply 880 via a resistance 878 and a signal producing device 882. Further, within the housing 2 is provided a contact piece 884 with which the contact portion 872 of the element 866 to be detected makes contact. The contact piece 884 may be formed of an electrically conductive plate spring, and is grounded.

In a normal state in which the ink ribbon 616 in the cartridge 606 is not broken, the portion 870 to be detected of the element 866 to be detected is spaced from the detecting element 876 by the ink ribbon 616 having a non-conductive substrate. On the other hand, if the ink ribbon 616 is broken in the print output zone 606 (FIG. 1) for example, that part of the ink ribbon 616 which is downstream of the broken site is wound up on the ribbon take-up shaft 614. Hence, no ink ribbon 616 exists below the portion 870 of the element 866 to be detected. As a result, the element 866 to be detected is pivoted to the position shown by a two-dot chain line in FIG. 35 by its own weight, and its portion 870 to be detected directly makes contact with the detecting element 876. Hence, the contact piece 884 is connected electrically to the detecting element 870 via the element 866 to be detected, and the signal producing device 882 produces a signal. In this case, it is possible to stop the operation of the image-forming means 6 and energize a suitable alarm (not shown) which warns of the breakage of the ink ribbon 616.

Figure 37:
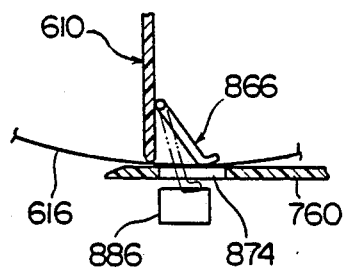
FIG. 37 is a partial sectional view showing a modified embodiment of the ink ribbon breakage detection device.

FIG. 37 shows a modified example of the detecting element. This detecting element 886 is comprised of an optical detector having a light emitting element and a light receiving element. When the ink ribbon 616 is broken, and the element 866 to be detected is at the position shown by a two-dot chain line, the light path between the light emitting element and the light receiving element in the detecting element 886 is shut off by the portion 870 of the element 866 to be detected, whereby the detecting element 886 produces a signal. In this case, it is of course possible to omit both the contact piece 884 and the contact portion 872 of the element 886 to be detected. If desired, a suitable detector such as a microswitch or a reed switch may be used.

While the invention has been described in detail hereinabove with reference to the specific embodiments of the image processing machine constructed in accordance with this invention taken in conjunction with the accompanying drawings, it should be understood that the invention is not limited to these specific embodiments and various changes and modification are possible without departing from the scope of the invention described and claimed herein.

What we claim is:

1. An image processing machine, comprising:
   a housing having a substantially horizontally extending upper surface and side surfaces;
   a document insertion opening on said upper surface of said housing;
   a document discharge opening on a said side surface of said housing; and
   means for scanning a document comprising a first scanning zone on the upper surface of said housing, a second scanning zone within said housing, an image receiving means, optical means for optically connecting said first scanning zone and said second scanning zone to said image receiving means, first document scan moving means for moving a document across said first scanning zone, and second document scan moving means for moving a document across said second scanning zone, wherein:
   said first document scan moving means comprises a movable document placing stand mounted on said upper surface of said housing so as to be free to reciprocate substantially horizontally across said first scanning zone, said movable document placing stand having a transparent plate for receiving a document thereon, and means for reciprocating said movable document placing stand;
   said second document scan moving means comprises a sheet-like document conveying passage extending within said housing from said document insertion opening to said document discharge opening across said second scanning zone and means for conveying a sheet-like document through said sheet-like document conveying passage;
   said movable document placing stand comprises a document insertion guiding passage such that when said movable document placing stand is at a predetermined position, said document insertion guiding passage is aligned with said document insertion opening to enable a sheet-like document to be inserted into said document insertion opening through said document insertion guiding passage, a frame member having said transparent plate fixed thereto and said document insertion guiding passage connected thereto, and a document cover mounted on said frame member for free pivotal movement between closed and open positions; and a sheet-like document supporting plate is mounted on said frame member of said movable document placing stand so as to be pivotable between an operative position whereat said supporting plate extends inclinedly upwardly from said document insertion guiding passage and an inoperative position whereat said plate covers said document insertion guiding passage.

2. The image processing machine of claim 1 wherein:

said sheet-like document supporting plate at said operative position is above said document cover at its closed position and interferes with opening movement of said document cover, and when said sheet-like document supporting plate is at said inoperative position, it does not interfere with opening movement of said document cover.

3. The image processing machine of claim 1 wherein said machine comprises:

safety means including a detector which detects when said sheet-like document supporting plate is at said inoperative position, and said safety means enables operation of said document placing stand reciprocating means of said first document scan moving means only when said detector detects said inoperative position.

4. An image processing machine, comprising:

a housing having a substantially horizontally extending upper surface and side surfaces;

a document insertion opening on said upper surface of said housing;

a document discharge opening on a said side surface of said housing; and means for scanning a document comprising a first scanning zone on the upper surface of said housing, a second scanning zone within said housing, an image receiving means, optical means for optically connecting said first scanning zone and said second scanning zone to said image receiving means, first document scan moving means for moving a document across said first scanning zone, and second document scan moving means for moving a document across said second scanning zone, wherein:

said first document scan moving means comprises a movable document placing stand mounted on said upper surface of said housing so as to be free to reciprocate substantially horizontally across said first scanning zone, said movable document placing stand having a transparent plate for receiving a document thereon, and means for reciprocating said movable document placing stand;

said second document scan moving means comprises a sheet-like document conveying passage extending within said housing from said document insertion opening to said document discharge opening across said second scanning zone and means for conveying a sheet-like document through said sheet-like document conveying passage;

said movable document placing stand comprises a document insertion guiding passage such that when said movable document placing stand is at a predetermined position, said document insertion guiding passage is aligned with said document insertion opening to enable a sheet-like document to be inserted into said document insertion opening through said document insertion guiding passage;

a sheet-like document supporting plate is provided on said movable document supporting plate for extending inclinedly upwardly from said document insertion guiding passage;

an opening-closing member is disposed within said housing and is mounted for free movement between a closed position at which said opening-closing member closes said document insertion opening and an open position at which said opening-closing member leaves said document insertion opening open;

said sheet-like document supporting plate is pivotably mounted on said movable document placing stand such that it is freely movable between an operative position and an inoperative position; and interlocking means for, when said document placing stand is at said predetermined position, moving said opening-closing member to its open position when said sheet-like document supporting plate is moved to its operative position and moving said opening-closing member to its closed position when said sheet-like document supporting plate is moved to its inoperative position.

5. The image processing machine of claim 4, wherein:

said interlocking means has an input rack connected to said sheet-like document supporting plate, an output rack connected to said opening-closing member and at least one gear interposed between said input rack and said output rack.

6. The image processing machine of claim 4, wherein said machine further comprises:

safety means for detecting when said opening-closing member is at its closed position, said safety means including a detector and said safety means permitting actuation of said document placing stand reciprocating means of said first document scan moving means only when said detector detects said closed position of said opening-closing member.

7. The image processing machine as set forth in claim 4, wherein:

said movable document placing stand comprises a document cover mounted thereon for free pivotal movement between closed and open positions; and said sheet-like document supporting plate is mounted on said document cover so as to extend along the upper surface of said document cover when said sheet-like document supporting plate is at its inoperative position.

8. The image processing machine of claim 4, wherein said machine further includes:

safety means for detecting when said sheet-like document guiding member is at its inoperative position, said safety means comprising a detector and said safety means permitting actuation of said document placing stand reciprocating means of said first document scan moving means only when said detector detects said inoperative position of said sheet-like document guiding member.

9. An image processing machine, comprising:

a housing having a substantially horizontally extending upper surface and side surfaces;

a document insertion opening on said upper surface of said housing;

a document discharge opening on a said side surface of said housing; and means for scanning a document comprising a first scanning zone on the upper surface of said housing, a second scanning zone within said housing, an image receiving means, optical means for optically connecting said first scanning zone and said second scanning zone to said image receiving means, first document scan moving means for moving a document across said first scanning zone, and second document scan moving means for moving a document across said second scanning zone, wherein:

said first document scan moving means comprises a movable document placing stand mounted on said upper surface of said housing so as to be free to reciprocate substantially horizontally across said first scanning zone, said movable document placing stand having a transparent plate for receiving a document thereon, and means for reciprocating said movable document placing stand;

said second document scan moving means comprises a sheet-like document conveying passage extending within said housing from said document insertion opening to said document discharge opening across said second scanning zone and means for conveying a sheet-like document through said sheet-like document conveying passage;

said movable document placing stand has a predetermined position whereat said stand extends away from said document insertion opening without covering said document insertion opening;

a sheet-like document guiding member is freely pivotably mounted in said housing for movement between an operative position whereat said sheet-like document guiding member extends inclinedly upwardly from said document insertion opening and an inoperative position whereat said sheet-like document guiding member closes said document insertion opening such that when said sheet-like document guiding member is at said inoperative position, said document stand is reciprocable above said sheet-like document guiding member without interference therefrom.

10. The image processing machine of claim 9 wherein:

said sheet-like document guiding member is freely linearly movably mounted over a predetermined range along a direction in which it extends and is elastically biased on one side thereof in its extending direction by a spring means; and locking means is provided on said housing for preventing the pivoting of said sheet-like document guiding member from its operative position to its inoperative position and its pivoting from its inoperative position to its operative position unless said sheet-like document guiding member is moved in its extending direction against the elastic biasing action of said spring means.

11. The image processing machine of claim 9, wherein:

said movable document placing stand comprises a frame member fixed to said transparent plate and a document cover mounted on said frame member for movement between open and closed positions; and when said document placing stand is at said predetermined position and said sheet-like document guiding member is at its operative position, said sheet-like document guiding member extends above said document cover in its closed position and interferes with opening movement of said document cover.

12. An image processing machine comprising:

a housing having a document insertion opening, a document discharge opening, and a scanning zone; and document scanning means mounted on said housing;

said housing comprising a main frame member, a movable frame member mounted on said main frame member to be freely pivotably movable between a closed position and an open position and locking means for releasable locking said movable frame member in its closed position;

said document scanning means comprising a sheet-like document conveying passage defined between said main frame member and said movable frame member when said movable frame member is at its closed position and extending from said document insertion opening to said document discharge opening across said scanning zone, a sheet-like document conveying means for conveying a sheet-like document through said document conveying passage, said conveying means having a conveying roller unit composed of a roller mounted on said main frame member and a roller mounted on said movable frame member cooperating with said roller on said main frame member, image receiving means mounted on said main frame member, and optical means mounted on said main frame member for optically connecting said scanning zone to said image receiving means; and said housing further including spring means for elastically holding said movable frame member at a half-open position between said closed position and said open position.

13. The image processing machine of claim 12, wherein:

said spring means comprises a plate spring fixed to one of said main frame member and said movable frame member such that when said movable frame member has been pivoted from said closed position to said half-open position, the other of said main frame member and said movable frame member abuts with said spring means.

14. The image processing machine of claim 12, wherein:

said image receiving means comprises an image pick-up means having a plurality of image pick-up elements aligned laterally to the direction of sheet-like document conveying and a colored region for shading located at a position on said movable frame member which corresponds to said scanning zone.

15. The image processing machine of claim 12, wherein:

said document insertion opening to said sheet-like document conveying passage is disposed in one side portion of the upper surface of said housing;

said document discharge opening is disposed on one side surface of said housing; and said movable frame member is mounted on said main frame member for free pivoting about a pivot axis positioned near said document discharge opening and, at its closed position, defines an upper part of one side of said housing.

16. The image processing machine of claim 12, wherein:

said half-open position of said movable frame member is at a 20 to 40 degree angle from the closed position of said movable frame member and said open position is at a 50 to 100 degree angle from said closed position.

17. An image processing machine comprising a document scanning means, wherein:

said document scanning means comprises a first scanning zone, a second scanning zone, image receiving means, optical means for optically connecting said first scanning zone and said second scanning zone to said image receiving means, first document scan moving means for moving a document across said first scanning zone, and second document scan moving means for moving a document across said second scanning zone;

said optical means comprises a light path changing reflecting mirror mounted movably between a first position and a second position and light path changing means for selectively holding said light path changing reflecting mirror at said first position and said second position such that when said light path changing reflecting mirror is at said first position, the light path between said second scanning zone and said image receiving means is shut off by said light path changing reflecting mirror and said first scanning zone is optically connected to said image receiving means by said light path changing reflecting mirror, and when said light path changing reflecting mirror is at said second position, said first scanning zone and said image receiving means are optically out of connection, and said light path changing reflecting mirror is not in the light path between said second scanning zone and said image receiving means to enable said second scanning zone to be optically connected to said image receiving means;

said light path changing means comprises an electric motor for rotating said light path changing reflecting mirror between said first and second positions, a first positioning stop piece for stopping further rotation of said light path changing reflecting mirror in a first rotating direction when said light path changing reflecting mirror is rotated to said first position from said second position in said first rotating direction, an input rotating member drivingly connected to said electric motor, an output rotating member fixed to said light path changing reflecting mirror, connecting means for connecting said input rotating member and said output rotating member for free rotation relative to each other over a predetermined angular range, and spring means for elastically biasing said light path reflecting mirror in said first rotating direction when said light path changing reflecting mirror is rotated in said first rotating direction beyond a predetermined neutral position between said first and second positions, and for elastically biasing said light path reflecting mirror in a second rotating direction opposite to said first rotating direction when said light path changing reflecting mirror is rotated in said second rotating direction beyond said neutral position; and when said light path changing reflecting mirror is to be rotated in said first rotating direction from said second position to said first position, said output rotating member is rotated against the elastic biasing action of said spring means by the rotation of said input rotating member until said reflecting mirror reaches said neutral position, and when said reflecting mirror moves past said neutral position, said output rotating member is rotating in said first rotating direction relative to said input rotating member under the elastic biasing action of said spring means, and when said output rotating member has been rotated in said first rotating direction by an angle smaller than said predetermined angular range relative to said input rotating member, said electric motor is deenergized to stop rotation of said input rotating member, and said light path changing reflecting mirror is held at said first position by the elastic biasing action of said spring means.

18. The image processing machine of claim 17, wherein:

said first positioning stop piece abuts with the surface of said light path changing reflecting mirror when said light path changing reflecting mirror is at said first position.

19. The image processing machine of claim 17, wherein:

said connecting means of said light path changing means comprises an arcuate slot in one of said input rotating member and said output rotating member extending in the direction of rotation and a protrusion on the other of said input rotating member and said output rotating member inserted in said arcuate slot.

20. The image processing machine of claim 17, wherein:

said light path changing means comprises a second positioning stop piece for stopping further rotation of said light path changing reflecting mirror in said second rotating direction when said reflecting mirror is rotated in said second rotating direction from said first position to said second position; and when said light path changing reflecting mirror is rotated in said second rotating direction from said first position to said second position, said output rotating member is rotated by the rotating of said input rotating member against the elastic biasing action of said spring means until said reflecting mirror reaches said neutral position, when said reflecting mirror moves past said neutral position, said output rotating member is rotated in said second rotating direction relative to said input rotating member by the elastic biasing action of said spring means, and when said output rotating member has been rotated in said second direction by an angle smaller than said predetermined angular range, said electric motor is deenergized to stop rotation of said input rotating member and said light path changing reflecting mirror is held at said second position by the elastic biasing action of said spring means.

21. An image processing machine having a housing and an image-forming means mounted on said housing, wherein:

said image-forming means comprises a printing means disposed in an upper part of said housing, said printing means having a print output zone at an under surface thereof for printing on a printing substrate, feed means for feeding a printing substrate, a printing substrate carry-in passage extending from a delivery end of said feed means to said print output zone, a printing substrate discharge opening on one side surface of said housing, a printing substrate delivery passage extending from said print output zone to said printing substrate discharge opening, and printing substrate conveying means for conveying a printing substrate delivered from said feed means through said printing substrate carry-in passage, causing said printing substrate to cross said print output zone and conveying said printing substrate through said printing substrate delivery passage;

said housing includes a main frame member having an inlet-outlet opening in at least a part of the upper surface of said housing, a movable frame member mounted on said main frame member below said printing means so as to be free to pivot between a closed position and an open position and locking means for releasably locking said movable frame member at its closed position;

at least a majority of one side of said printing substrate carry-in passage is defined by one side surface of said movable frame member at said closed position, at least a majority of one side of said printing substrate delivery passage is defined by said under surface of said printing means, and said printing substrate conveying means includes a pair of carry-in rollers, only one of which is mounted on said movable frame member; and said printing means is upwardly movable through said inlet-outlet opening to open at least a majority of said printing substrate delivery passage, and when said movable frame member is pivoted from its closed position to its open position by releasing said locking means, at least a majority of said printing substrate carry-in passage is opened and said one carry-in roller is moved away from the other said carry-in roller.

22. The image processing machine of claim 21, wherein:

said printing means comprises a printing head and an ink ribbon cartridge having a ribbon pay-off shaft and a ribbon take-up shaft for positioning on opposite sides of said printing head and an ink ribbon to be unwound from said ribbon pay-off shaft, moved across an under surface of said printing head, and wound up on said ribbon take-up shaft;

said housing includes a movable door member freely pivotably mounted on said main frame member between a closed position at which it closes said inlet-outlet opening and an open position displaced upwardly from said closed position; and said ink ribbon cartridge is detachably mountable at a predetermined position within said housing through said inlet-outlet opening, and said printing head is mounted on the under surface of said movable door member and is placed into a predetermined position within said housing through said inlet-outlet opening by pivoting said movable door member from said open position to said closed position.

23. The image processing machine of claim 22, wherein:

said printing substrate conveying means includes a pair of delivery rollers, one and only one of which is mounted on said movable door member, whereby when said movable door member is pivoted from its closed position to its open position, said one delivery roller is moved away from the other roller.

24. The image processing machine of claim 22, wherein:

an elastic actuating piece is connected to the under surface of said ink ribbon cartridge such that when said ink ribbon cartridge is mounted at a predetermined position within said housing through said inlet-outlet opening while said movable frame member is at its open position, said elastic actuation piece acts on said movable frame member to pivot it from its open position to its closed position.

25. The image processing machine of claim 21, wherein:

a means for biasing biases said movable frame member toward its open position, said means for biasing comprising at least one of said movable frame member's own weight and a spring means.

26. The image processing machine of claim 21, wherein:

said locking means comprises a hook mechanism and an anchoring member on the other of said movable frame member and said main frame member;

said hook mechanism comprises a hook member pivotally mounted to pivot between an operative position and an inoperative position, spring means for elastically biasing said hook member to its operative position and a manually operable lever connected with said hook member; and when said movable frame member is pivoted from its open position toward its closed position, said anchoring member acts on said hook member to pivot said hook member from its operative position to its inoperative position against the elastic biasing action of said spring means, and when said movable frame member is at its closed position, said hook member is moved to its operative position by the elastic biasing action of said spring means and anchored on said anchoring member.

27. The image processing machine of claim 26, wherein:

said printing means is disposed in relation to said hook mechanism such that when said printing means is moved upwardly through said inlet-outlet opening, said manually operable lever of said hook mechanism is manually viewable and operable by an operator through said inlet-outlet opening.

28. The image processing machine of claim 21, wherein:

said printing substrate feed means comprises a lower cassette-type feed means, including a lower cassette for accommodating a plurality of sheet-like printing substrates in a stacked state therein and detectably mounted on said housing, and an upper cassette-type feed means, including an upper cassette for accommodating a plurality of sheet-like printing substrates in a stacked state therein and detachably mounted on said housing;

said printing substrate carry-in passage comprises a main printing substrate carry-in passage extending from a delivery end of said lower cassette-type feed means to said print output zone and a subsidiary printing substrate carry-in passage extending from a delivery end of said upper cassette-type feed means to said main printing substrate carry-in passage;

said movable frame member includes a main movable frame member and a subsidiary movable frame member mounted independently on said main frame member such that both said movable frame members are fee to pivot between a closed position and an open position;

at least a majority of one side of said main printing substrate carry-in passage is defined by one side surface of said main movable frame member, at least a majority of one side of said subsidiary printing substrate carry-in passage is defined by one side surface of said subsidiary movable frame member, and said printing substrate conveying means includes a pair of main carry-in rollers, only one of which is mounted on said main movable frame member, and a pair of subsidiary carry-in rollers, only one of which is mounted on said subsidiary movable frame member; and when said main movable frame member and said subsidiary movable frame member are pivoted from their closed position to their open position, at least a majority of said main printing substrate carry-in passage and at least a majority of said subsidiary printing substrate carry-in passage are opened, and said one roller of said main carry-in rollers is moved away from the other said main carry-in roller, and said one roller of said subsidiary carry-in rollers is moved away from the other said subsidiary carry-in roller.

29. The image processing machine of claim 28, wherein:

said main movable frame member and said subsidiary movable frame member are disposed in relation to each other such that when said main movable frame member is pivoted from its open position to its closed position, said main movable frame member will act on said subsidiary movable frame member to pivot said subsidiary movable frame member from its open position to its closed position.

30. The image processing machine of claim 29, wherein said locking means operates only between said main movable frame member and said housing.

31. An image forming machine having a housing and an image-forming means mounted on said housing, wherein:

said image-forming means comprises printing means disposed in an upper part of said housing, said printing means having a print output zone at an under surface thereof for printing on a printing substrate, printing substrate feed means, a printing substrate carry-in passage extending from a delivery end of said feed means to said print output zone, a printing substrate discharge opening on one side surface of said housing, a printing substrate delivery passage extending from said print output zone to said printing substrate discharge opening, and printing substrate conveying means for conveying a printing substrate delivered from said feed means through said printing substrate carry-in passage, causing said printing substrate to cross said print output zone and conveying said printing substrate through said printing substrate delivery passage;

said housing includes a main frame member having an inlet-outlet opening in at least a part of the upper surface of said housing and a movable frame member mounted on said main frame member below said printing means so as to be free to pivot between a closed position and an open position;

at least a majority of one side of said printing substrate carry-in passage is defined by one side surface of said movable frame member at said closed position, at least a majority of one side of said printing substrate delivery passage is defined by said under surface of said printing means, and said printing substrate conveying means includes a pair of carry-in rollers, only one of which is mounted on said movable frame member;

said printing means is upwardly movable through said inlet-outlet opening to open at least a majority of said printing substrate delivery passage, and when said movable frame member is pivoted from its closed position to its open position, at least a majority of said printing substrate carry-in passage is opened and said one carry-in roller is moved away from the other said carry-in roller; and an elastic actuation piece is connected to said under surface of said printing means such that when said printing means is at a predetermined position within said housing while said movable frame member is at its open position, said elastic actuation piece acts on said movable frame member to pivot it from its open position to its closed position.

32. The image processing machine of claim 31, wherein:

said printing means comprises a printing head and an ink ribbon cartridge having a ribbon payoff shaft and a ribbon take-up shaft for positioning on opposite sides of said printing head and an ink ribbon to be unwound from said ribbon payoff shaft, moved across the under surface of said printing head, and wound up on said ribbon take-up shaft; and said elastic actuation piece is connected to the under surface of said ink ribbon cartridge.

33. The image processing machine of claim 32, wherein:

said housing comprises a movable door member mounted on said main frame member for free pivotable movement between a closed position at which it closes said inlet-outlet opening and an open position displaced upwardly from said closed position; and said ink ribbon cartridge is detachably mounted at a predetermined position within said housing through said inlet-outlet opening, and said printing head is mounted on the under surface of said movable door member, and is placed into a predetermined position within said housing through said inlet-outlet opening by pivoting said movable door member from its open position to its closed position.

34. The image processing machine of claim 33, wherein:

said printing substrate conveying means has a pair of delivery rollers, only one of which is mounted on said movable door member; and when said movable door is pivoted from its closed position to its open position, said one delivery roller is moved away from the other said delivery roller.

35. The image processing machine of claim 31, wherein:

a means for biasing biases said movable frame member toward its open position, said means for biasing comprising at least one of said movable frame member's own weight and a spring means.

36. The image processing machine of claim 31, wherein:

said printing substrate feed means comprises a lower cassette-type feed means, including a lower cassette for accommodating a plurality of sheet-like printing substrates in a stacked state therein and detectably mounted on said housing, and an upper cassette-type feed means, including an upper cassette for accommodating a plurality of sheet-like printing substrates in a stacked state therein and detachably mounted on said housing;

said printing substrate carry-in passage comprises a main printing substrate carry-in passage extending from a delivery end of said lower cassette-type feed means to said print output zone and a subsidiary printing substrate carry-in passage extending from a delivery end of said upper cassette-type feed means to said main printing substrate carry-in passage;

said movable frame member includes a main movable frame member and a subsidiary movable frame member mounted independently on said main frame member such that both said movable frame members are free to pivot between a closed position and an open position;

at least a majority of one side of said main printing substrate carry-in passage is defined by one side surface of said main movable frame member, at least a majority of one side of said subsidiary printing substrate carry-in passage is defined by one side surface of said subsidiary movable frame member, and said printing substrate conveying means includes a pair of main carry-in rollers, only one of which is mounted on said main movable frame member, and a pair of subsidiary carry-in rollers, only one of which is mounted on said subsidiary movable frame member; and when said main movable frame member and said subsidiary movable frame member are pivoted from their closed position to their open position, at least a majority of said main printing substrate carry-in passage and at least a majority of said subsidiary printing substrate carry-in passage are opened, and said one roller of said main carry-in rollers is moved away from the other said main carry-in roller, and said one roller of said subsidiary carry-in rollers is moved away from the other said subsidiary carry-in roller.

37. The image processing machine of claim 36, wherein:

said main movable frame member and said subsidiary movable frame member are disposed in relation to each other such that when said main movable frame member is pivoted from its open position to its closed position, said main movable frame member will act on said subsidiary movable frame member to pivot said subsidiary movable frame member from its open position to its closed position.

38. An image processing machine having a housing an an image-forming means mounted on said housing, wherein:

said housing includes a frame member having an ink ribbon cartridge accommodating space, an inlet-outlet opening for said ink ribbon cartridge accommodating space and a movable door member mounted for free pivotable movement between a closed position at which it closes said inlet-outlet opening and an open position at which said inlet-outlet opening is open;

said image-forming means includes an ink ribbon cartridge to be mounted in said ink ribbon cartridge accommodating space through said inlet-outlet opening and an ink ribbon driving means;

said ink ribbon cartridge includes a cartridge case, a ribbon pay-off shaft and a ribbon take-up shaft mounted rotatably on said cartridge case and extending substantially parallel to each other in a spaced-apart relationship and in a predetermined direction, an ink ribbon to be unwound from said pay-off shaft and wound on said take-up shaft, and an input element disposed at one end portion of said ribbon take-up shaft;

said ink ribbon driving means includes an output shaft mounted on as as to be freely rotatable, axially movable between a projecting position and a receded position, and substantially in axial alignment with said ribbon take-up shaft of said ink ribbon cartridge when said cartridge is in said accommodating space, an output element provided at the end portion of said output shaft, an interlocking means for axially moving said output shaft from its receded to its projecting position in response to closing movement of said movable door member, and an electrical motor drivingly connected to said output shaft; and when said output shaft is at said receded position, said ink ribbon cartridge can be mounted in said ink ribbon cartridge accommodating space through said inlet-outlet opening without being interfered with by said output shaft and said output element, and when said movable door member is pivoted from its open position to its closed position, the pivoting motion of said movable door member is transmitted to said output shaft by said interlocking means whereby said output shaft is moved from its receded position to its projecting position and said output element is drivingly connected to said input element.

39. The image processing machine of claim 38, wherein:

said ink ribbon driving means further comprises spring means for elastically biasing said output shaft to its receded position, and when said movable door member is pivoted from its closed position to its open position, said output shaft is moved to its receded position by the elastic biasing action of said spring means.

40. The image processing machine of claim 38, wherein:

one of said output element and said input element has a truncated conical outer circumferential surface and the other of said output element and said input element has a truncated conical inner circumferential surface.

41. The image processing machine of claim 40, wherein:

a plurality of teeth are formed on said outer circumferential surface and on said inner circumferential surface for enabling meshing engagement of said output element and said input element with each other.

42. The image processing machine of claim 38, wherein:

said output element is mounted on said output shaft so as to be movable over a predetermined range in the axial direction of said output shaft, and has a spring member elastically biasing it toward its projecting position.

43. An image processing machine having a housing and an image-forming means mounted on said housing, wherein:

said image-forming means includes an ink ribbon cartridge to be detachably mounted at a predetermined position within said housing;

said ink ribbon cartridge comprises a cartridge case, a ribbon pay-off shaft and a ribbon take-up shaft mounted rotatably on said cartridge case and extending substantially parallel to each other in a spaced-apart relationship and in a predetermined direction, an ink ribbon to be unwound from said pay-off shaft and wound on said take-up shaft, a wheel provided on said ribbon take-up shaft and having a plurality of protrusions on its outer circumferential surface, an anchoring member having an anchoring claw at one end thereof and mounted on said cartridge case in such a manner that said anchoring claw is free to move between an operative position at which it engages said protrusions on said wheel and an inoperative position at which it disengages from said protrusions on said wheel, and spring means for elastically biasing said anchoring member toward said operative position; and said housing has disposed therein a releasing piece which, when said ink ribbon cartridge is mounted at said predetermined position, acts on said anchoring member to move said anchoring member to said inoperative position against the elastic biasing action of said spring means.

44. The image processing machine of claim 43, wherein:

said protrusions formed on the outer circumferential surface of said wheel are ratchet teeth having a gently inclined surface at the front sides thereof and a steeply inclined surface at the rear sides thereof as viewed in the ribbon take-up direction.

45. The image processing machine of claim 43, wherein:

said anchoring member is pivotably mounted on said cartridge case in such a manner that said anchoring member is free to pivot between said operative position and said inoperative position.

46. The image processing machine of claim 43, wherein:

an opening for permitting entry of said releasing piece is located in said cartridge case such that when said ink ribbon cartridge is mounted at said predetermined position, said releasing piece projects into the inside of said cartridge case through said opening and acts on said anchoring member.

47. The image processing machine of claim 43, wherein:

said ink ribbon cartridge has a wheel on said ribbon pay-off shaft, said cartridge case has a brake member therein made of a material having a high coefficient of friction, and said brake member is adapted to contact said wheel.

48. An image processing machine having a housing and an image-forming means mounted thereon, wherein:

said image-forming means includes an ink ribbon cartridge to be detachably mounted at a predetermined position within said housing;

said ink ribbon cartridge comprises a cartridge case, a ribbon pay-off shaft and a ribbon take-up shaft mounted rotatably on said cartridge case and extending substantially parallel to each other in a spaced-apart relationship and in a predetermined direction, an ink ribbon to be unwound from said pay-off shaft and wound on said take-up shaft, and an element to be detected movably mounted on said cartridge case for pressing against the inside surface of a non-wound travelling portion of said ink ribbon;

detecting means is disposed in said housing for detecting breakage of said ink ribbon, said detecting means including a detecting element located opposite to said element to be detected, whereby when said ink ribbon is broken, said element to be detected projects from its normal position and is detected by said detecting means.

49. The image processing machine of claim 48, wherein:

said element to be detected is pressed against the inside surface of said non-wound travelling portion of said ink ribbon by its own weight.

50. The image processing machine of claim 48, wherein:

said element to be detected is pivotally mounted on said cartridge case.

51. The image processing machine of claim 48, wherein:

said ink ribbon is insulative, and said detecting element and said element to be detected are electrically conductive, such that when said ink ribbon is broken and said element to be detected makes direct contact with said detecting element, said detecting means detects said element to be detected.

52. The image processing machine of claim 48, wherein:

said detecting element is an optical detecting element having a light emitting element and a light receiving element such that when said ink ribbon is broken, said element to be detected shuts off a light path between said light emitting element and said light receiving element and said detecting element detects said element to be detected.

* * * * *

UNITED STATES PATENT AND TRADEMARK OFFICE
CERTIFICATE OF CORRECTION

PATENT NO. : 4,914,525

DATED : April 3, 1990

INVENTOR(S) : Yuji ABE, Kenji SAKUE, Masahiro HASHIZUME, Taiichi JINNO, Kazuo NAKAMURA and Katsumi NAGATA It is certified that error appears in the above-identified patent and that said Letters Patent is hereby corrected as shown below:

In column 40, line 2, change "said movable document supporting plate" to --said movable document placing stand--.

In column 43, lines 48 and 49 change "said light path reflecting mirror" to --said light path changing reflecting mirror--;

lines 53 and 54, change "said light path reflecting mirror" to --said light path changing reflecting mirror--.

In column 46, line 14, after "mechanism" insert --on one of said movable frame member and said main frame member--.

UNITED STATES PATENT AND TRADEMARK OFFICE
CERTIFICATE OF CORRECTION

PATENT NO. : 4,914,525

DATED : April 3, 1990

INVENTOR(S) : Yuji ABE, Kenji SAKUE, Masahiro HASHIZUME, Taiichi JINNO, Kazuo NAKAMURA and Katsumi NAGATA It is certified that error appears in the above-identified patent and that said Letters Patent is hereby corrected as shown below:

In column 50, line 8, change "as as to" to --so as to--.

Signed and Sealed this

Seventeenth Day of September, 1991

Attest:

HARRY F. MANBECK, JR.

Attesting Officer

Commissioner of Patents and Trademarks